(12) United States Patent
Vigen

(10) Patent No.: US 11,840,309 B2
(45) Date of Patent: Dec. 12, 2023

(54) SNOW VEHICLE

(71) Applicant: Arctic Cat Inc., Thief River Falls, MN (US)

(72) Inventor: David L. Vigen, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 17/744,797

(22) Filed: May 16, 2022

(65) Prior Publication Data

US 2023/0044744 A1 Feb. 9, 2023

Related U.S. Application Data

(63) Continuation of application No. 16/875,823, filed on May 15, 2020, now Pat. No. 11,332,215, which is a continuation-in-part of application No. 16/192,000, filed on Nov. 15, 2018, now Pat. No. 11,027,794.

(60) Provisional application No. 62/586,559, filed on Nov. 15, 2017.

(51) Int. Cl.
*B62M 27/02* (2006.01)

(52) U.S. Cl.
CPC ....... *B62M 27/02* (2013.01); *B62M 2027/023* (2013.01); *B62M 2027/025* (2013.01); *B62M 2027/027* (2013.01)

(58) Field of Classification Search
CPC ............ B62M 27/02; B62M 2027/027; B62M 2027/025; B62M 2027/023; B62M 2027/021
USPC ....................................................... 180/190
See application file for complete search history.

(56) References Cited

U.S. PATENT DOCUMENTS

| 3,845,847 | A | | 11/1974 | Camp |
| 4,535,869 | A | | 8/1985 | Tsutsumikoshi et al. |
| 4,620,604 | A | | 11/1986 | Talbot |
| 4,688,817 | A | * | 8/1987 | Marier ................... B62B 13/10 180/182 |
| 5,054,798 | A | * | 10/1991 | Zulawski ............... B62B 13/08 280/16 |

(Continued)

FOREIGN PATENT DOCUMENTS

| CA | 2143383 C | 10/2000 |
| CA | 2321860 C | 10/2006 |

(Continued)

OTHER PUBLICATIONS

Clake One, http://www.clake.com.au/clake/, last viewed May 24, 2017.

(Continued)

*Primary Examiner* — Minnah L Seoh
*Assistant Examiner* — Hosam Shabara
(74) *Attorney, Agent, or Firm* — Billion & Armitage

(57) ABSTRACT

Embodiments of the present disclosure describe a snow vehicle including an engine mounted on a frame, a drive track in contact with the frame, a drive train operatively interconnecting the engine with the drive track for delivering propulsive power to the drive track, a fork connected to the frame, one or more skis connected to the fork, a drop fork component positioned between a fork and handlebars, and an exhaust system. The drive train includes a continuously variable transmission (CVT) positioned within a CVT housing.

23 Claims, 60 Drawing Sheets

(56) References Cited

U.S. PATENT DOCUMENTS

| | | | |
|---|---|---|---|
| 5,474,146 A * | 12/1995 | Yoshioka | B62K 13/00 |
| | | | 180/184 |
| 5,586,614 A | 12/1996 | Kouchi et al. | |
| 5,660,245 A | 8/1997 | Marier et al. | |
| 5,727,643 A | 3/1998 | Kawano et al. | |
| 5,755,495 A | 5/1998 | Cook et al. | |
| 5,791,431 A | 8/1998 | Asao et al. | |
| 5,904,217 A | 5/1999 | Yamamoto et al. | |
| 5,944,133 A | 8/1999 | Eto | |
| 5,996,717 A | 12/1999 | Hisadomi | |
| 6,095,275 A | 8/2000 | Shaw | |
| 6,112,840 A | 9/2000 | Forbes | |
| 6,234,263 B1 | 5/2001 | Boivin et al. | |
| 6,321,864 B1 | 11/2001 | Forbes | |
| 6,382,338 B1 | 5/2002 | Forbes | |
| 6,431,301 B1 | 8/2002 | Forbes | |
| 6,446,744 B2 | 9/2002 | Wubbolts et al. | |
| 6,467,787 B1 * | 10/2002 | Marsh | B62K 5/01 |
| | | | 180/182 |
| 6,491,125 B2 | 12/2002 | Girouard et al. | |
| 6,626,258 B1 | 9/2003 | Forbes | |
| 6,808,034 B2 * | 10/2004 | Nakano | B62M 27/02 |
| | | | 123/65 PE |
| 6,904,990 B2 * | 6/2005 | Etou | B62M 27/02 |
| | | | 180/190 |
| 7,124,847 B2 | 10/2006 | Girouard et al. | |
| 7,124,848 B2 | 10/2006 | Girouard et al. | |
| 7,213,669 B2 | 5/2007 | Fecteau et al. | |
| 7,395,909 B2 | 7/2008 | Hutchison | |
| 7,448,462 B2 | 11/2008 | Toyochika | |
| 7,451,846 B2 | 11/2008 | Wubbolts et al. | |
| 7,475,751 B2 * | 1/2009 | Pard | B62M 27/00 |
| | | | 180/190 |
| 7,779,944 B2 | 8/2010 | Bergman et al. | |
| 7,789,183 B2 | 9/2010 | Sadakuni et al. | |
| 7,815,003 B2 | 10/2010 | Ferrer Almazan | |
| 8,096,921 B2 | 1/2012 | Hahn | |
| 8,127,877 B2 | 3/2012 | Fredrickson et al. | |
| 8,430,197 B2 | 4/2013 | Matsudo | |
| 8,479,860 B1 | 7/2013 | Jorgenson | |
| 8,567,546 B2 | 10/2013 | Berg et al. | |
| 8,794,369 B1 | 8/2014 | Cruit | |
| 8,813,889 B1 | 8/2014 | Jorgenson | |
| 8,910,738 B2 | 12/2014 | Mangum | |
| 8,978,794 B2 | 3/2015 | Giese et al. | |
| 9,321,509 B2 | 4/2016 | Beavis | |
| 9,352,802 B2 | 5/2016 | Sampson | |
| 9,643,684 B2 | 5/2017 | Will et al. | |
| 9,771,130 B2 | 9/2017 | Beavis | |
| 9,809,195 B2 * | 11/2017 | Giese | B60R 25/34 |
| 9,845,004 B2 | 12/2017 | Hedlund et al. | |
| 9,873,485 B2 | 1/2018 | Mangum et al. | |
| 10,293,883 B1 | 5/2019 | Bedard et al. | |
| 10,442,494 B2 | 10/2019 | Thompson et al. | |
| 10,493,846 B2 | 12/2019 | Bennett et al. | |
| 10,538,262 B2 | 1/2020 | Mangum et al. | |
| 10,597,117 B2 | 3/2020 | Leblanc | |
| 10,899,415 B2 | 1/2021 | Mangum et al. | |
| 11,027,794 B2 | 6/2021 | Vigen | |
| 11,148,750 B2 | 10/2021 | Thompson et al. | |
| 11,214,334 B2 | 1/2022 | Beavis | |
| 2002/0112909 A1 * | 8/2002 | Nishijima | B62M 27/02 |
| | | | 180/190 |
| 2003/0201128 A1 | 10/2003 | Girouard et al. | |
| 2004/0129483 A1 | 7/2004 | Girouard et al. | |
| 2005/0126839 A1 | 6/2005 | Rasidescu et al. | |
| 2005/0194199 A1 * | 9/2005 | Marks | B62K 5/01 |
| | | | 180/332 |
| 2006/0162977 A1 * | 7/2006 | Etou | B62M 27/02 |
| | | | 180/190 |
| 2007/0193715 A1 * | 8/2007 | Bergman | B60K 11/04 |
| | | | 165/41 |
| 2008/0185203 A1 | 8/2008 | Matsudo | |
| 2015/0144412 A1 | 5/2015 | Magnum | |
| 2015/0166143 A1 | 6/2015 | Beavi | |
| 2015/0197313 A1 | 7/2015 | Mstad et al. | |
| 2016/0016639 A1 | 1/2016 | Pard | |
| 2016/0167722 A1 | 6/2016 | Anderson et al. | |
| 2016/0200397 A1 | 7/2016 | Vezina et al. | |
| 2018/0237106 A1 | 8/2018 | Hedlund et al. | |
| 2018/0243636 A1 | 8/2018 | Zuchoski et al. | |
| 2018/0273142 A1 | 9/2018 | Mangum et al. | |
| 2019/0047652 A1 * | 2/2019 | Laberge | B62M 7/02 |
| 2020/0094918 A1 | 3/2020 | Beavis | |
| 2020/0277023 A1 | 9/2020 | Vigen | |
| 2021/0053652 A1 | 2/2021 | Fuchs et al. | |
| 2021/0053653 A1 | 2/2021 | Mangum et al. | |
| 2021/0129943 A1 | 5/2021 | Mangum et al. | |
| 2022/0250715 A1 | 8/2022 | Leblanc | |

FOREIGN PATENT DOCUMENTS

| | | |
|---|---|---|
| CA | 2345490 C | 2/2007 |
| CA | 2555108 C | 6/2009 |
| CA | 2555039 C | 12/2009 |
| CA | 2561337 C | 12/2010 |
| CA | 2797535 A1 | 5/2013 |
| CA | 2998616 C | 6/2021 |
| EP | 0391282 B1 | 11/1992 |
| EP | 1056639 B1 | 6/2003 |
| WO | 2000050295 A1 | 8/2000 |
| WO | 2017031591 | 3/2017 |
| WO | 2017031592 | 3/2017 |

OTHER PUBLICATIONS

"Ez-Snow—World Cub", https://honda-ezcub.forumfree.it/?t=25454988, Feb. 23, 2008, 5.

Barkley16, "Honda EZ Snow The Real Deal", http://www.pilotodyssey.com/PO/viewtopic.php?f=4&t=15480&start=0, Apr. 2, 2015, 6.

Bassett, "The Snowbike Revolution", http://www.snowmobile.com/products/the-snow-bike-revolution-1995.html, Sep. 23, 2015, 12.

Carbonare, "Too Much Street Car Nationals Is Never Enough", http://www.speedhunters.com/2018/06/too-much-street-car-nationals-is-never-enough/, Jun. 5, 2018, 65.

Margo, "Triumph 675 Winter Edition", http://www.snowmobile.com/blog/2010/01/triumph-675-winter-edition.html, Jan. 18, 2010, 3.

* cited by examiner

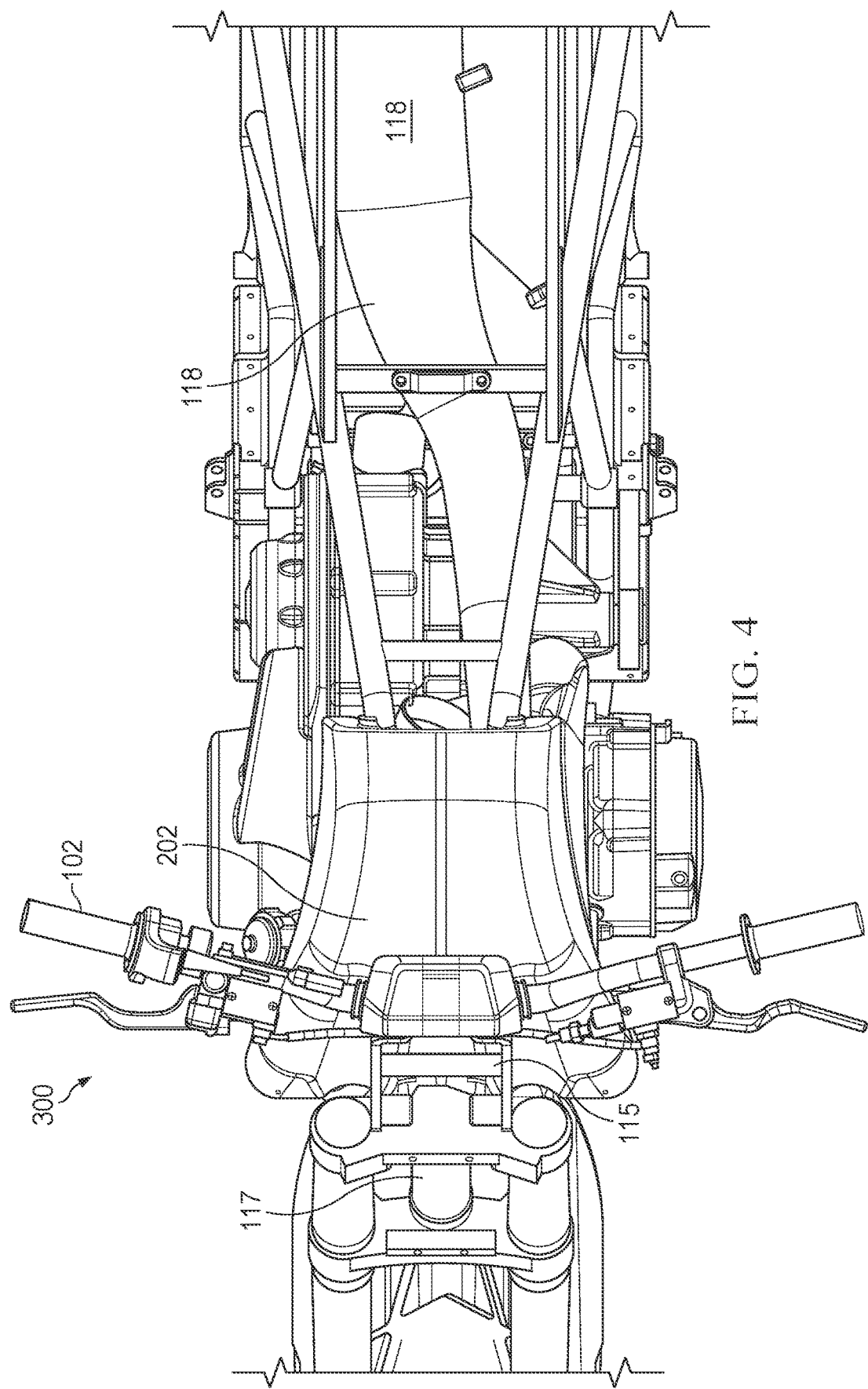

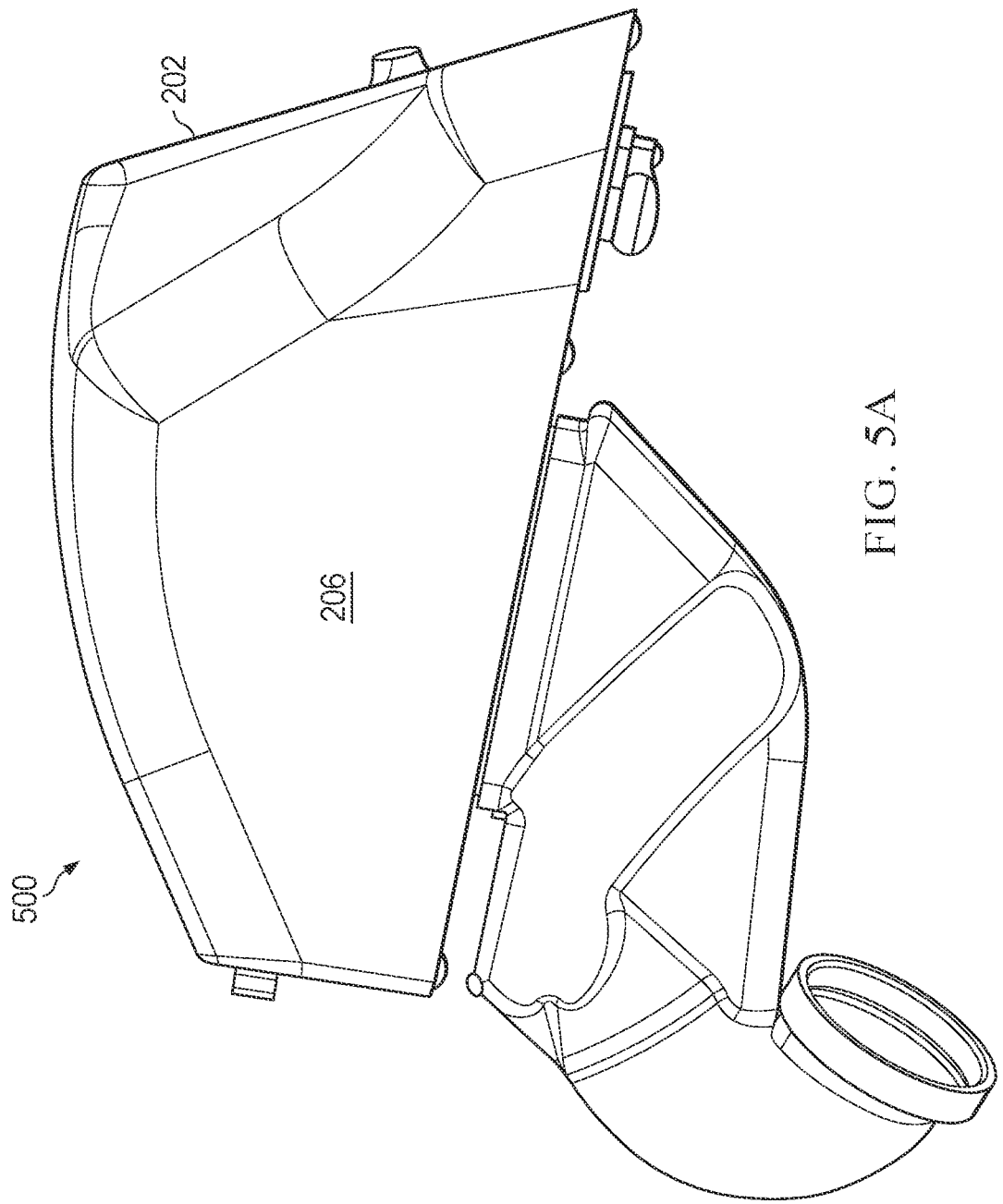

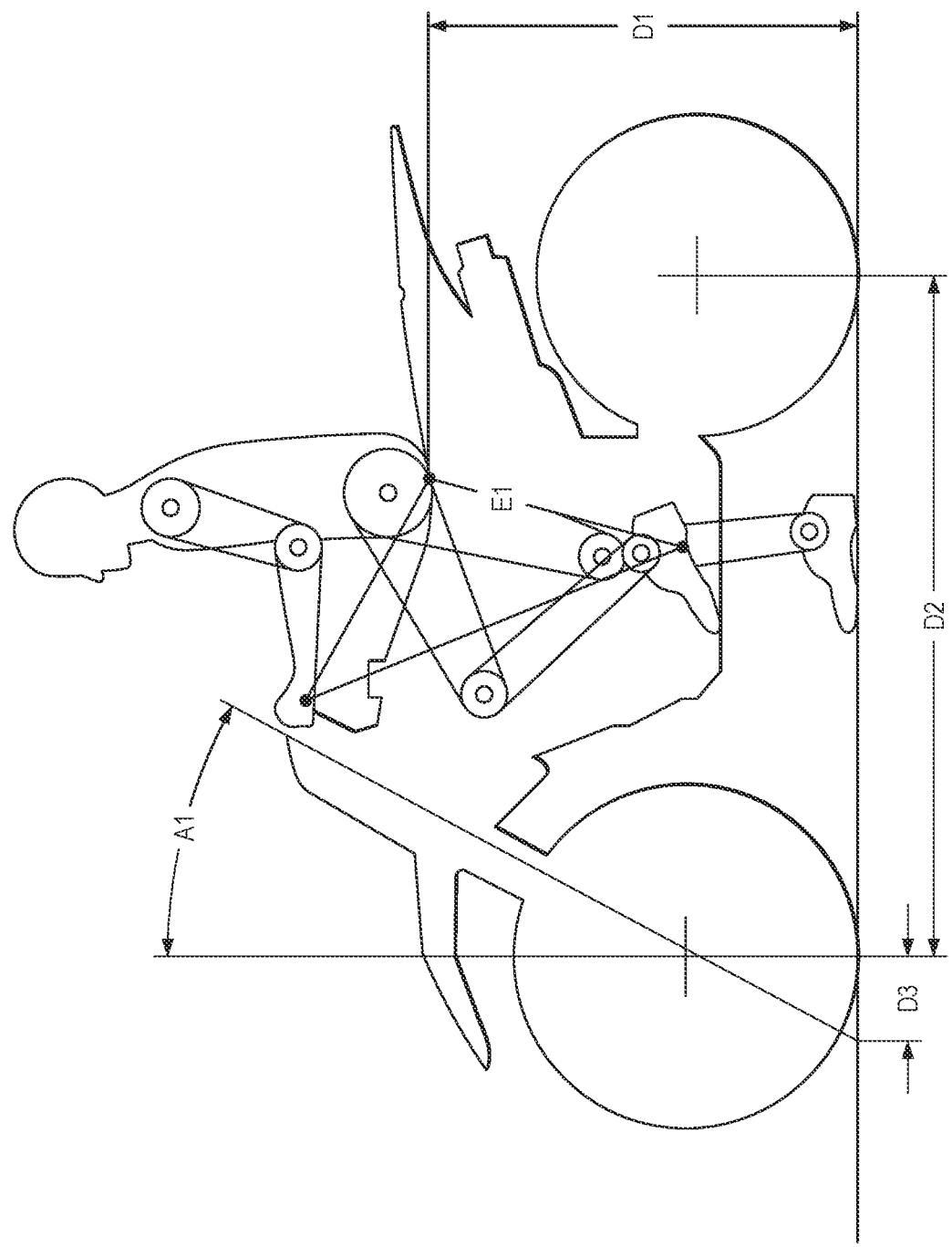

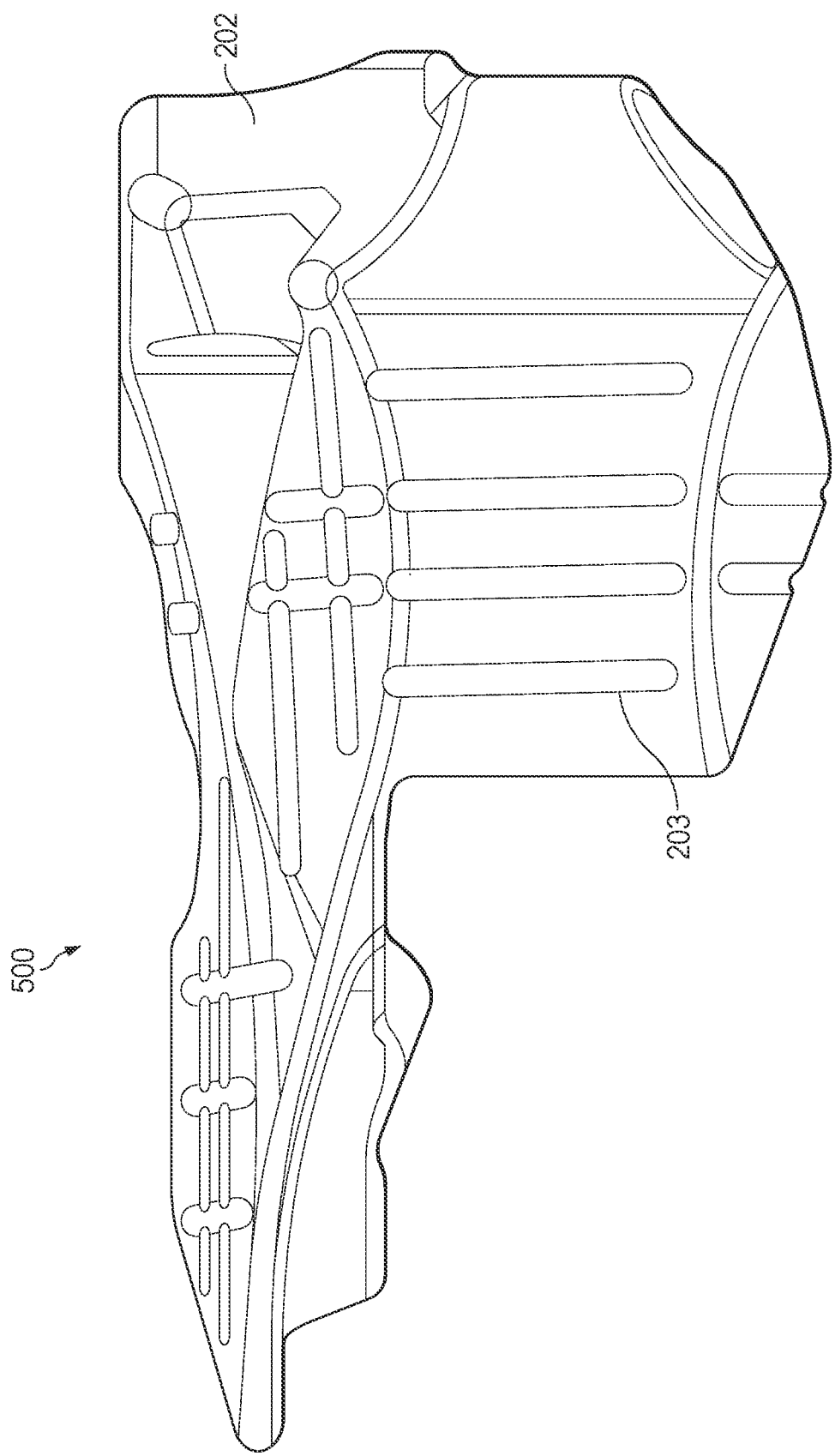

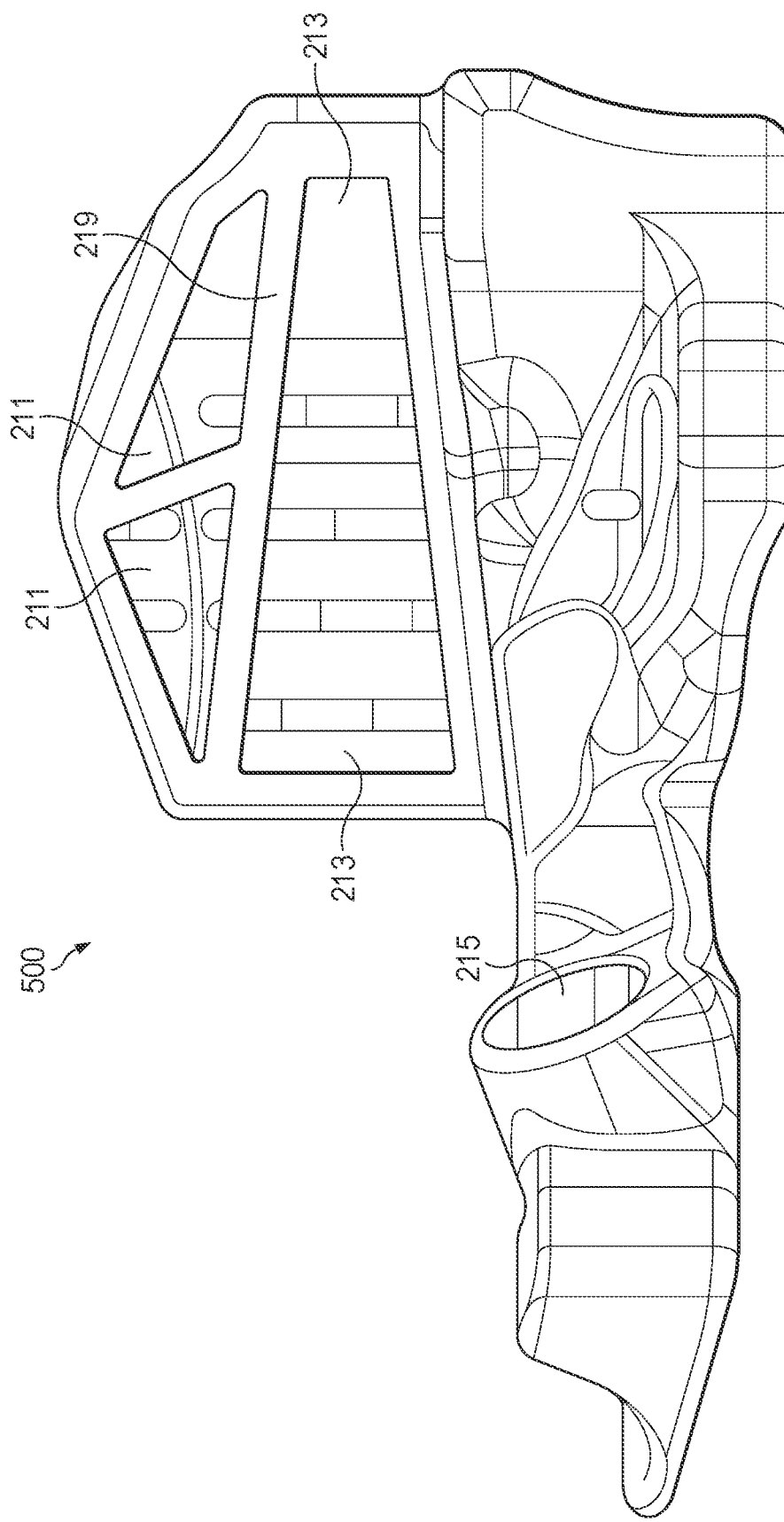

SNOW VEHICLE

CROSS REFERENCE TO RELATED APPLICATIONS

This application is a Continuation of U.S. application Ser. No. 16/875,823, filed May 15, 2020, which is a Continuation-In-Part of U.S. application Ser. No. 16/192,200, titled "SNOW VEHICLE," filed Nov. 15, 2018, which application claims the benefit of and priority to U.S. Provisional Application No. 62/586,559, filed Nov. 15, 2017. A claim of priority is made to the aforementioned applications.

BACKGROUND

In addition to traditional snowmobiles, an alternative snow vehicle is the snow bike or snow cycle. These vehicles are generally smaller and lighter than snowmobiles. Snow cycle designs are typically based upon off-road motorcycles with the front wheel replaced by a ski and the rear wheel replaced by an endless loop traction belt, commonly called a track. Snow bikes typically have a single steering ski and a relatively narrow track located behind and in line with the single ski.

SUMMARY

Embodiments of the present disclosure describe a snow vehicle including an engine mounted on a frame, a drive track in contact with the frame, a drive train operatively interconnecting the engine with the drive track for delivering propulsive power to the drive track, a fork connected to the frame, one or more skis connected to the fork, a drop fork component positioned between a fork and handlebars, and an exhaust system. The drive train includes a continuously variable transmission (CVT) positioned within a CVT housing.

Embodiments also describe a snow vehicle including an engine mounted on a frame, a drive track in contact with the frame, a drive train operatively interconnecting the engine with the drive track for delivering propulsive power to the drive track, a disc brake in contact with the drive train and positioned in a top-mount configuration, and an engine air intake system positioned above the engine. The air intake system includes a rearward positioned air intake port.

Embodiments describe a snow vehicle including an engine mounted on a frame, a drive track in contact with the frame, a drive train operatively interconnecting the engine with the drive track for delivering propulsive power to the drive track, a disc brake in contact with the drive train and positioned in a top-mount configuration, and an engine air intake system positioned above the engine. The air intake system includes a rearward positioned air intake port; and wherein the drive train includes a CVT.

BRIEF DESCRIPTION OF DRAWINGS

This written disclosure describes illustrative embodiments that are non-limiting and non-exhaustive. Reference is made to illustrative embodiments that are depicted in the figures, in which:

FIG. 4 illustrates a partial top-down view 300 of a snow vehicle with air intake system, according to some embodiments.

FIG. 5A illustrates a perspective view 500 of an air intake system, according to some embodiments.

FIG. 20A illustrates a user or rider positioning on a dirt bike and in a snow vehicle, according to some embodiments.

FIG. 25A illustrates a perspective view 500 of an air intake system, according to some embodiments.

FIG. 25C illustrates a perspective view 500 of an air intake system, according to some embodiments.

DETAILED DESCRIPTION

Snow vehicles, such as snow bikes, are often created as modifications or kits of off-road motorcycles or dirt bikes. The front wheel is temporarily replaced by a ski and the rear wheel by a power track for gripping snow and ice. Such vehicles exceed noise and safety regulations and are therefore often restricted to use on closed courses. In snow vehicle applications, reducing the weight of individual components and overall vehicle weight, without sacrificing durability, function or utility, is an ongoing goal in product design. A lighter vehicle can increase performance and handling, among other characteristics. Embodiments of the present disclosure describe a purpose-built snow vehicle with numerous advantages over current snow vehicles and snow bike kits. Embodiments herein describe a snow vehicle utilizing a continuously variable transmission (CVT) with an air handling system. The snow vehicle includes an exhaust system positioned entirely within the chassis and tunnel of the vehicle, to prevent any contact with a user or their clothing. The snow vehicle further includes a lower center of gravity in the positioning of the vehicle components within the purpose-built frame. The engine is positioned lower and forward, and additional weight, such as one or more gas tanks are further positioned to create the optimal center of gravity for handling and balance. The engine and transmission provide for both forward and reverse gearing.

Embodiments herein describe a dropped fork component that creates a lower weight of the vehicle and additional adjustment of the handlebars. An engine air handling system provides a rear facing air intake for the engine. The purpose-built chassis or frame allows for greater space utilization and a lower center of gravity of the vehicle.

Figure 1:
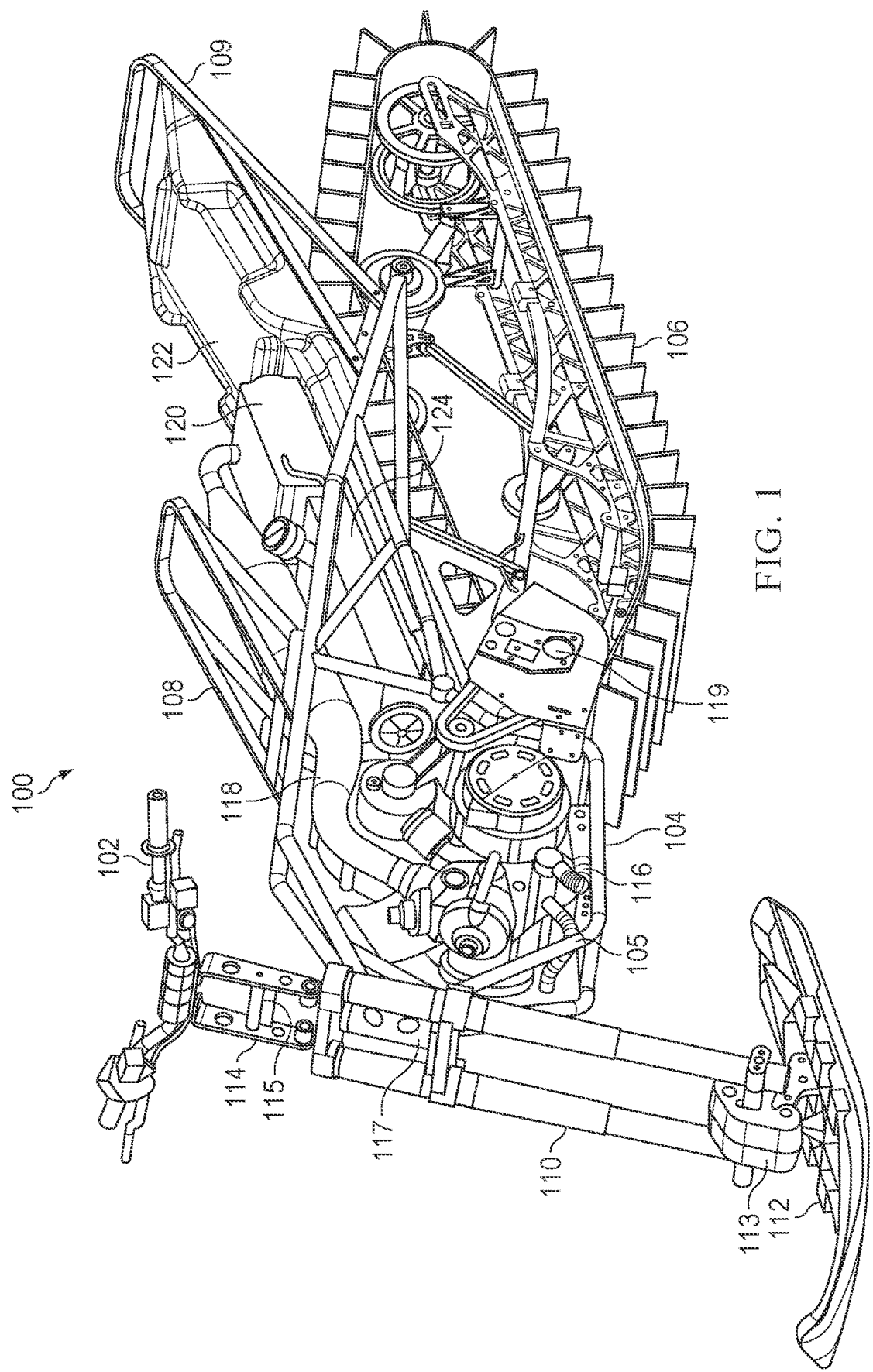
FIG. 1 illustrates a perspective view 100 of a snow vehicle, according to some embodiments.

Referring to FIG. 1, a perspective view 100 of a snow vehicle is shown, according to some embodiments. A chassis or frame 104 supports an engine 116, drive train components, a drive track 106, handlebars 102 and one or more skis 112. The chassis includes a seat frame 108, lower front frame component 105, and integrated bumper 109. Exhaust system 118 connects to muffler 120. The chassis 104 connects to a fork 110, in contact with the one or more skis 112. A fork foot 113 is in contact with the fork 110 and one or more skis 112. The fork foot 113 often mimics the radius of a motorcycle front tire in conversion kits. A drop fork component 114 connects the fork 110 and handlebars 102. Fuel tank 124 is positioned beneath the exhaust system 118 and seat frame 108. Tunnel shroud 122 is positioned in contact with the chassis 104 and above the drive track 106. The track width can be about 10 inches to about 12 inches, about 12 inches to about 13 inches, about 12.5 inches, about 13.5 inches, or about 14 inches wide. A foot peg attachment 119 can be positioned near an exterior surface. Examples of drive track 106 and other embodiments can be found in co-owned U.S. Pat. No. 9,321,509, filed on Dec. 17, 2013 with first named inventor Andrew Beavis and entitled "Snowmobile Skid Frame Assembly", the contents of which are incorporated herein by reference.

Figure 3:
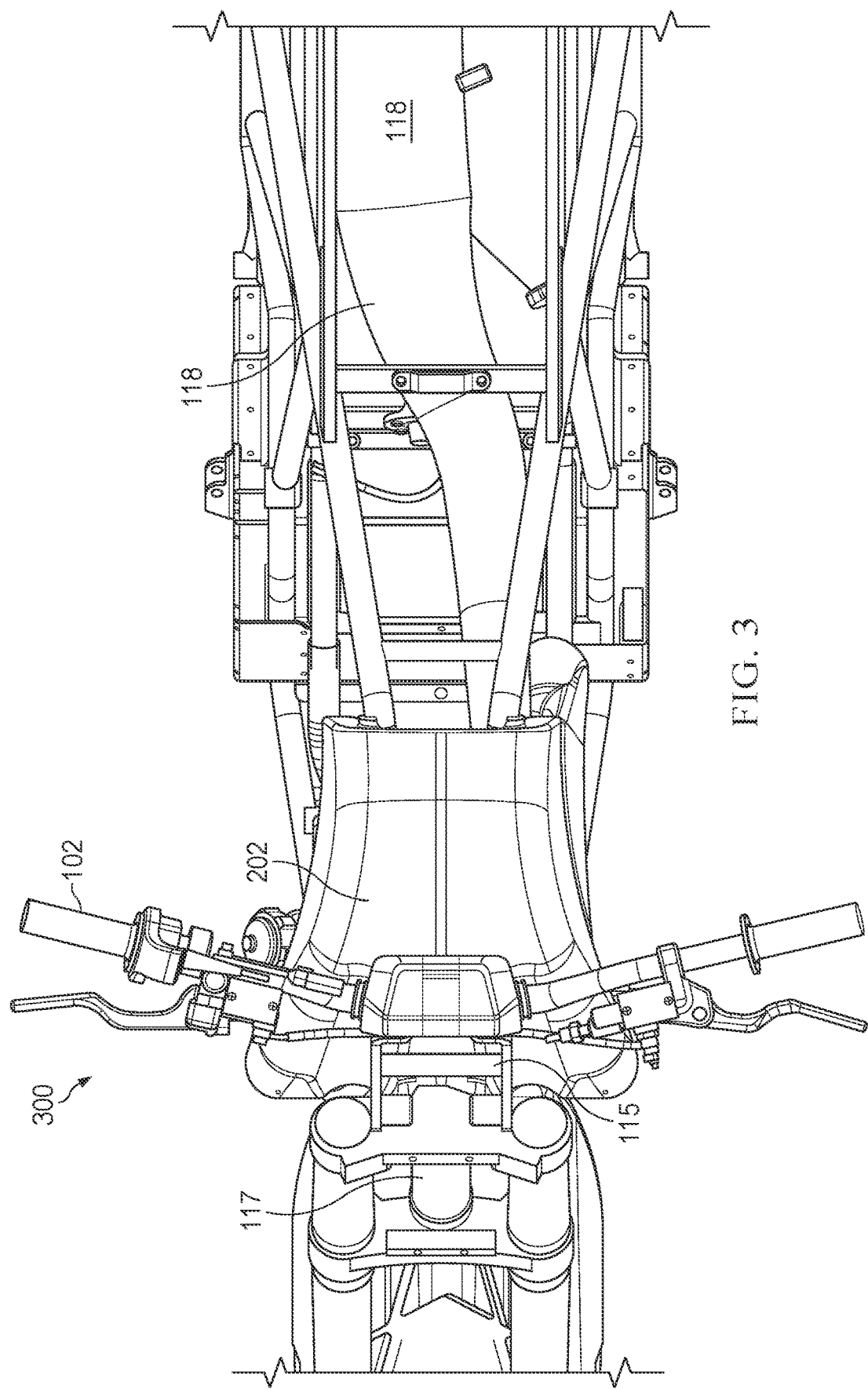
FIG. 3 illustrates a partial top-down view 300 of a snow vehicle with air intake system (engine removed), according to some embodiments.
Figure 5B:
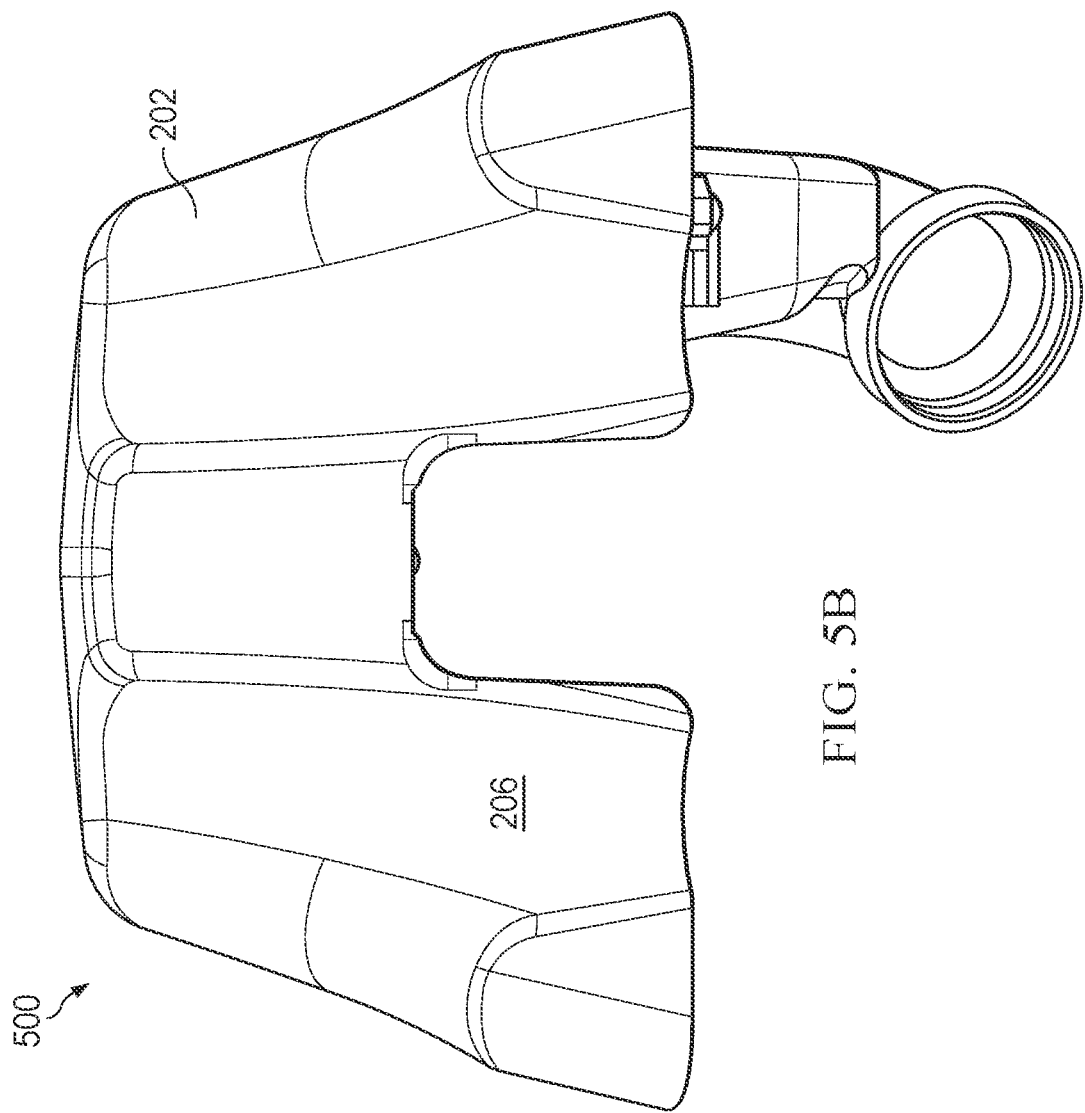
FIG. 5B illustrates a perspective view 500 of an air intake system, according to some embodiments.
Figure 5C:
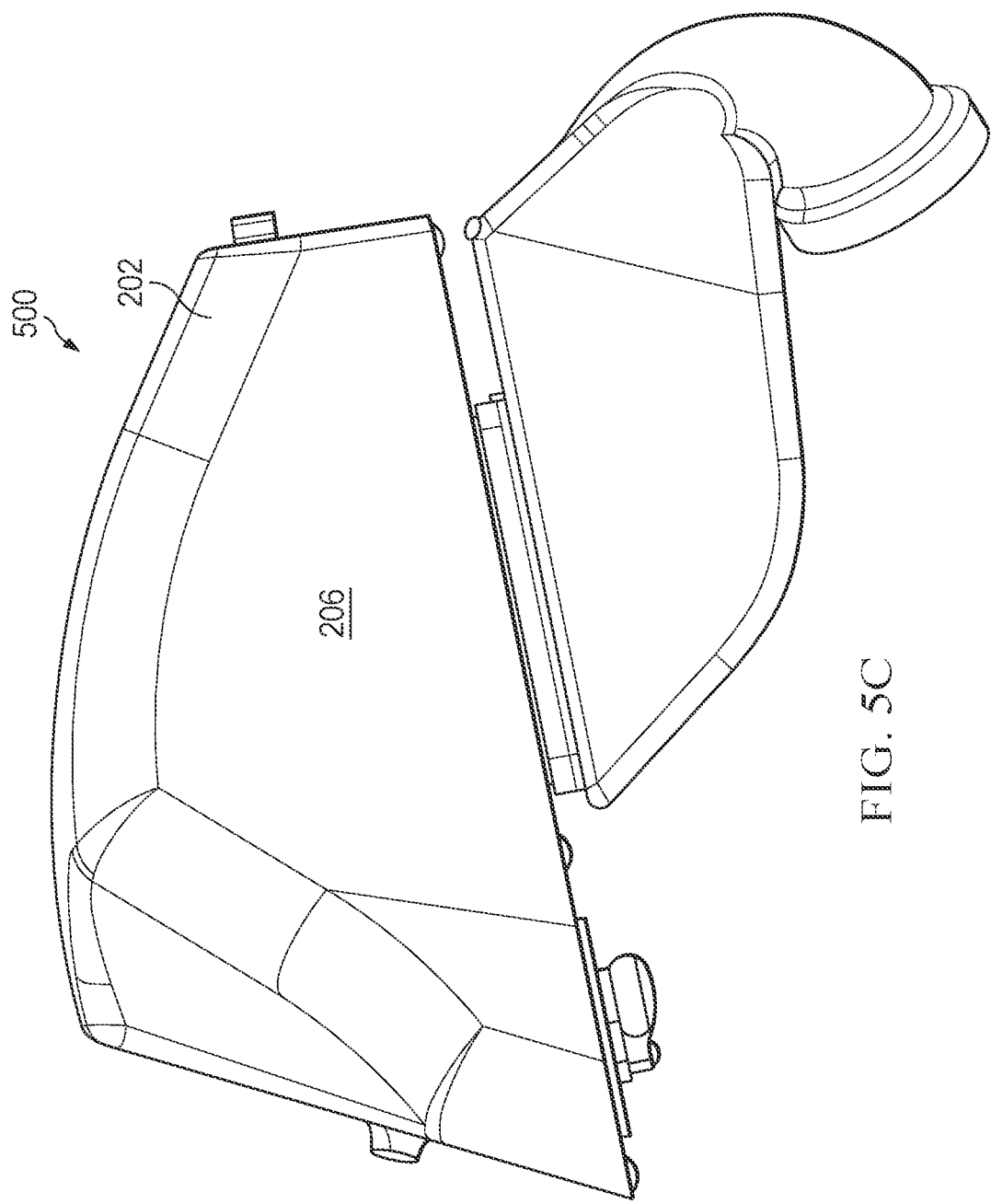
FIG. 5C illustrates a perspective view 500 of an air intake system, according to some embodiments.
Figure 5D:
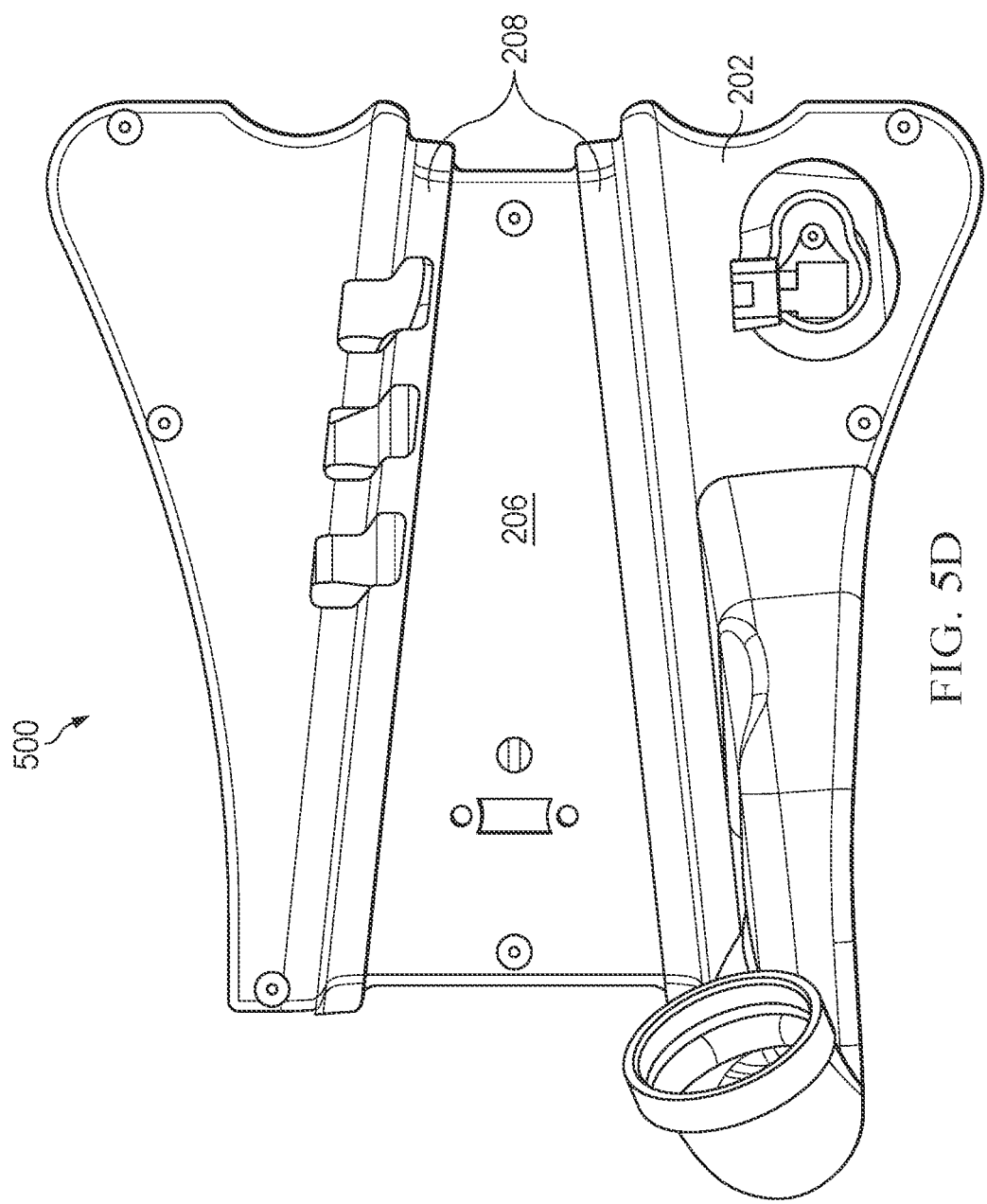
FIG. 5D illustrates a perspective view 500 of an air intake system, according to some embodiments.

In some embodiments, the exhaust system 118 is positioned completely within the tunnel and frame 104 of the vehicle. By rotating the position of the engine 116 one hundred eighty degrees from a typical snowmobile or motorcycle configuration, the exhaust port faces a rearward direction. The exhaust system 118 can then be contained in a substantially linear configuration towards the rear of the vehicle and into a muffler 120. The muffler 120 can also be contained within an interior of the frame 104. The exhaust then exits the rear of the vehicle. By positioning the exhaust system 118 completely within the frame 104 and tunnel of the vehicle, a user is protected from incidental contact on the hot surface of the exhaust system 118. A partial top-down view of a snow vehicle is shown in FIG. 3, in which exhaust system 118 runs within the width of the frame 104.

Figure 2:
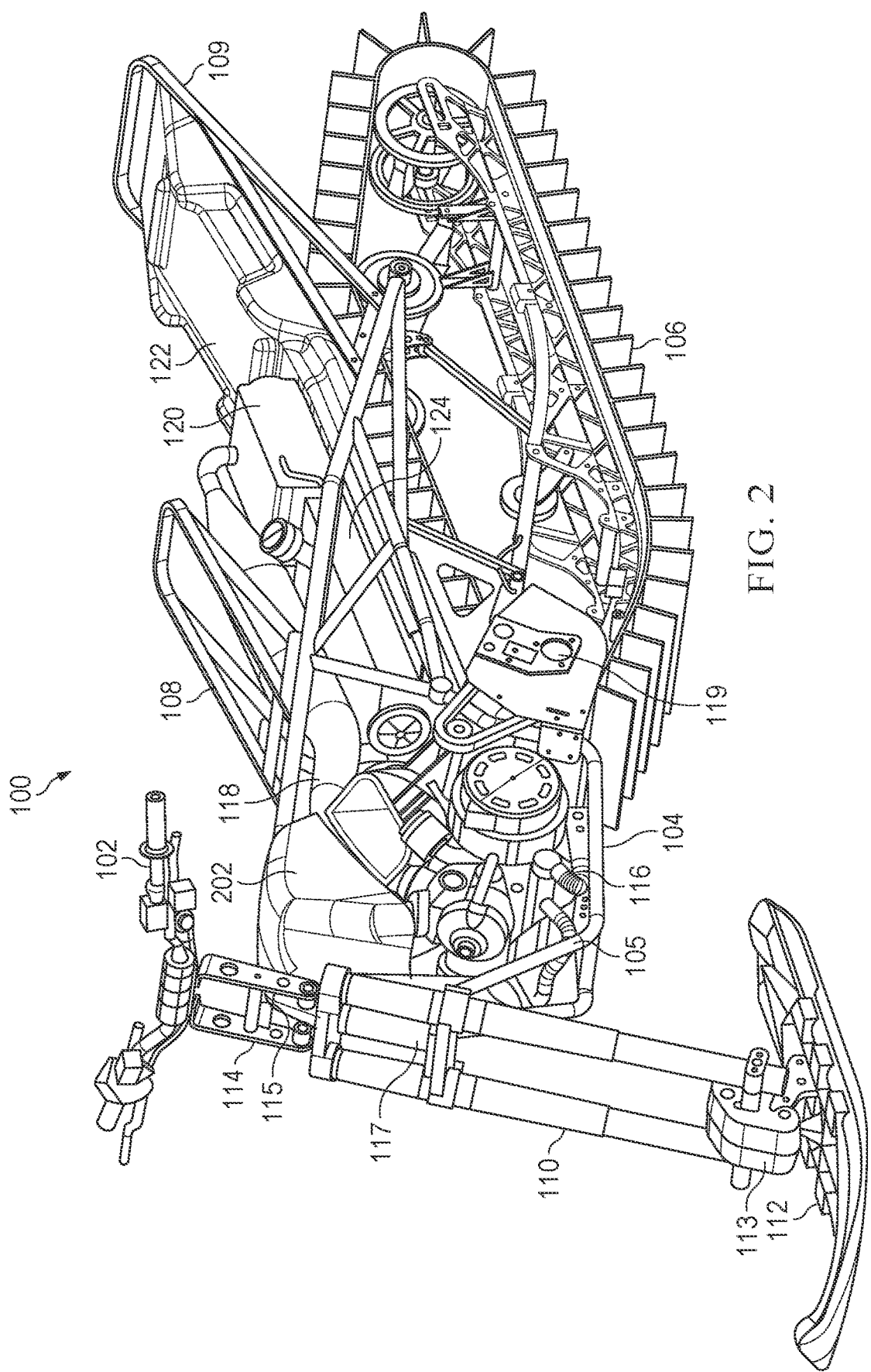
FIG. 2 illustrates a perspective view 100 of a snow vehicle with air intake system, according to some embodiments.

FIG. 2 additionally shows engine air intake system 202, according to some embodiments. The air intake system 202 is positioned above the motor and can be attached to frame 104 or integrated with the frame 104. Shown in FIGS. 3-4 in a partial top-down view 300, the air handling system 202 encloses the frame 104 as the tube chassis runs through the box and supports its efficient placement and space utilization. The air handling system 202 can alternatively be positioned under the frame 104.

Figure 6:
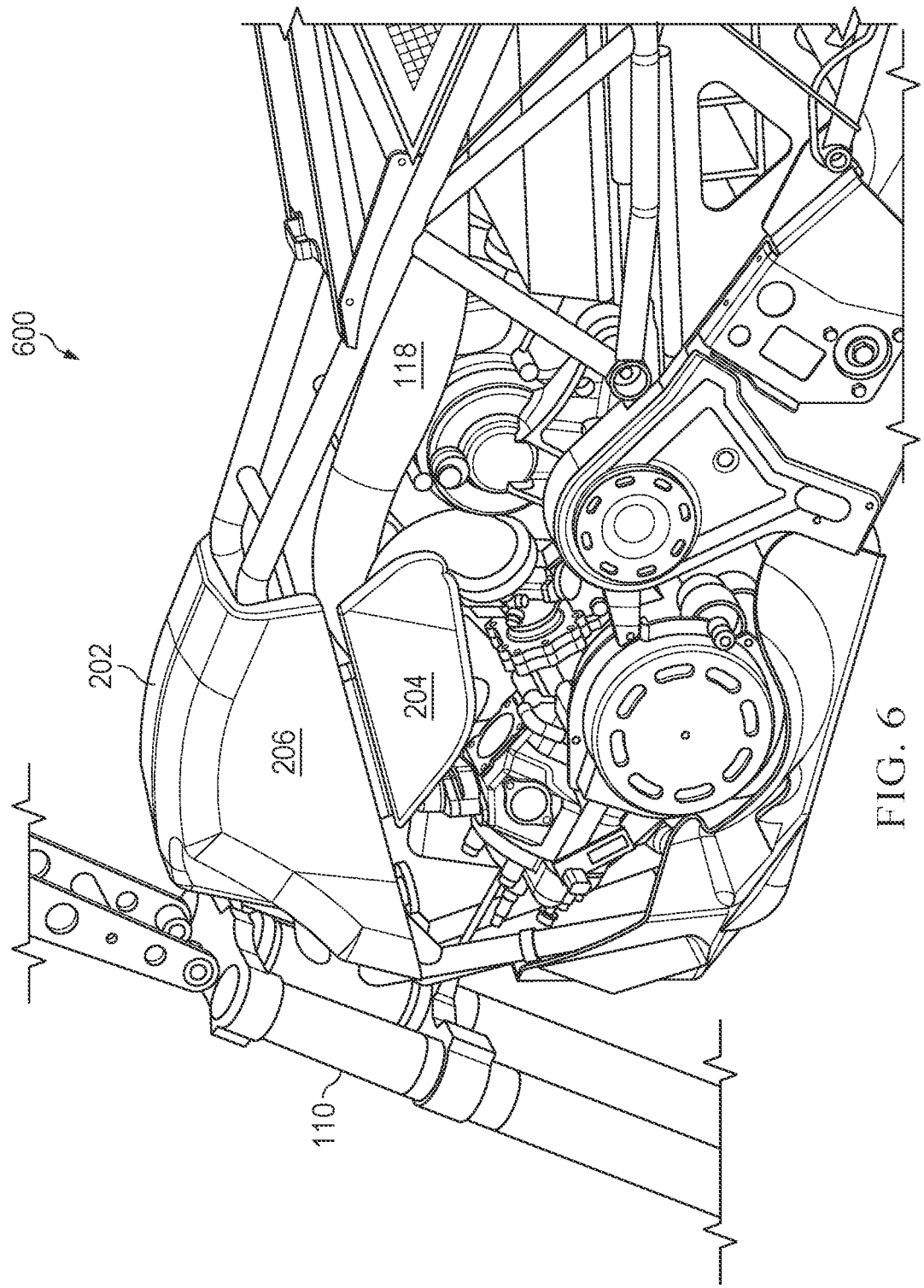
FIG. 6 illustrates a partial side view 600 of a snow vehicle with air intake system, according to some embodiments.

Referring to FIGS. 5A-5D, perspective views 500 of the air intake system 202 components are shown, according to some embodiments. The air box 206 collects and funnels air as the vehicle moves. The size and position of the air box allows for a sufficient volume of air to be collected and move through the system 202 to the engine. Once collected in box 202, the air then travels through channel component 204 to the engine 116 (see view 600 of FIG. 6). Frame channels 208 can be positioned or formed on an interior or exterior surface for attachment or integration with the frame 104.

Figure 7:
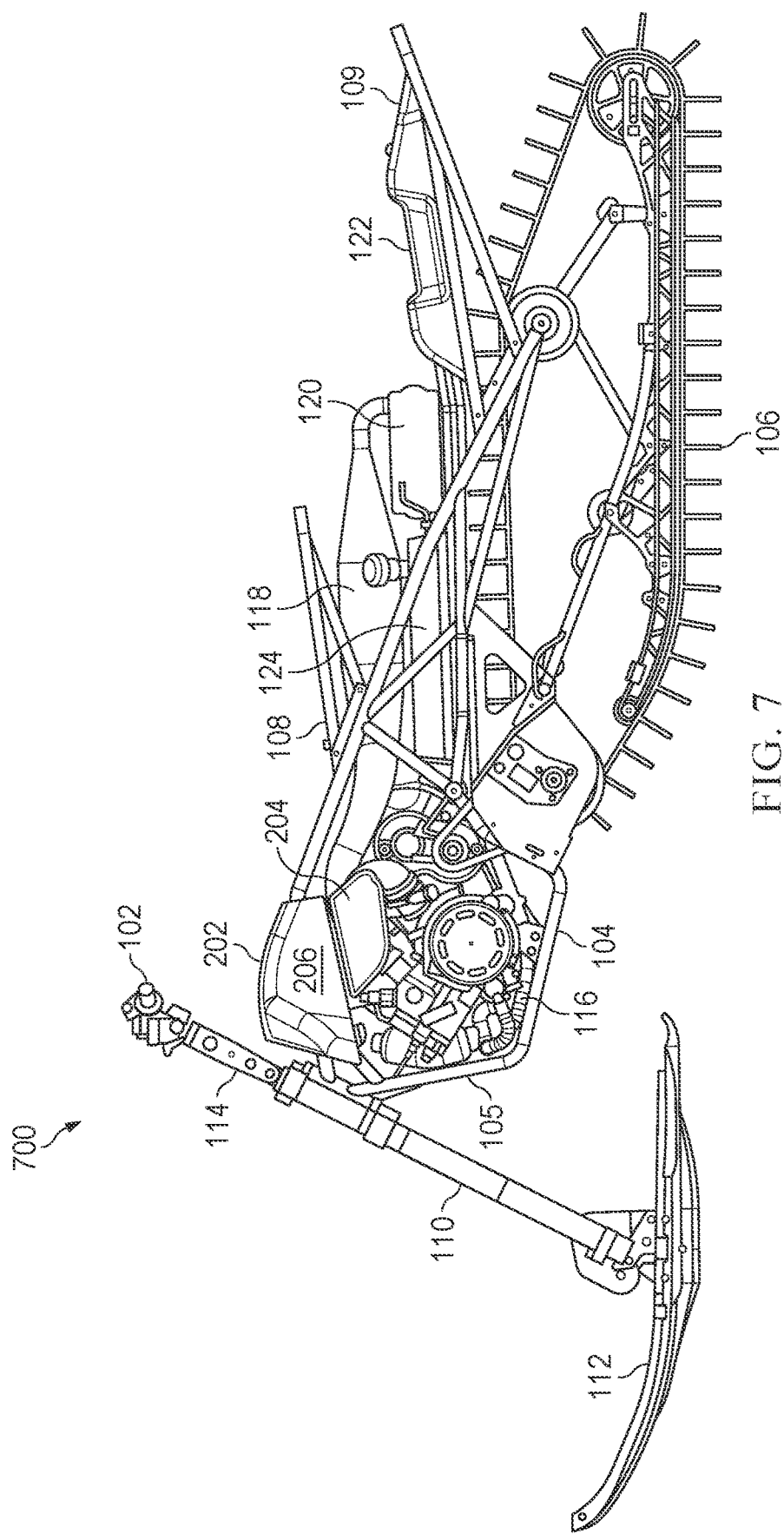
FIG. 7 illustrates a side view 700 of a snow vehicle, according to some embodiments.
Figure 20B:
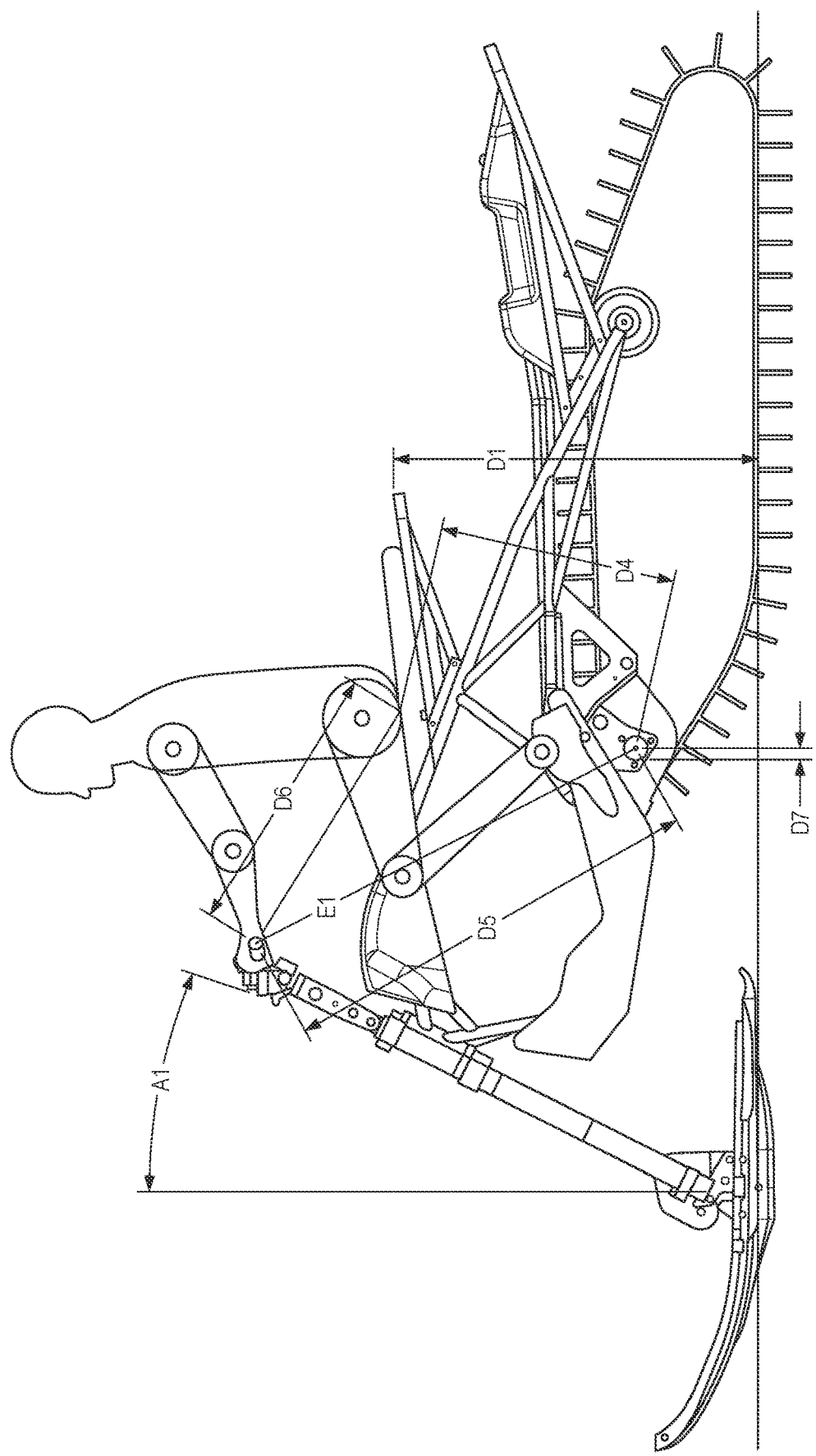
FIG. 20B illustrates a user or rider positioning on a dirt bike and in a snow vehicle, according to some embodiments.
Figure 20C:
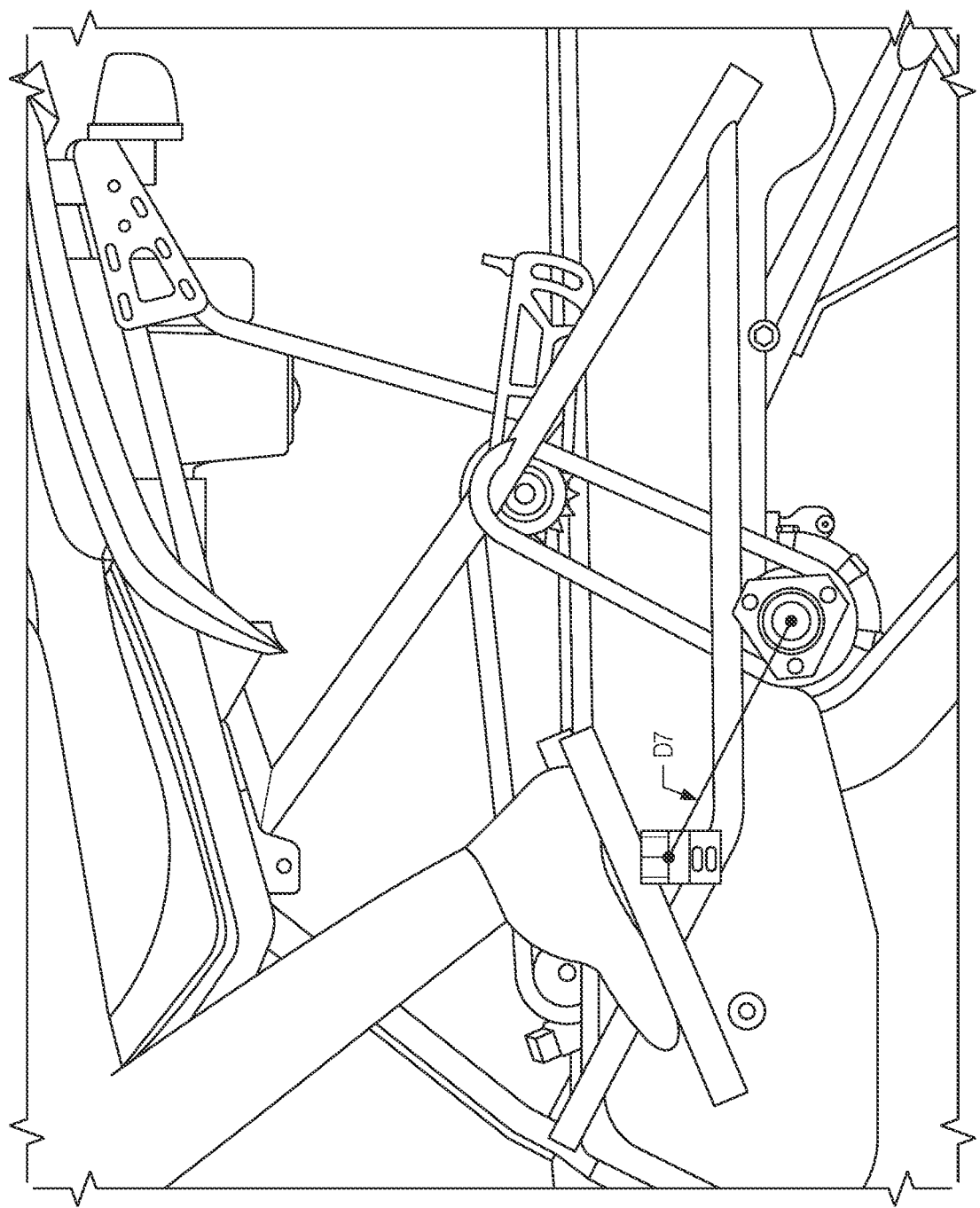
FIG. 20C illustrates a user or rider positioning on a dirt bike and in a snow vehicle, according to some embodiments.

Referring to FIG. 7, a side view 700 of a snow vehicle is shown, according to some embodiments. The frame 104 can be comprised of a tube chassis that maximizes the position of vehicle components for space utilization and weight reduction. As the snow vehicle is not a kit for motorcycles, the engine 116 can be positioned much lower and forward as any consideration for the position of a wheel is not needed. The lower front frame component 105 can be much closer to fork 110 than in traditional snow bike configurations. A traditional motorcycle user or rider posture is show in FIG. 20A. The ergonomic position E1 is shown between foot peg, seat and handlebars. The angle A1 may be between about 27-30 degrees. D1 distance is about 29 inches in this example. D2 is about 48 inches and D3 about 3.2 inches. In one embodiment of the snow vehicle of the present disclosure (see FIG. 20B), a similar ergonomic position E1 is achieved. Hence, the rider or user is positioned in a similar manner with a user of a dirt bike. This differentiates from the position of a traditional snowmobile. In FIG. 20B, angle A1 can be about 24 to about 30 degrees, about 26 to about 28 degrees, or about 26.5 to about 27.5 degrees. D1 distance can be about 26 inches to about 37 inches. D1 can be about 28 inches to about 34 inches, or about 30 inches to about 33 inches for example. D6 can be about 19 inches to about 30 inches, about 22 inches to about 28 inches, or about 24 to about 26 inches. D4 can be about 15 inches to about 24 inches, about 17 inches to about 22 inches, or about 18 to about 20 inches. D5 can be about 28 inches to about 42 inches, about 32 inches to about 38 inches or about 34 inches to about 36 inches. D7 measures the distance between foot peg and track/drive shaft. Embodiments of the present invention allow for a smaller distance between the two components, as the engine 116 is positioned more forward. The track/drive shaft can even be positioned more forward than the foot peg. In motorcycles and snow kits of motorcycles, the track/drive shaft is typically about 6 to about 8 inches behind the foot peg (see D7 of FIG. 20C). In FIG. 20B, the distance D7 can be about zero inches to about 1 inch positive (foot peg ahead of the drive shaft), or about zero inches to about 1 inch negative (drive shaft ahead of the foot peg), about 2 inches positive to about 2 inches negative, about 3 inches positive to about 3 inches negative, or about 4 inches positive to about 4 inches negative.

Additionally, the frame 104 includes integrated or attached bumper 109. If attached, the bumper 109 can be bolted, welded, or otherwise fastened. If integrated, the bumper 109 can be of a continuous construction with the frame 104. The bumper 109 can connect to the shroud 122 or be separated from shroud 122. The bumper 109 can optionally support the shroud 122 at one or more connection points. As the bumper 109 is part of frame 104 or connected to frame 104, the need for a structural tunnel shroud is removed as the bumper does not need to connect to the tunnel shroud. Current shroud 122 can be made of plastic or lightweight aluminum to further reduce weight of the vehicle. The placement of the engine 116 in a forward and lower configuration advantageously moves the center of gravity of the vehicle in a lower position. The position of the one or more fuel tanks 124 further supports the lower center of gravity.

Because the frame 104 is purpose-built to for this vehicle, the size and length of the fork 110 can be reduced. The frame 104 can connect with fork 110 at a lower position. The connection between frame 104 and fork 110 can be gusset bracket 117. The gusset bracket 117 can transfer and distribute load throughout the frame 104. A drop fork component 114 can then be utilized to connect the fork 110 and handlebars 102. The drop fork component 114 is lighter than any corresponding length of fork 110 and can further be utilized for fore and aft handlebar adjustment and rotational adjustment for the user. The drop fork component 114 can include support components 115, such as a cross brace. The drop fork component 114 can be manufactured of light weight, but durable materials, such as aluminum for example. The length of the drop fork component 114 can be about 8 inches, about 10 inches, or about 12 inches. The length of the drop fork component 114 can be about 6 inches to about 12 inches. The fork 110 can also include suspension components, such as dampeners, springs, coils, etc. The front suspension can be telescoping compression dampening component or rebound dampening component, for example.

Figure 8:
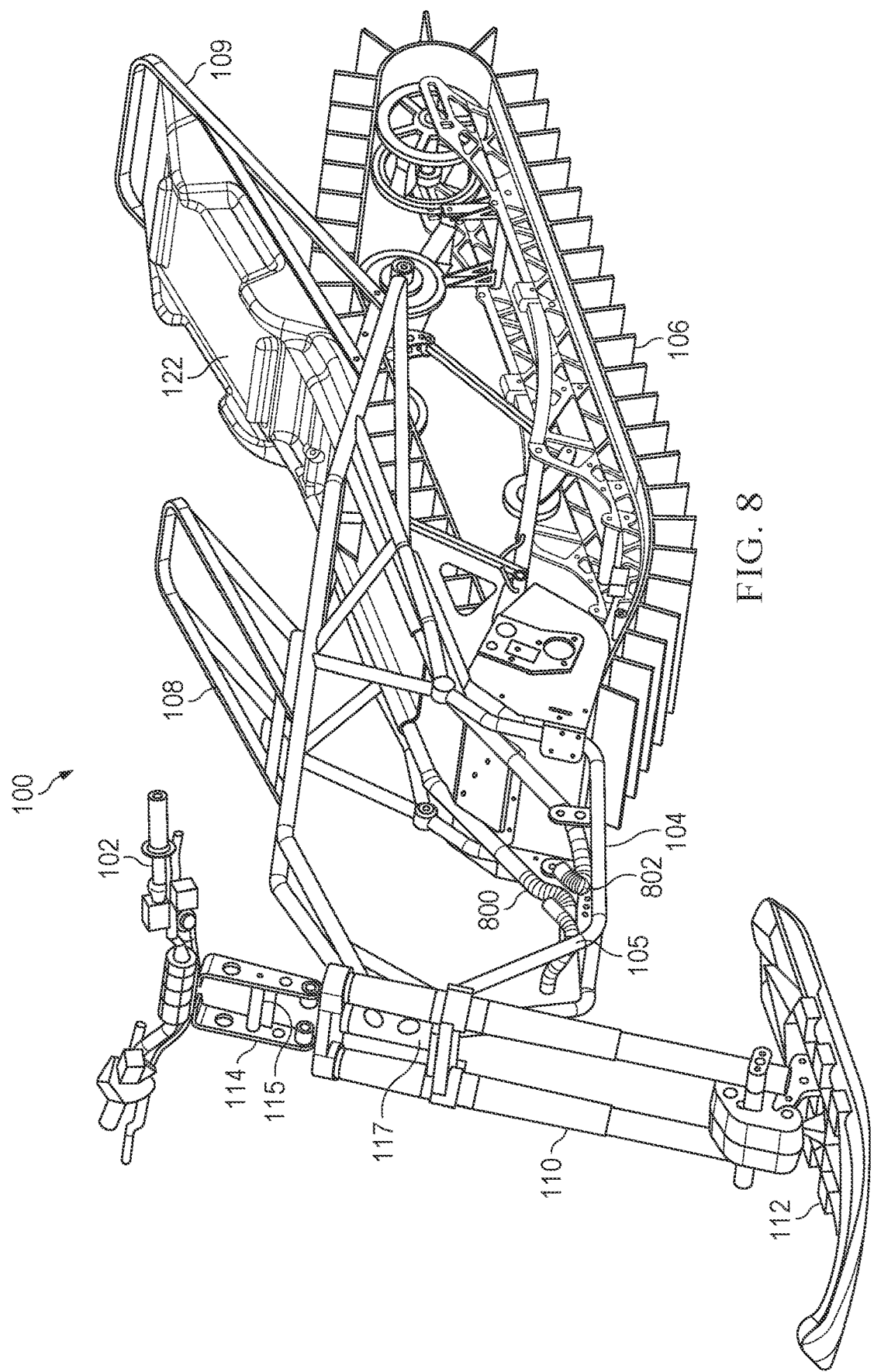
FIG. 8 illustrates a perspective view 100 of a snow vehicle with engine removed, according to some embodiments.
Figure 9:
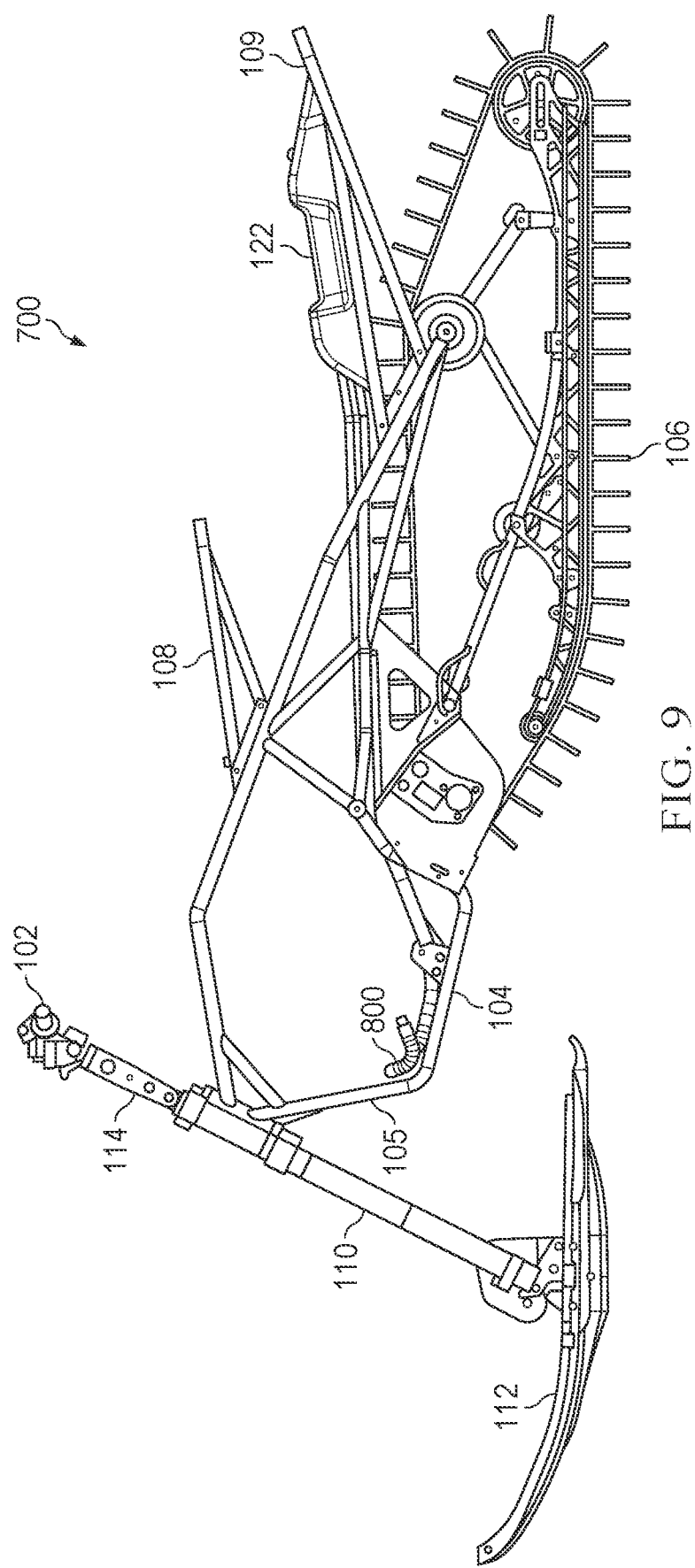
FIG. 9 illustrates a side view 700 of a snow vehicle with engine removed, according to some embodiments.
Figure 10:
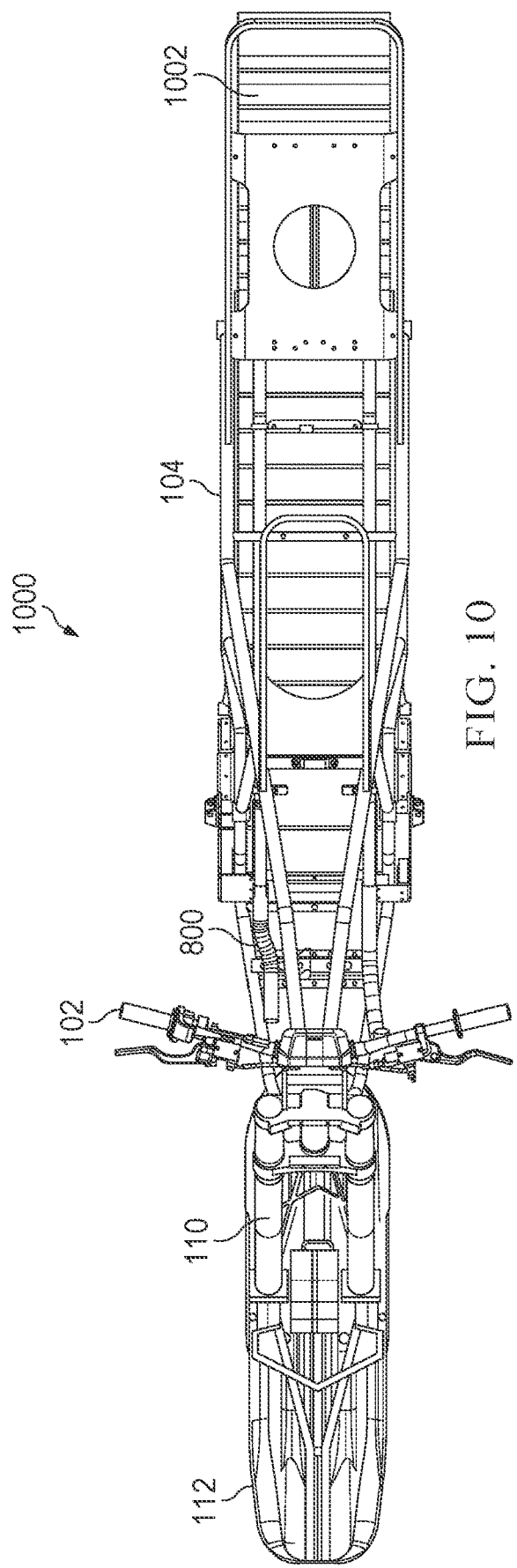
FIG. 10 illustrates a top-down view 1000 of a snow vehicle with cooling system, according to some embodiments.
Figure 11A:
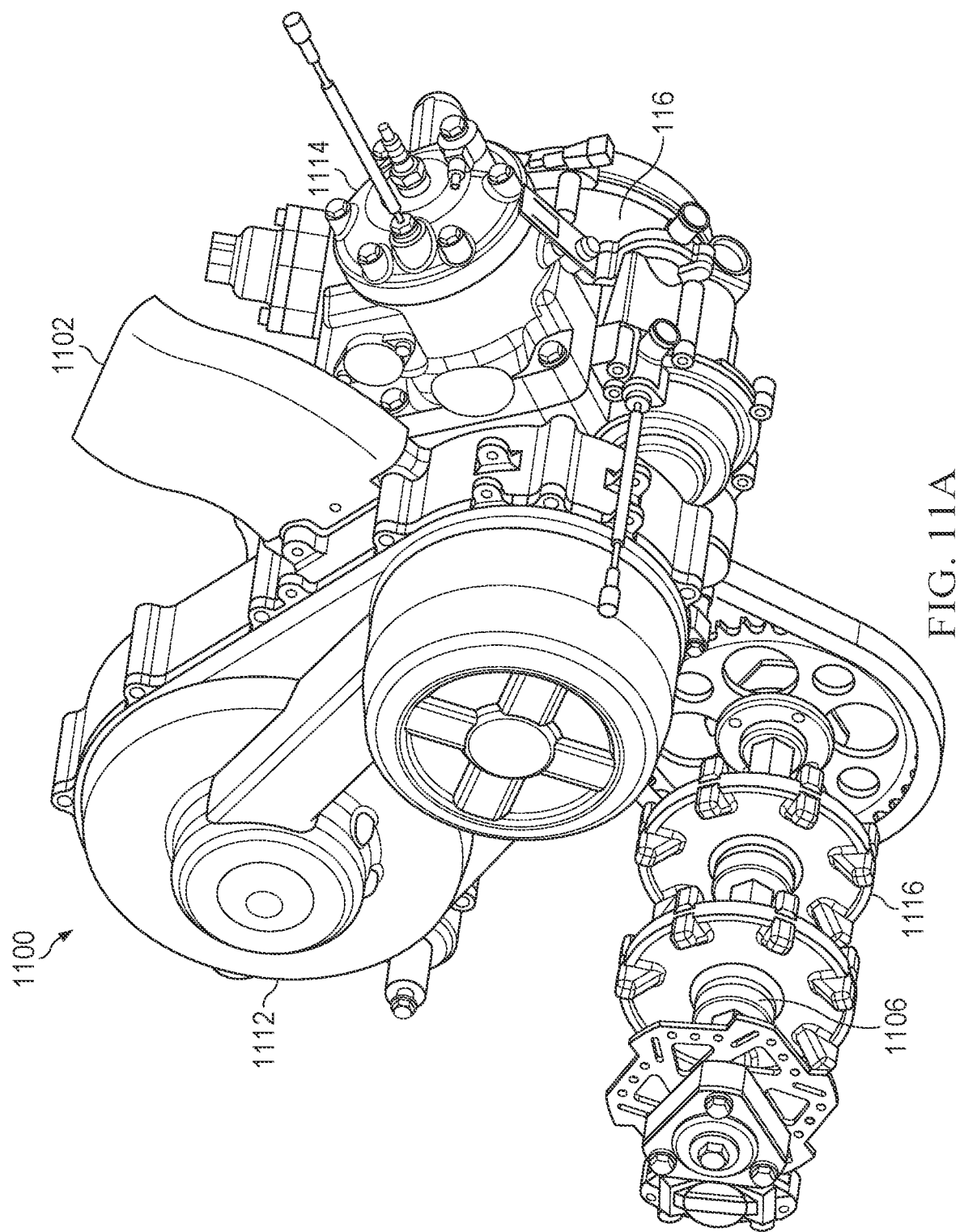
FIG. 11A illustrates a perspective view 1100 of power train components, according to some embodiments.
Figure 11B:
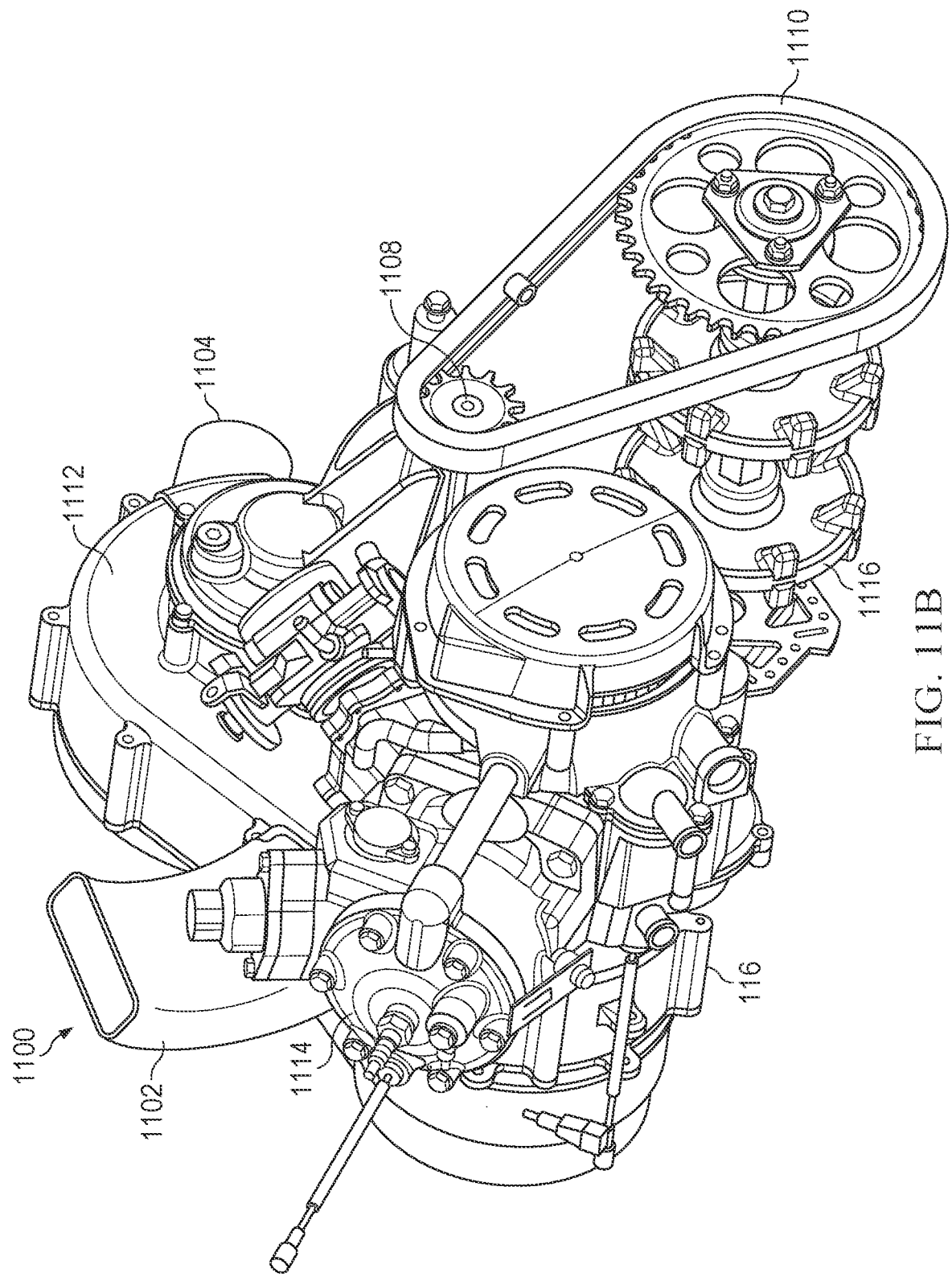
FIG. 11B illustrates a perspective view 1100 of power train components, according to some embodiments.
Figure 12A:
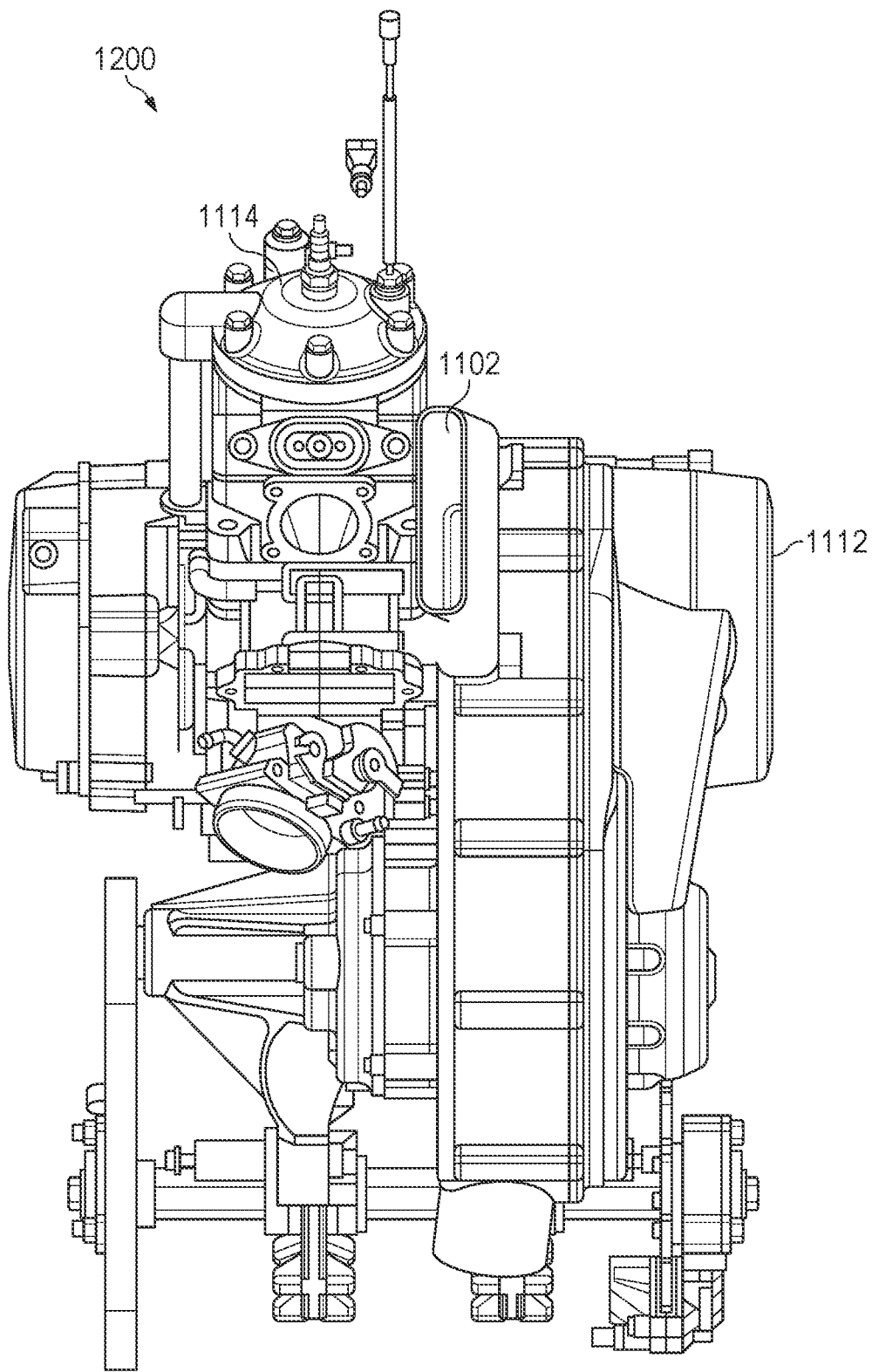
FIG. 12A illustrates a perspective view 1200 of power train components, according to some embodiments.
Figure 12B:
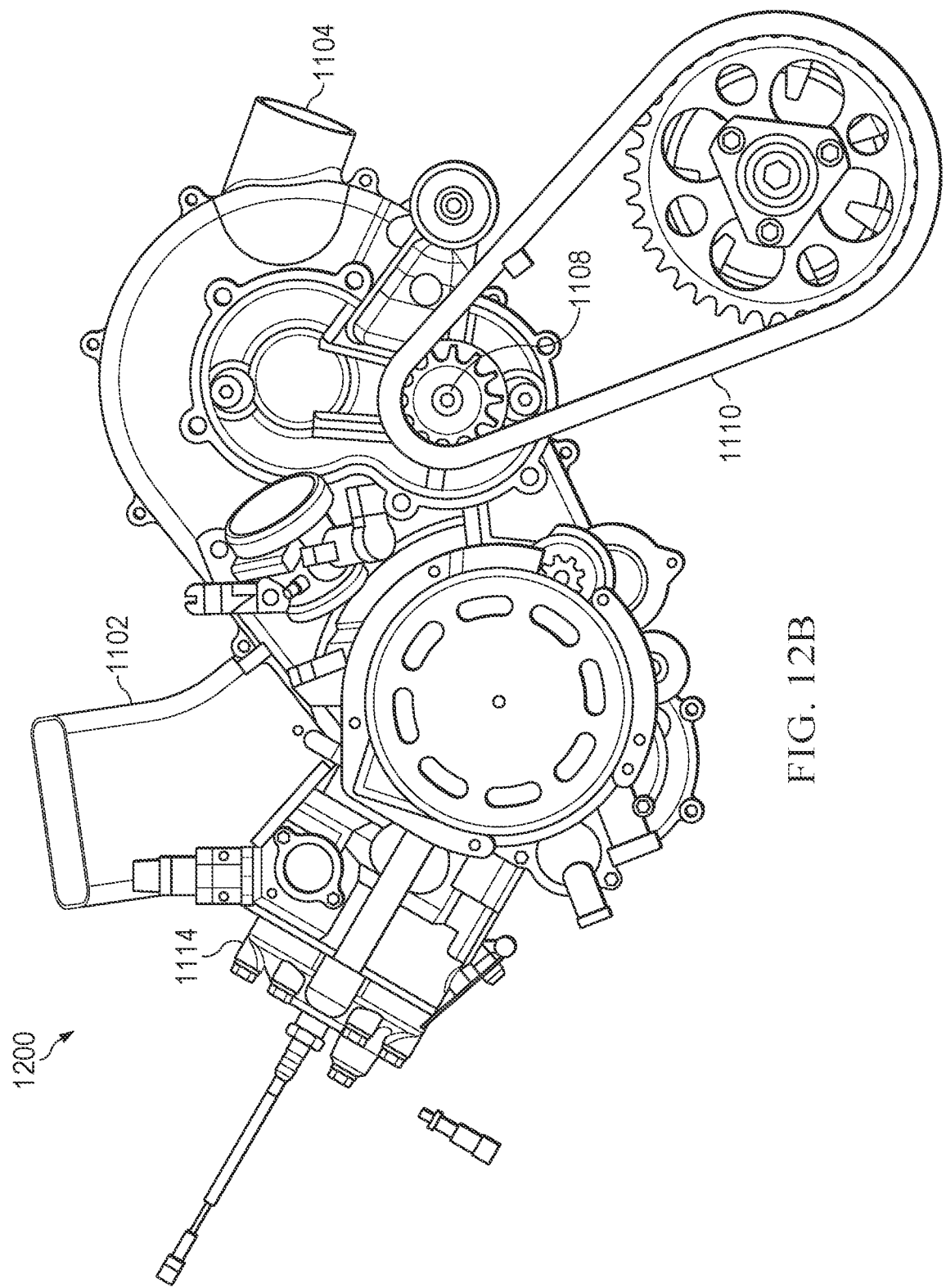
FIG. 12B illustrates a perspective view 1200 of power train components, according to some embodiments.
Figure 12C:
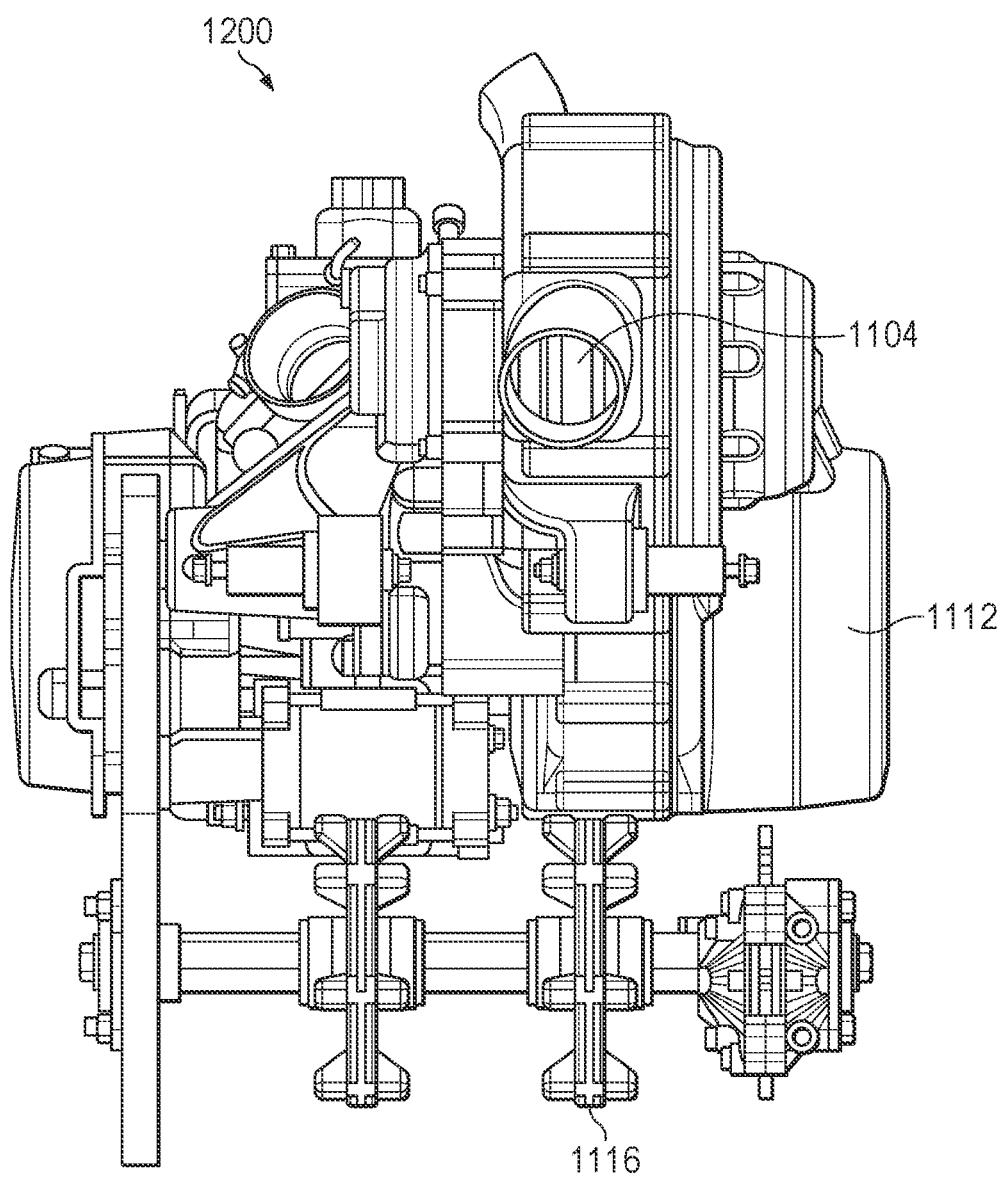
FIG. 12C illustrates a perspective view 1200 of power train components, according to some embodiments.
Figure 12D:
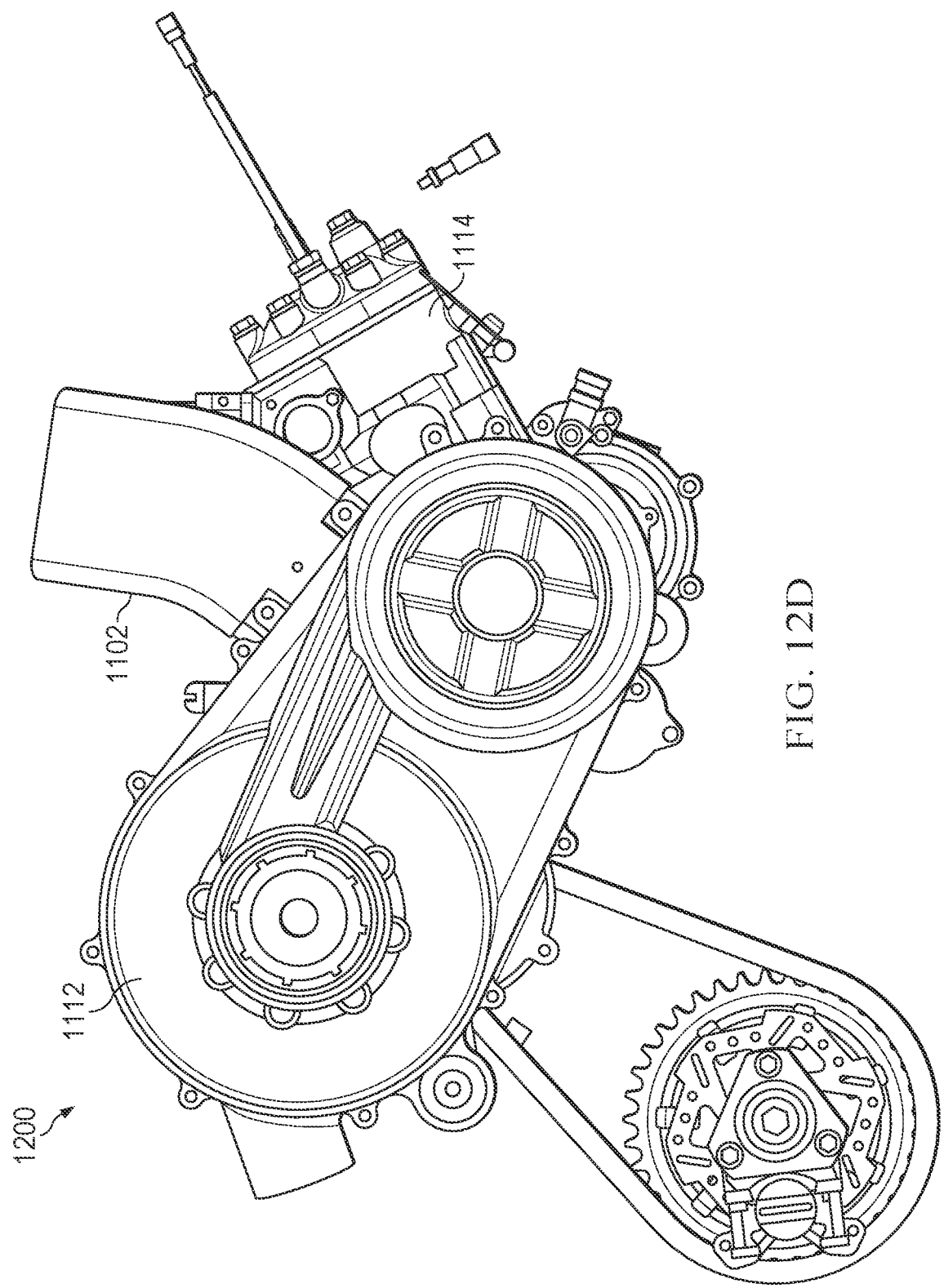
FIG. 12D illustrates a perspective view 1200 of power train components, according to some embodiments.
Figure 14:
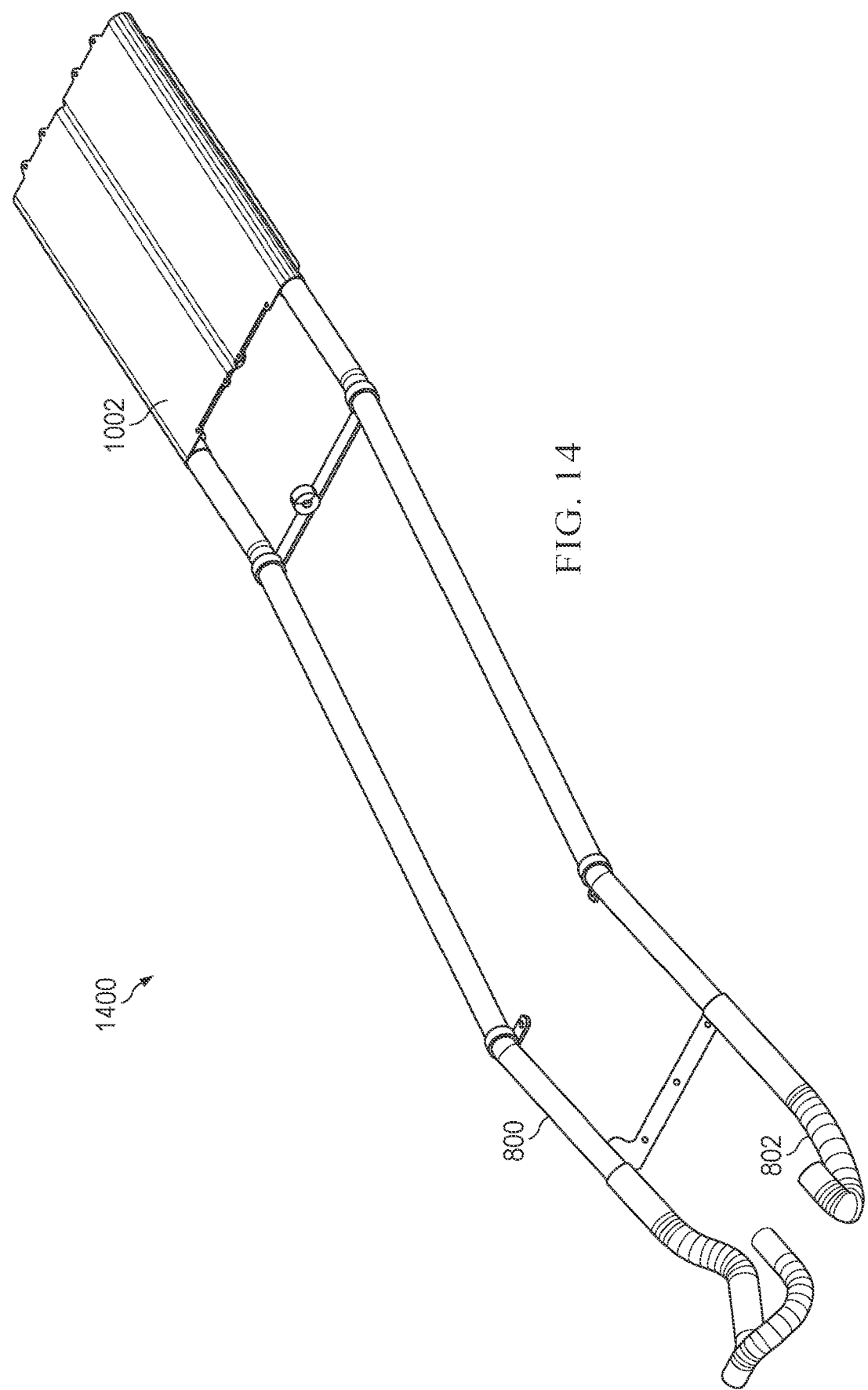
FIG. 14 illustrates a perspective view 1400 of a cooling system, according to some embodiments.
Figure 15:
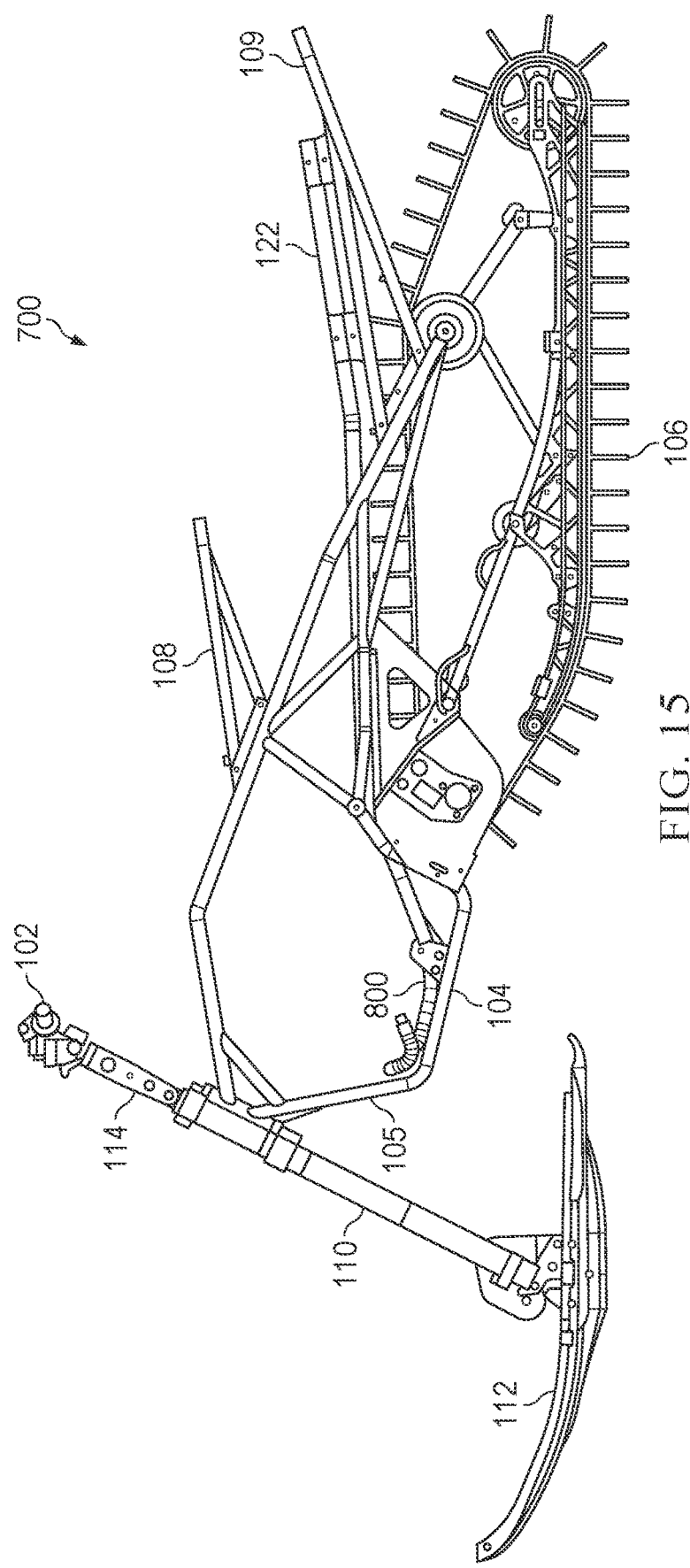
FIG. 15 illustrates a side view 700 of a snow vehicle with engine removed and with a cooling system, according to some embodiments.
Figure 16:
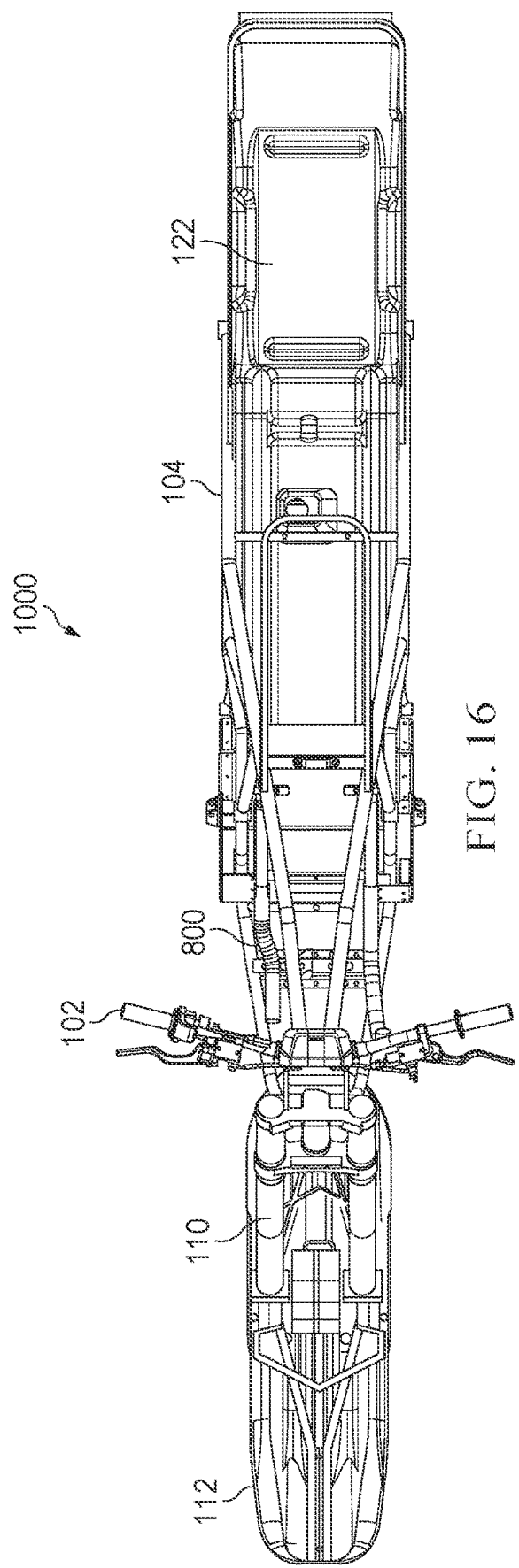
FIG. 16 illustrates a top-down view 1000 of a snow vehicle tunnel shroud, according to some embodiments.

Referring to FIG. 8, a perspective view 100 of a snow vehicle with engine 116 removed and with cooling system 800 is shown, according to some embodiments. With the engine 116 removed from view, the cooling system 800 can be seen. The cooling lines 802 connect to the engine 116, and a pump (not shown) moves coolant to heat exchanger 1002 (see view 1400 of FIG. 14). The tunnel shroud 122 (see top view 1000 of FIG. 16) covers the heat exchanger 1002 (see view 700 of FIG. 15 and top view 1000 of FIG. 10) and deflects snow onto the exchanger 1002 to assist in cooling the liquid coolant (see view 700 of FIG. 9). As discussed above, the tunnel shroud 122 can be manufactured of light weight materials, such as plastic or aluminum as the need for structural support has been removed by integrating such function into frame 104. The shroud 122 can be vacuum formed, molded, or shaped into various shapes or configurations for snow deflection functionality and aesthetic considerations.

Figure 13:
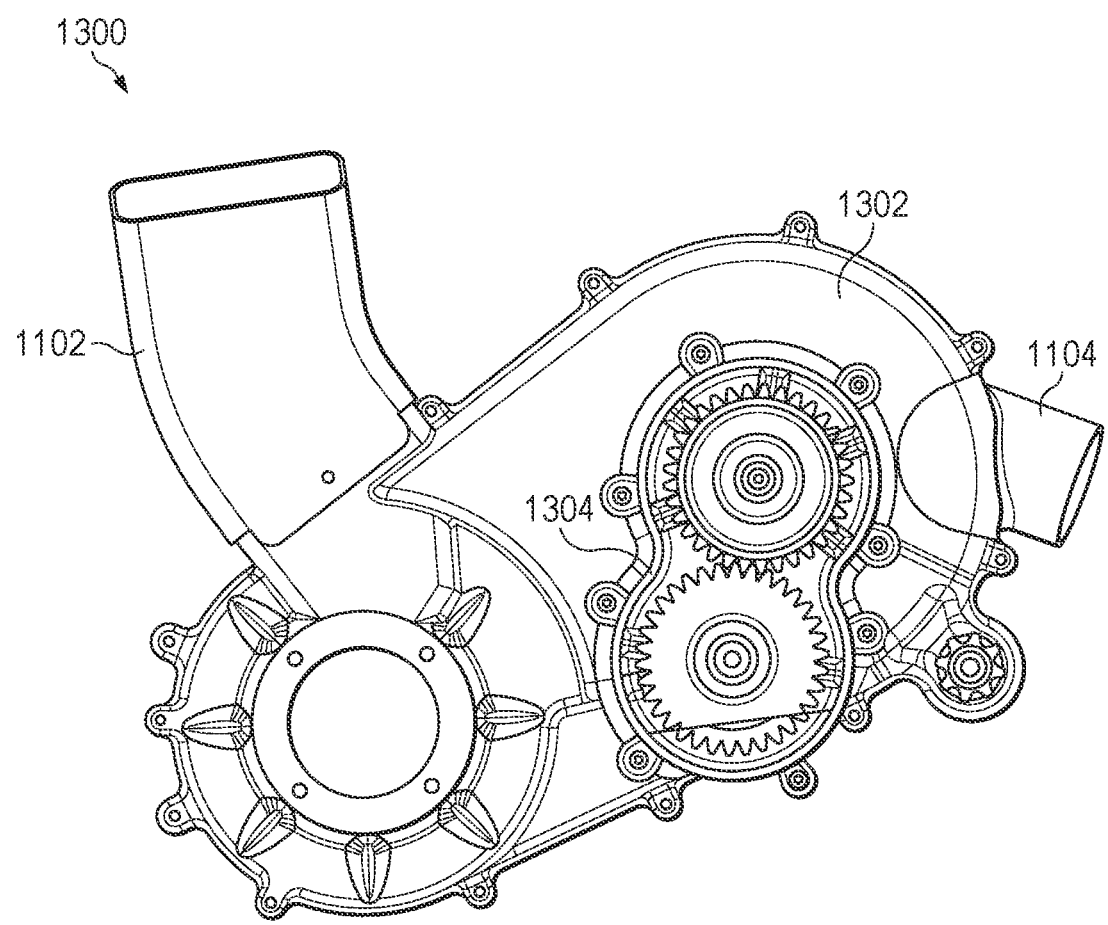
FIG. 13 illustrates a side view 1300 of a continuously variable transmission (CVT) housing with air handling components and drop box, according to some embodiments.

Referring to FIGS. 11A-11B and FIGS. 12A-12D, perspective views 1100, 1200 of power train components are shown, according to some embodiments. The drive train of the snow vehicle includes a continuously variable transmission (CVT), for transferring power from the engine 116 to the drive track 106. The use of an automatic transmission makes for a smoother user experience and handling as compared to manual transmission. An engine 116 converts chemical energy to mechanical energy via a rotating input shaft in contact with a transmission or drive train, such as a CVT. The CVT housing 1112 includes a rotatable drive (or primary) clutch connected to the input shaft. The CVT also includes a rotatable driven (or secondary) clutch connected to an output shaft or jack shaft 1108, the driven clutch having a laterally stationary sheave and a laterally movable sheave that is normally biased toward the stationary sheave. An endless flexible drive belt is disposed about the drive and driven clutches. Typically, the CVT transmission is connected to the output shaft 1108 of the vehicle's engine, the transmission providing continuously variable gear reduction from the relatively higher rotation speed of the engine to the relatively lower rotation speed of the vehicle drive axle. The CVT 1112 is used in conjunction with or integrated with a gear or drop box 1302 (see view 1300 of FIG. 13), for correcting the rotation of the output shaft 1108 due to the position of the engine. The drop box 1302 can include two or more gears 1304. The CVT housing 1112 with drop box 1302 is connected to the jack shaft 1108. Power is transferred via a belt 1110 from the jack shaft 1108 to driveshaft 1106, connected by suitable linkages (sprockets 1116, for example) to the drive track 106.

The endless, flexible, generally V-shaped drive belt is disposed about the clutches within housing 1112. Each of the clutches has a pair of complementary sheaves, one of the sheaves being laterally movable with respect to the other. The effective gear ratio of the transmission is determined by the positions of the movable sheaves in each of the clutches. The secondary driven clutch has its sheaves normally biased together (e.g., by a torsion spring working in combination with a helix-type cam, as described below), so that when the engine is at idle speeds the drive belt rides near the outer perimeter of the driven clutch sheaves.

The spacing of the sheaves in the primary drive clutch usually is controlled by centrifugal flyweights As the drive clutch rotates faster (in response to increased engine rpm) the flyweights urge the movable sheave toward the stationary sheave. This pinches the drive belt, causing the belt to begin rotating with the drive clutch, the belt in turn causing the driven clutch to begin to rotate. Further movement of the drive clutch's movable sheave toward the stationary sheave forces the belt to climb outwardly on the drive clutch sheaves, increasing the effective diameter of the drive belt path around the drive clutch. Thus, the spacing of the sheaves in the drive clutch changes based on engine rpm. The clutch therefore can be said to be speed sensitive.

As the sheaves of the drive clutch pinch the drive belt and force the belt to climb outwardly on the drive clutch sheaves, the belt (not being stretchable) is pulled inwardly between the sheaves of the driven clutch, decreasing the effective diameter of the drive belt path around the driven clutch. This movement of the belt inwardly and outwardly on the drive and driven clutches smoothly changes the effective gear ratio of the transmission in infinitely variable increments.

The CVT housing 1112 includes air handling components (e.g., ducting) to cool the operation of the CVT. Intake 1102 brings air into the housing and exit port 1104 releases the heated air from the housing 1112. The intake 1102 can face a perpendicular direction to vehicle travel, face a parallel direction to vehicle travel, or face angles in between perpendicular and parallel vehicle travel, so long as sufficient air is gathered and moved through the handling system to cool the CVT.

In the present example, the engine 1116 is shown with a single, two-stroke cylinder 1114. The single cylinder, two-stroke engine provides durability, simplicity, and lighter weight to the vehicle. Four-stroke engines and multi-cylinder two-stroke engines can also be used, but at the possible sacrifice of weight and size.

Figure 17:
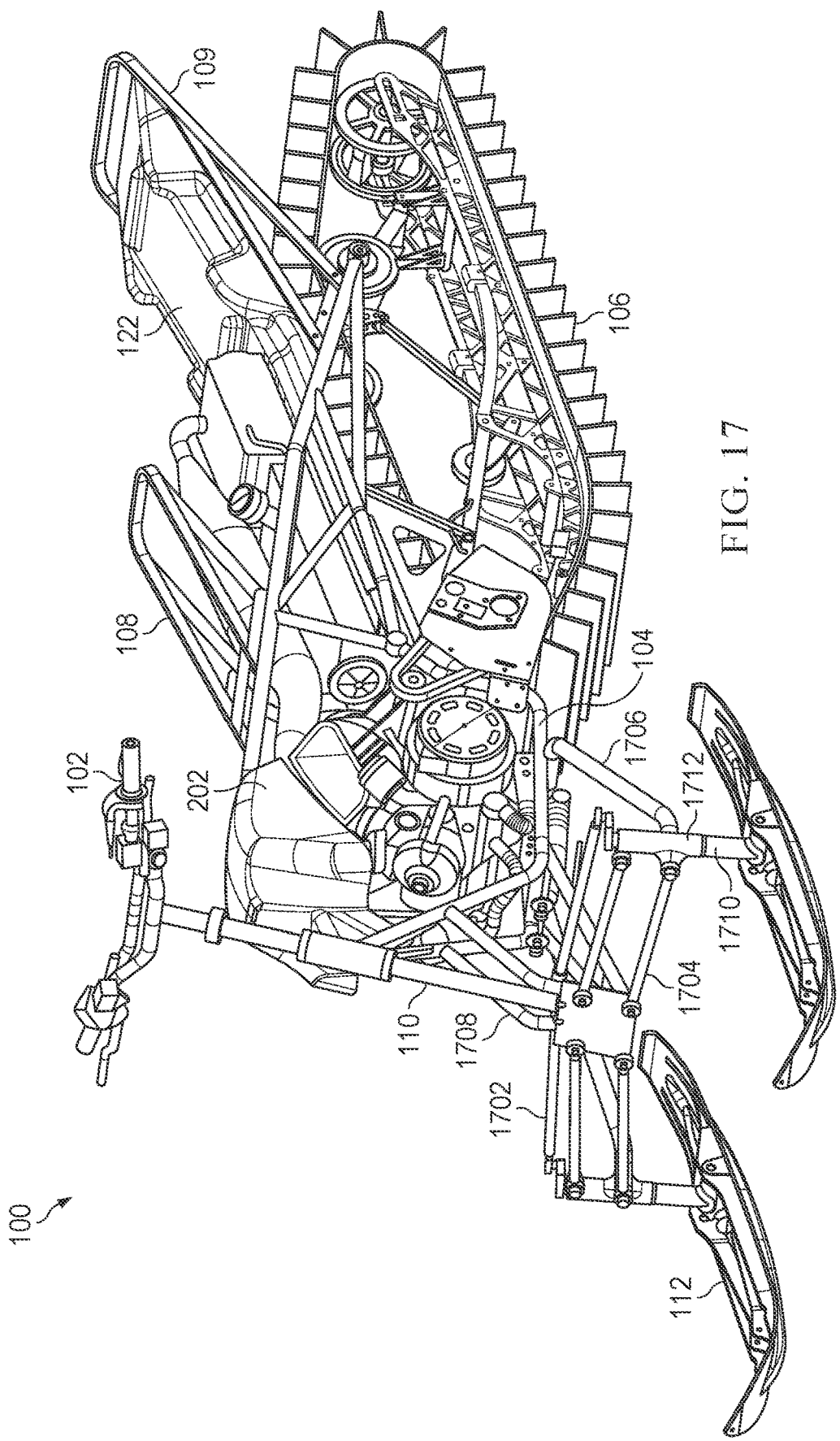
FIG. 17 illustrates a perspective view 100 of a snow vehicle with two-ski configuration, according to some embodiments.
Figure 18:
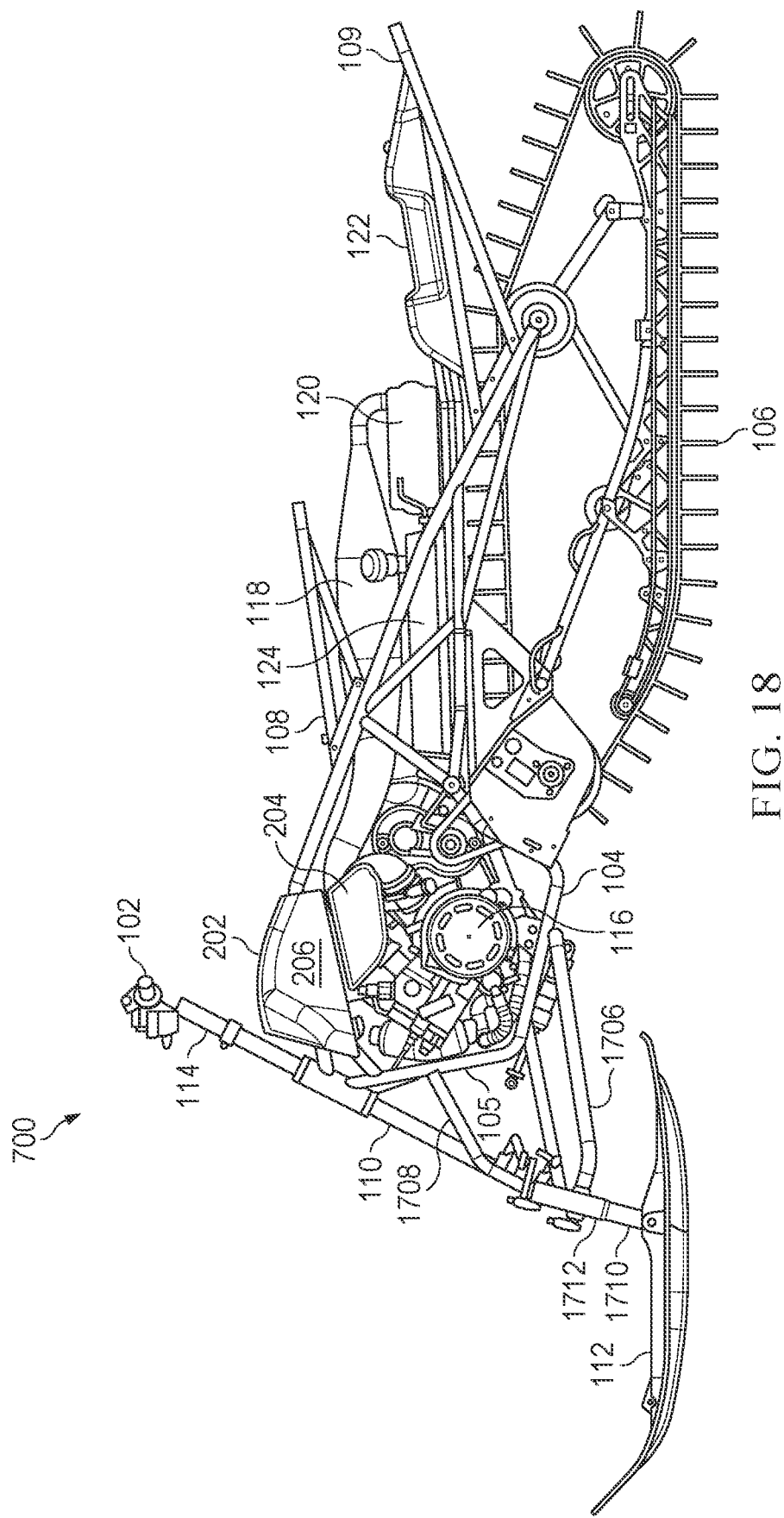
FIG. 18 illustrates a side view 700 of a snow vehicle with two-ski configuration, according to some embodiments.
Figure 19:
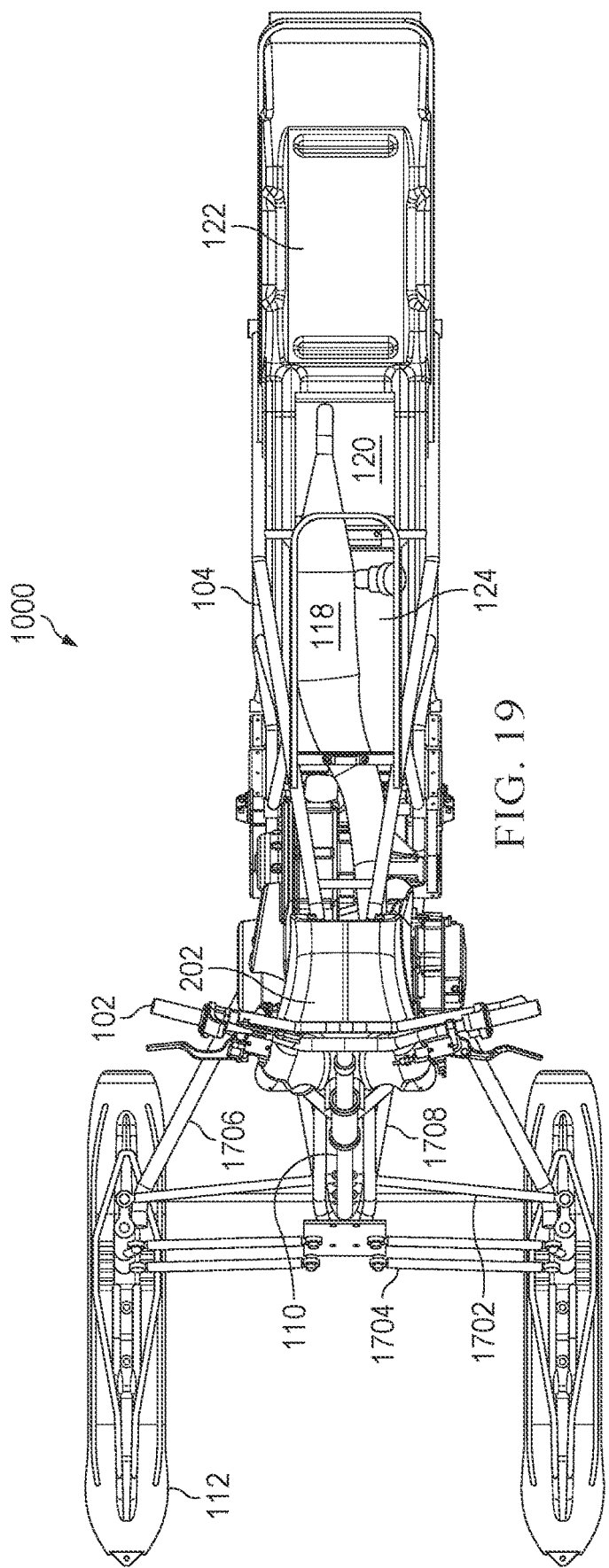
FIG. 19 illustrates a top-down view 1000 of a snow vehicle with two-ski configuration, according to some embodiments.

Referring to FIG. 17, a perspective view 100 of a snow vehicle with a two-ski configuration is shown, according to some embodiments. In place of a motorcycle-type fork, a single tube fork connection and accompanying suspension can be utilized to provide a two-ski configuration as an optional kit in place of the single ski configuration. A side view 700 (see FIG. 18) and top down view 1000 (see FIG. 19) are also shown. The two-ski configuration would allow for a snow bike feel, with increased stability and balance.

A front suspension subframe assembly 1708 connects with the frame 104. Steering mechanism 1702 connects with the handlebars 102 and steering shaft 1710, positioned within each spindle 1712. The spindle 1712 connects with each ski 112. A trailing arm 1706 connects with the frame and each spindle 1712. Radius arms 1704 connect with the spindles 1712 and subframe assembly 1708. Dampening components, such as shocks, springs, coils (not shown), can be attached to the subframe assembly 1708 and spindles 1712, for example.

Figure 21:
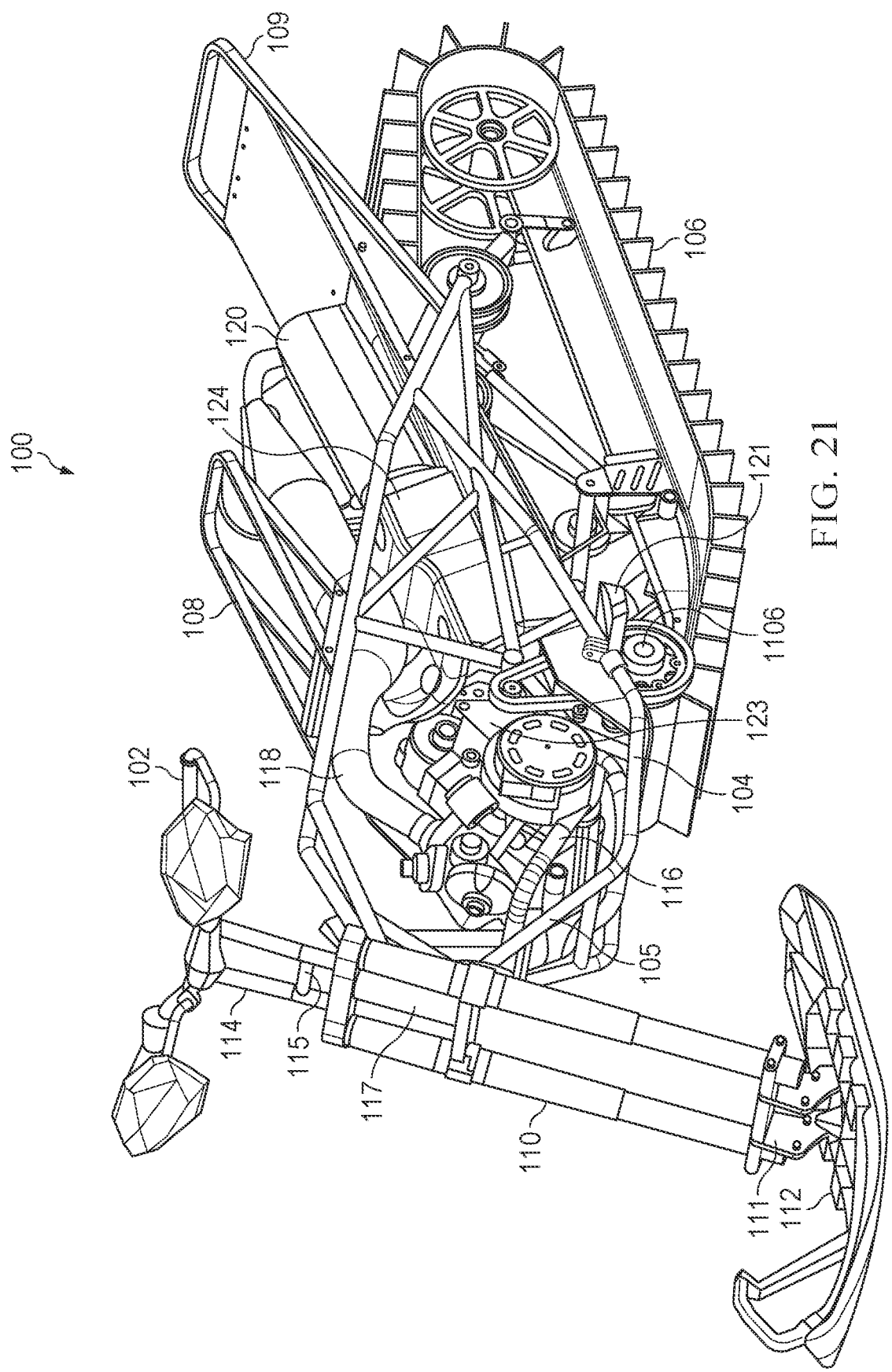
FIG. 21 illustrates a perspective view 100 of a snow vehicle, according to some embodiments.

Referring to FIG. 21, a perspective view 100 of a snow vehicle is shown, according to some embodiments. A chassis or frame 104 supports an engine 116, drive train components, a drive track 106, handlebars 102 and one or more skis 112. The chassis includes a seat frame 108, lower front frame component 105, and integrated bumper 109. Exhaust system 118 connects to muffler 120. The chassis 104 connects to a fork 110, in contact with the one or more skis 112. A drop fork component 114 connects the fork 110 and handlebars 102. Fork bracket 111 contacts one or more skis 112 and fork 110. Because the fork 110 is in a lower, dropped position than motorcycle conversion kit forks, the need for a fork foot 113 is eliminated. The fork bracket 111 provides additional adjustment features, reduces cost and simplifies manufacturing. Fuel tank 124 is positioned beneath the exhaust system 118 and seat frame 108. The track width can be about 10 inches to about 12 inches, about 12 inches to about 13 inches, about 12.5 inches, about 13.5 inches, or about 14 inches wide. In some embodiments, the track has a width of between 10 and 18 inches; in some embodiments between 13 and 15 inches. A foot peg or pedal 121 can be positioned outside a portion of the frame 104 Examples of drive track 106 and other embodiments can be found in co-owned U.S. Pat. No. 9,321,509, filed on Dec. 17, 2013 with first named inventor Andrew Beavis and entitled "Snowmobile Skid Frame Assembly", the contents of which are incorporated herein by reference.

By repositioning driveshaft 1106 in a more forward and lower position than the embodiment of FIG. 1, the engine 116 can be positioned even lower, further lowering the center of gravity and shortening the entire length of the vehicle. Additionally, disc brake 123 is positioned near or above the output shaft 1108 in a top-mounted position and is therefore distanced from snow and dirt, improving its performance and extending the life of the components.

Figure 23:
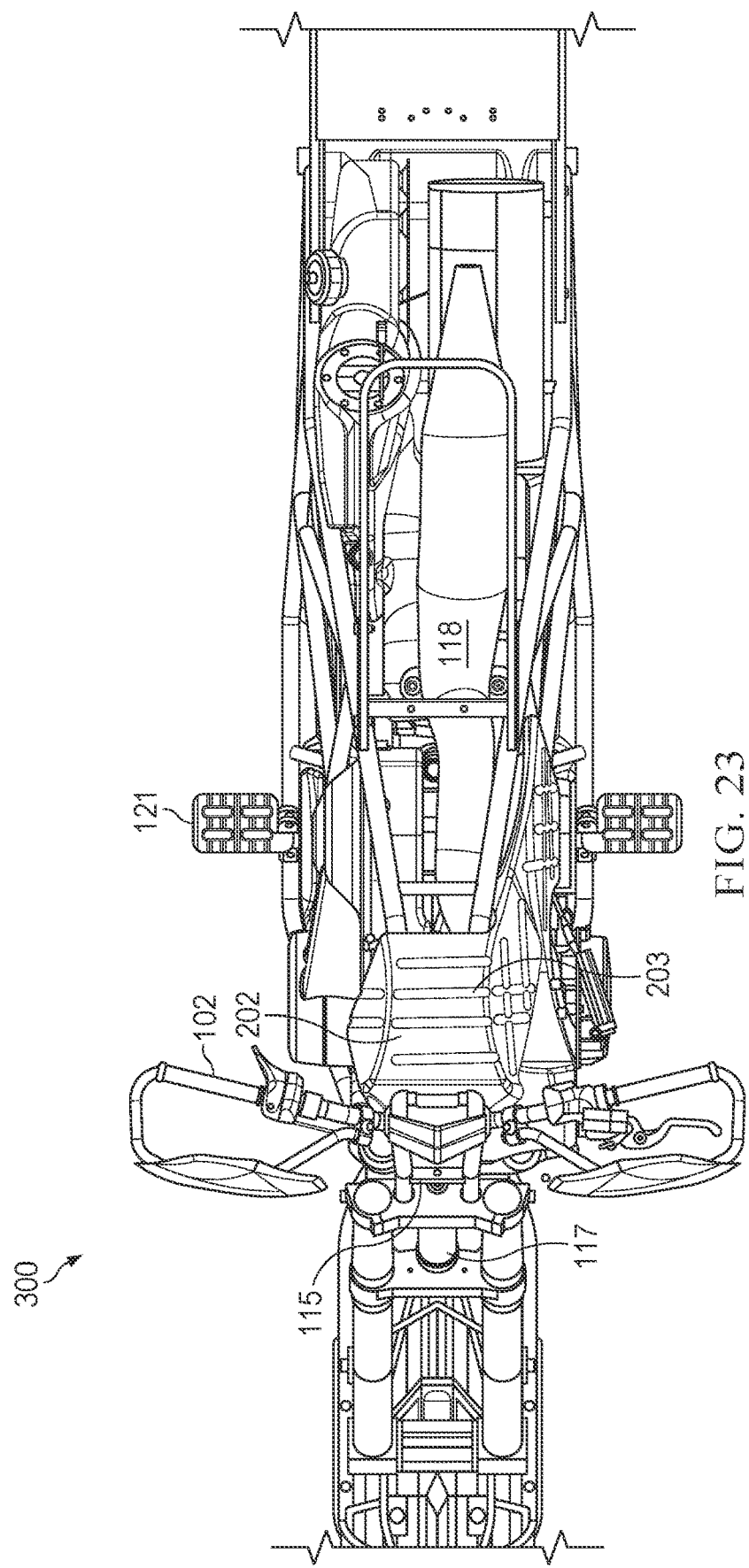
FIG. 23 illustrates a partial top-down view 300 of a snow vehicle with air intake system (engine removed), according to some embodiments.

In some embodiments, the exhaust system 118 is positioned completely within the tunnel and frame 104 of the vehicle. By rotating the position of the engine 116 one hundred eighty degrees from a typical snowmobile or motorcycle configuration, the exhaust port faces a rearward direction. The exhaust system 118 can then be contained in a substantially linear configuration towards the rear of the vehicle and into a muffler 120. The muffler 120 can also be contained within an interior of the frame 104. The muffler 120 can be positioned directly below the seat frame 108, partially below the seat frame 108, or offset from the seat frame 108. The exhaust then exits the rear of the vehicle. By positioning the exhaust system 118 completely within the frame 104 and tunnel of the vehicle, a user is protected from incidental contact on the hot surface of the exhaust system 118. A partial top-down view of a snow vehicle is shown in FIG. 23, in which exhaust system 118 runs within the width of the frame 104. The exhaust system 118 can be positioned in an offset position within the frame 104 and can be in line with muffler 120, or further offset with the muffler 120.

Figure 22:
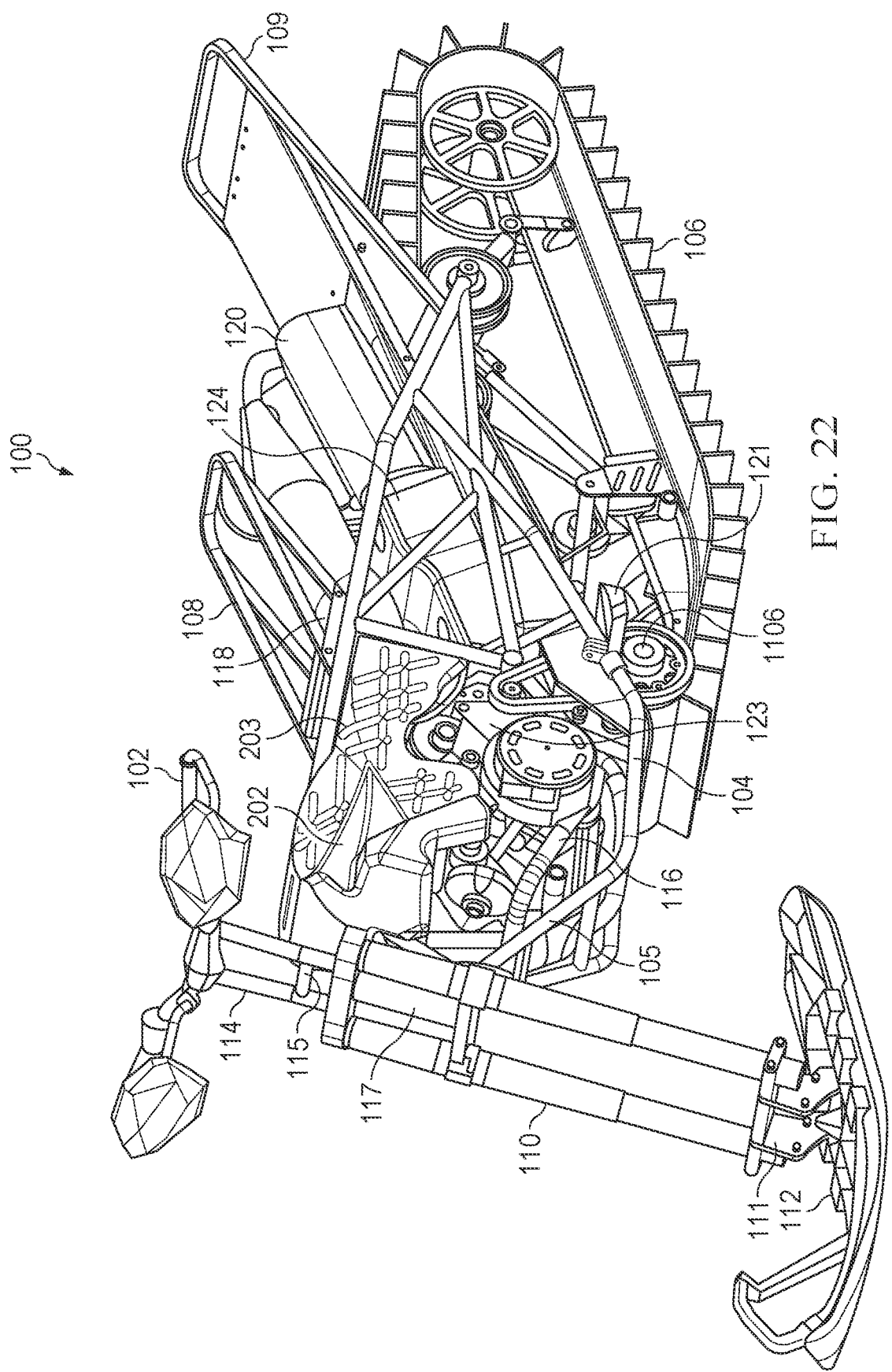
FIG. 22 illustrates a perspective view 100 of a snow vehicle with air intake system, according to some embodiments.
Figure 24:
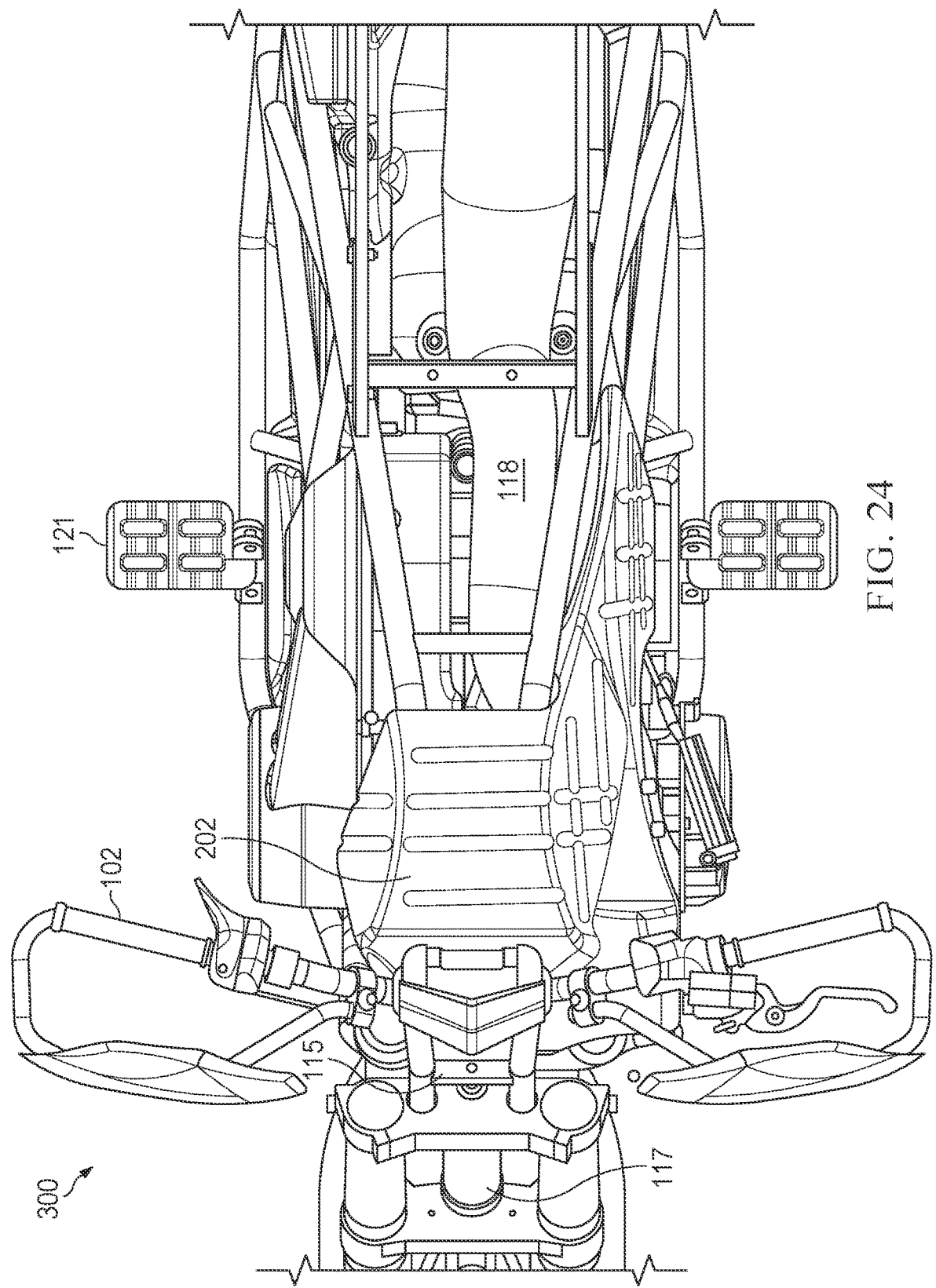
FIG. 24 illustrates a partial top-down view 300 of a snow vehicle with air intake system, according to some embodiments.
Figure 25B:
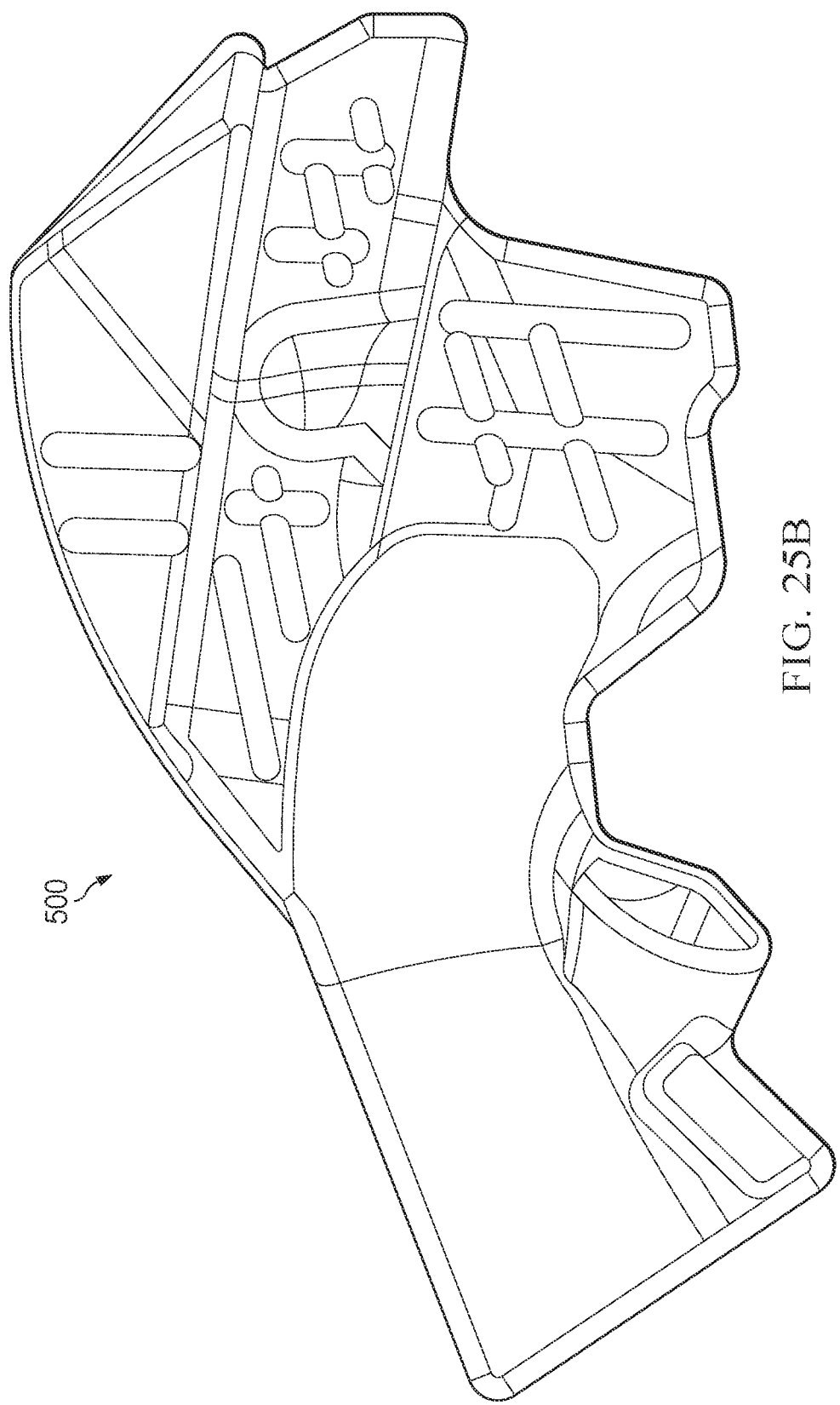
FIG. 25B illustrates a perspective view 500 of an air intake system, according to some embodiments.
Figure 25D:
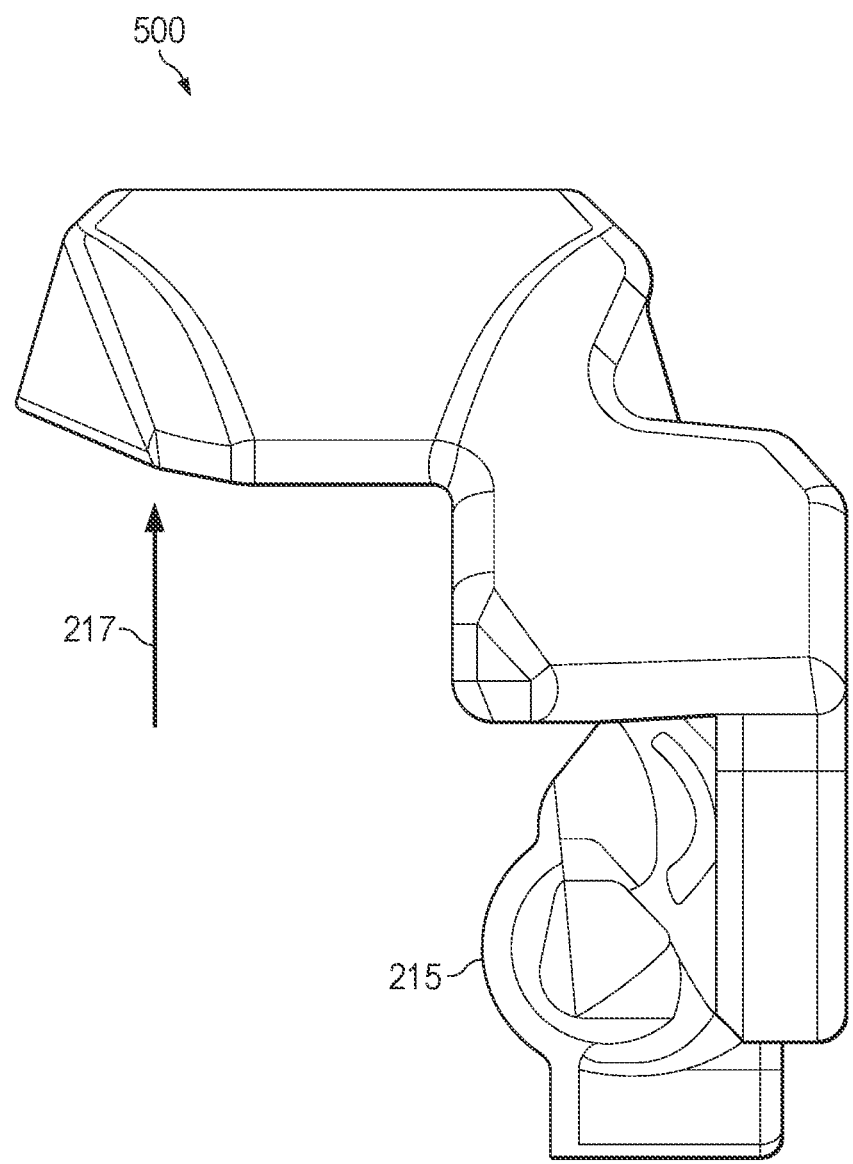
FIG. 25D illustrates a perspective view 500 of an air intake system, according to some embodiments.
Figure 25E:
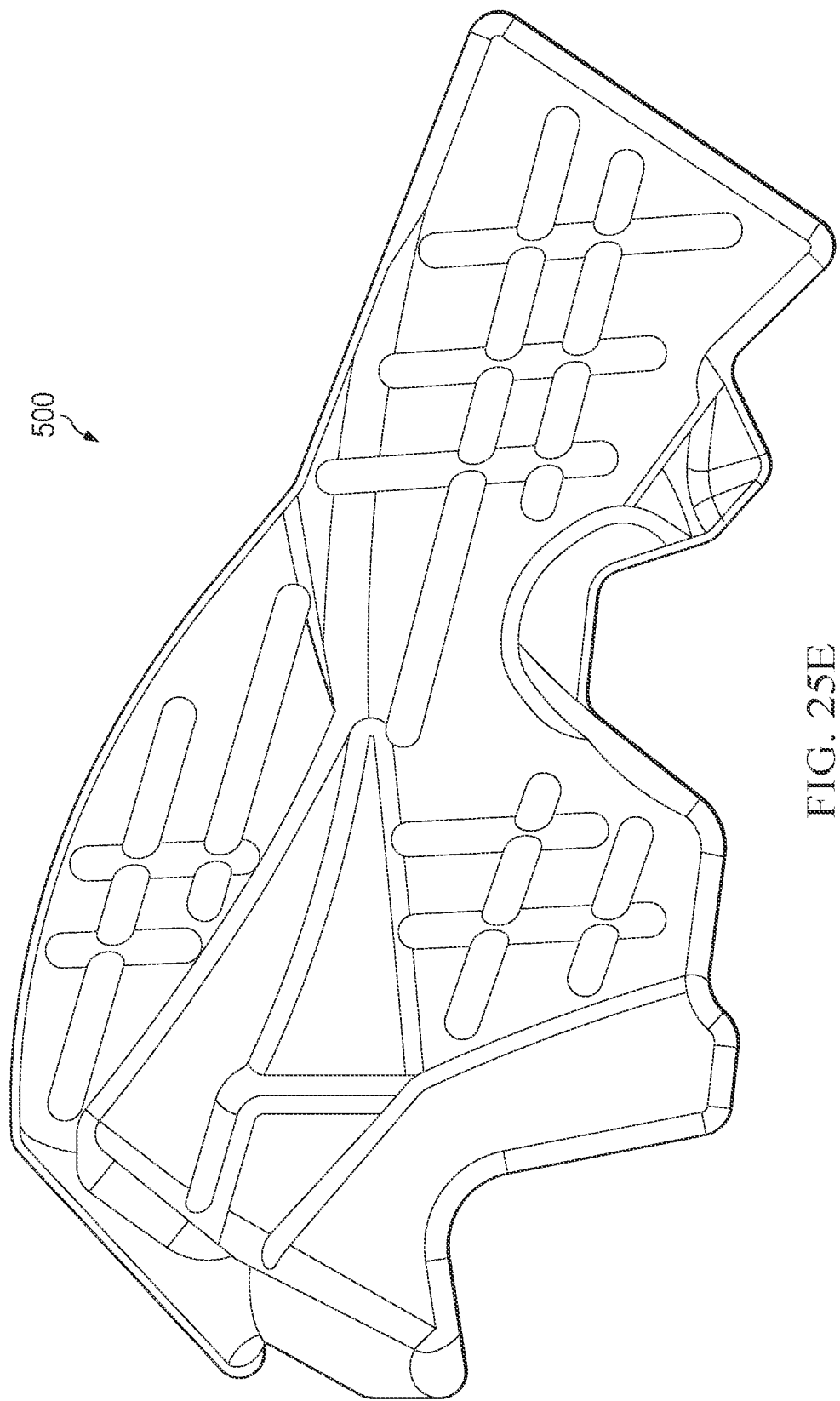
FIG. 25E illustrates a perspective view 500 of an air intake system, according to some embodiments.

FIG. 22 additionally shows engine air intake system 202, according to some embodiments. The air intake system 202 is positioned above the engine and can be attached to frame 104 or integrated with the frame 104. Shown in FIGS. 23-24 in a partial top-down view 300, the air handling system 202 encloses the frame 104 as a portion of the tube chassis extends through an opening the air box and supports its placement, thereby providing efficient space utilization. In some embodiments, the frame 104 is entirely tubular. The tubular frame embodiment allows for simplicity of design and manufacture.

The air handling system 202 can alternatively be positioned under one or more portions of the frame 104. One or more ribs 203 can be positioned on one or more interior or exterior surfaces of the air handling system 202 to increase the stiffness and reduce vibration across such surfaces. The ribs 203 can be positioned in parallel, in a perpendicular arrangement, or in other patterns that may or may not intersect to reduce vibration.

Figure 26:
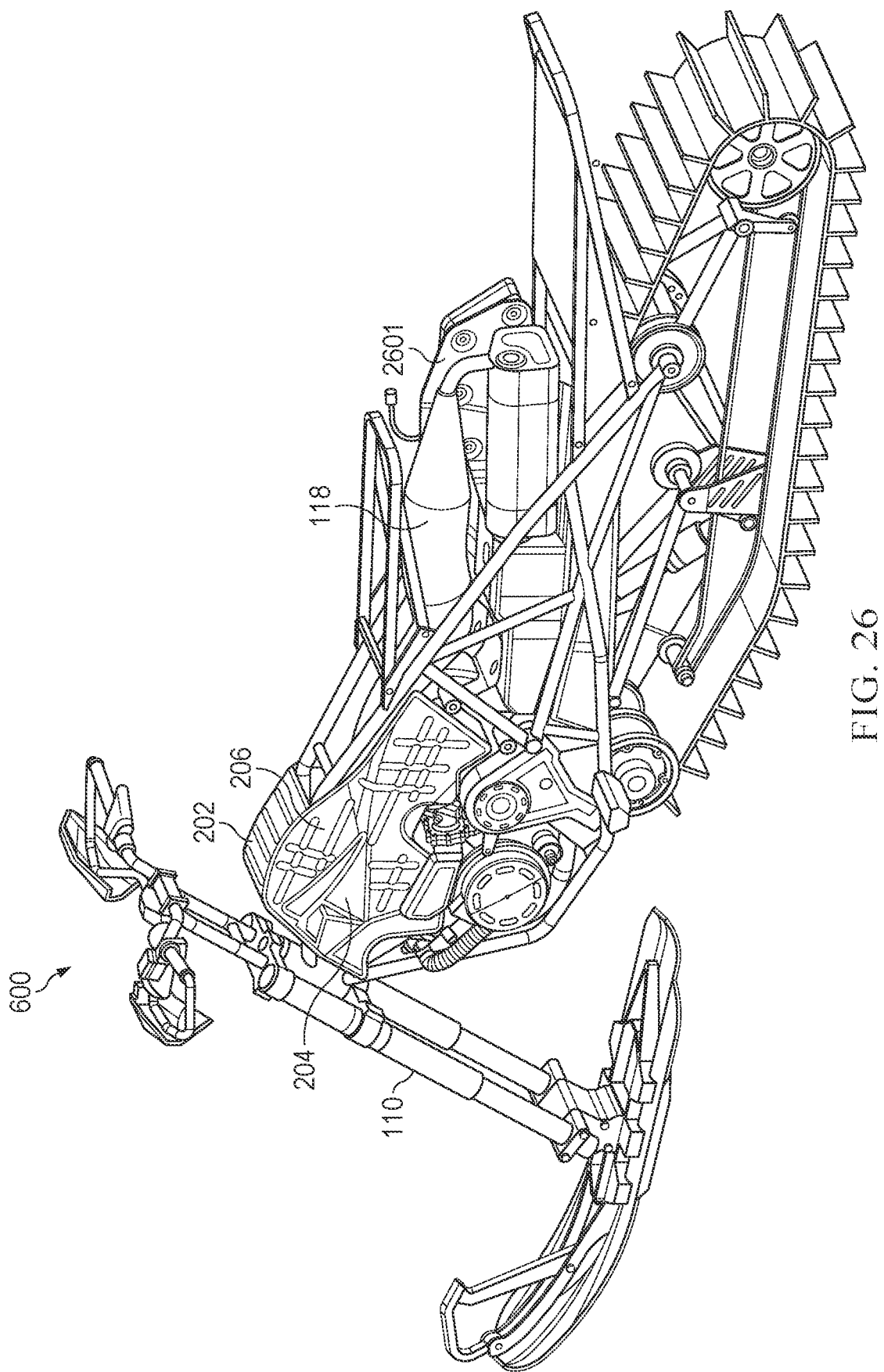
FIG. 26 illustrates a perspective view 600 of a snow vehicle with air intake system, according to some embodiments.

Referring to FIGS. 25A-25E, perspective views 500 of the air intake system 202 components are shown, according to some embodiments. In this embodiment, the air intake system 202 is a multi-part component. The system 202 can also be a single piece component, such as a blow mold component. The air intake system 202 (e.g., air box) collects engine combustion air while minimizing the intake of undesirable particulates and/or snow. The size and position of the air box allows for a sufficient volume of air to be collected and move through the system 202 to the engine. Once collected in the air box, the air then travels into the throttle body of the engine 116 (see view 600 of FIG. 26). Frame channels can be positioned or formed for attachment of the air intake system 202 with the frame 104.

Figure 27:
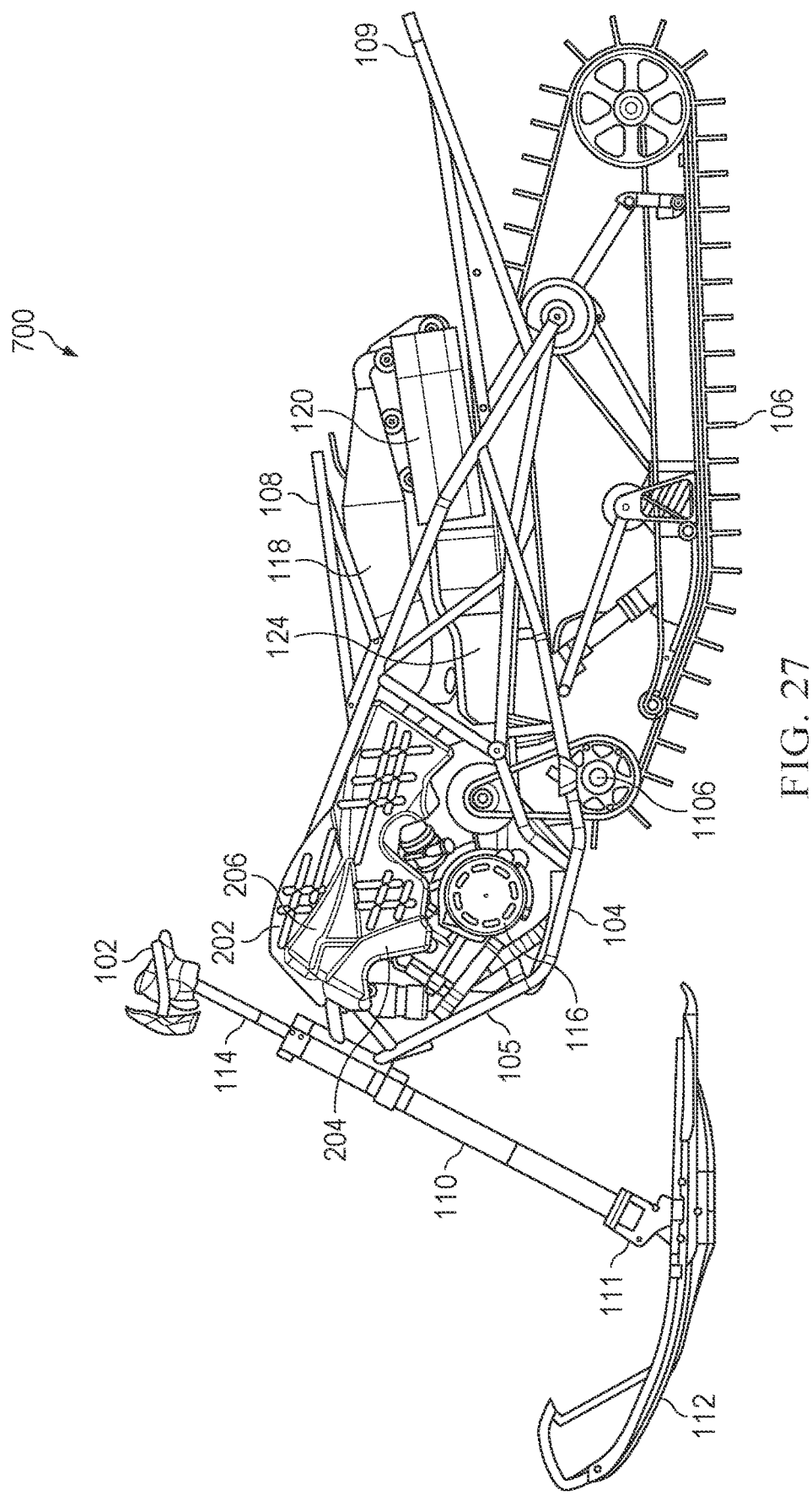
FIG. 27 illustrates a side view 700 of a snow vehicle, according to some embodiments.

A shield 2601 (see view 600 of FIG. 26) is positioned to deflect or absorb heat away from the fuel tank 124. The shield 2601 can be positioned partially or substantially around the fuel tank 124 (FIG. 27). The shield 2601 can further provide structural protection to the fuel tank 124, such as in the event of impact.

Referring to FIG. 27, a side view 700 of a snow vehicle is shown, according to some embodiments. As the snow vehicle is not a kit for motorcycles, the engine 116 can be positioned much lower and forward as any consideration for the position of a wheel is not needed. The lower front frame component 105 can be much closer to fork 110 than in traditional snow bike configurations. A traditional motorcycle user or rider posture is show in FIG. 20A. The ergonomic position E1 between foot peg, seat and handlebars. The angle A1 may be between about 27-30 degrees. D1 distance is about 29 inches in this example. D2 is about 48 inches and D3 about 3.2 inches. In one embodiment of the snow vehicle of the present disclosure (see FIG. 20B), a similar ergonomic position E1 is achieved. This differentiates from the position of a traditional snowmobile. In FIG. 20B, angle A1 can be about 24 to about 30 degrees, about 26 to about 28 degrees, or about 26.5 to about 27.5 degrees.

In some embodiments, the frame 104 includes integrated or attached bumper 109. If attached, the bumper 109 can be bolted, welded, or otherwise fastened. If integrated, the bumper 109 can be of a continuous construction with the frame 104. The bumper 109 can connect to a shroud or body panel or be separated therefrom. The bumper 109 can optionally support the shroud at one or more connection points. As the bumper 109 is part of frame 104 or connected to frame 104, there may not be a need for a structural tunnel. The placement of the engine 116 in a forward and lower configuration advantageously moves the center of gravity of the vehicle in a lower position. The position of the one or more fuel tanks 124 further supports the lower center of gravity.

Because the frame 104 is purpose-built to for this vehicle, the frame 104 can connect with fork 110 at a lower position, when compared to snow bike kits. The connection between frame 104 and fork 110 can be gusset bracket 117. The gusset bracket 117 can transfer and distribute load throughout the frame 104. A drop fork component 114 can then be utilized to connect the fork 110 and handlebars 102. The drop fork component 114 is lighter than any corresponding length of fork 110 and can further be utilized for fore and aft handlebar adjustment and rotational adjustment for the user. The drop fork component 114 can include support components 115, such as a cross brace. The drop fork component 114 can be manufactured of light weight, but durable materials, such as aluminum or composite (e.g., carbon fiber) for example. The length of the drop fork component 114 can be about 8 inches, about 10 inches, or about 12 inches. The length of the drop fork component 114 can be about 6 inches to about 12 inches. The fork 110 can also include suspension components, such as dampeners, springs, coils, etc. The front suspension can be telescoping compression dampening component or rebound dampening component, for example.

Figure 28:
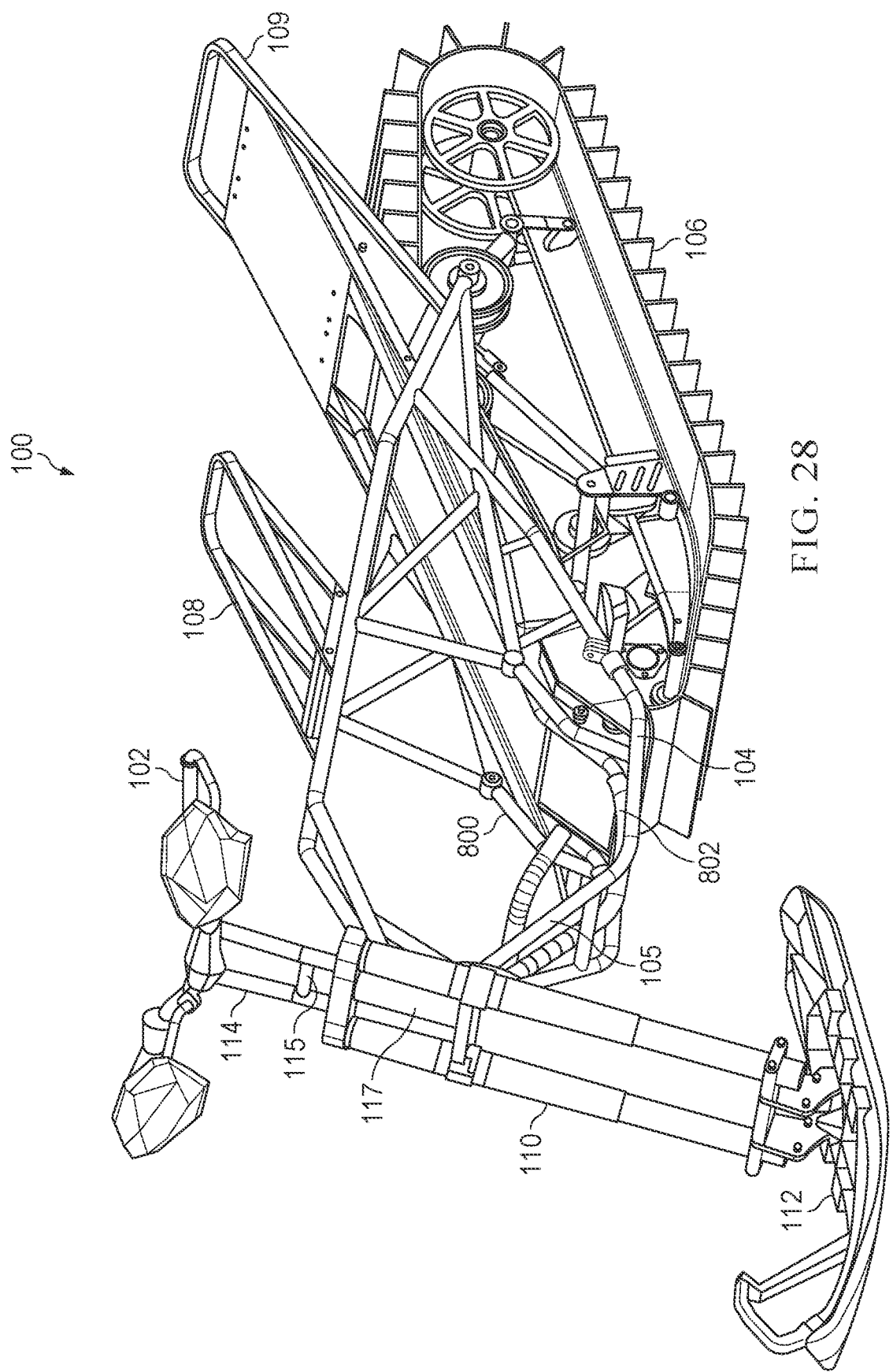
FIG. 28 illustrates a perspective view 100 of a snow vehicle with engine removed, according to some embodiments.
Figure 29:
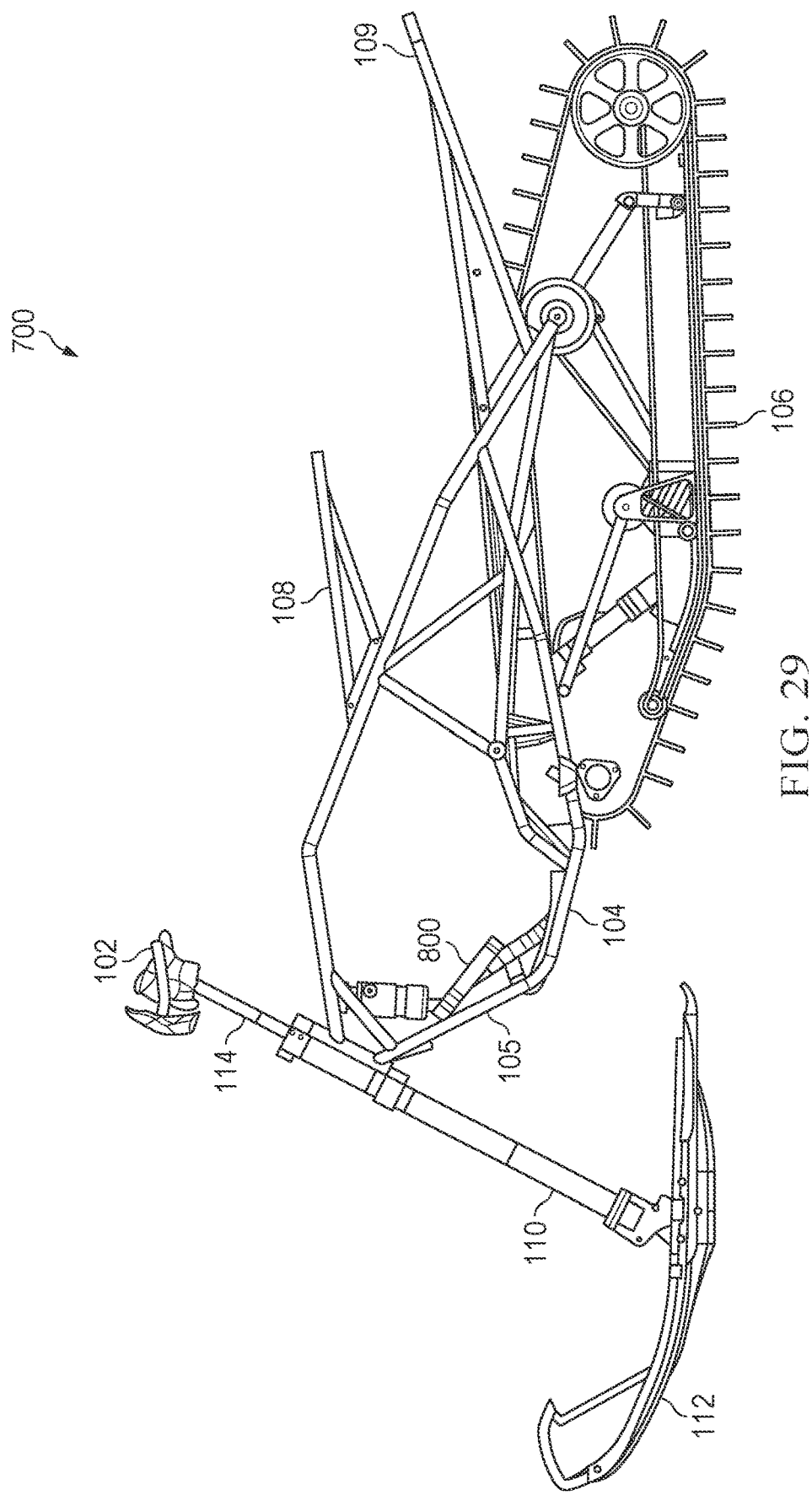
FIG. 29 illustrates a side view 700 of a snow vehicle with engine removed, according to some embodiments.
Figure 30:
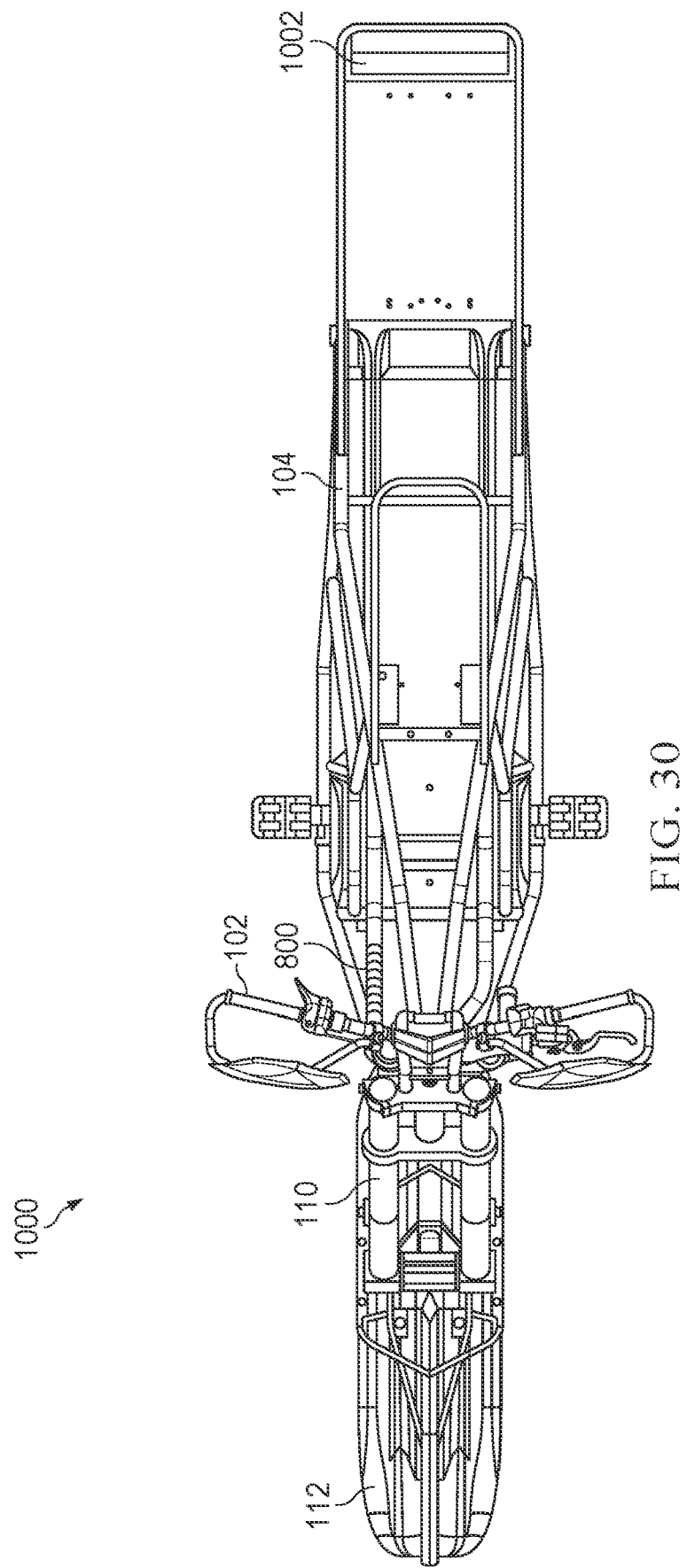
FIG. 30 illustrates a top-down view 1000 of a snow vehicle with cooling system, according to some embodiments.
Figure 31A:
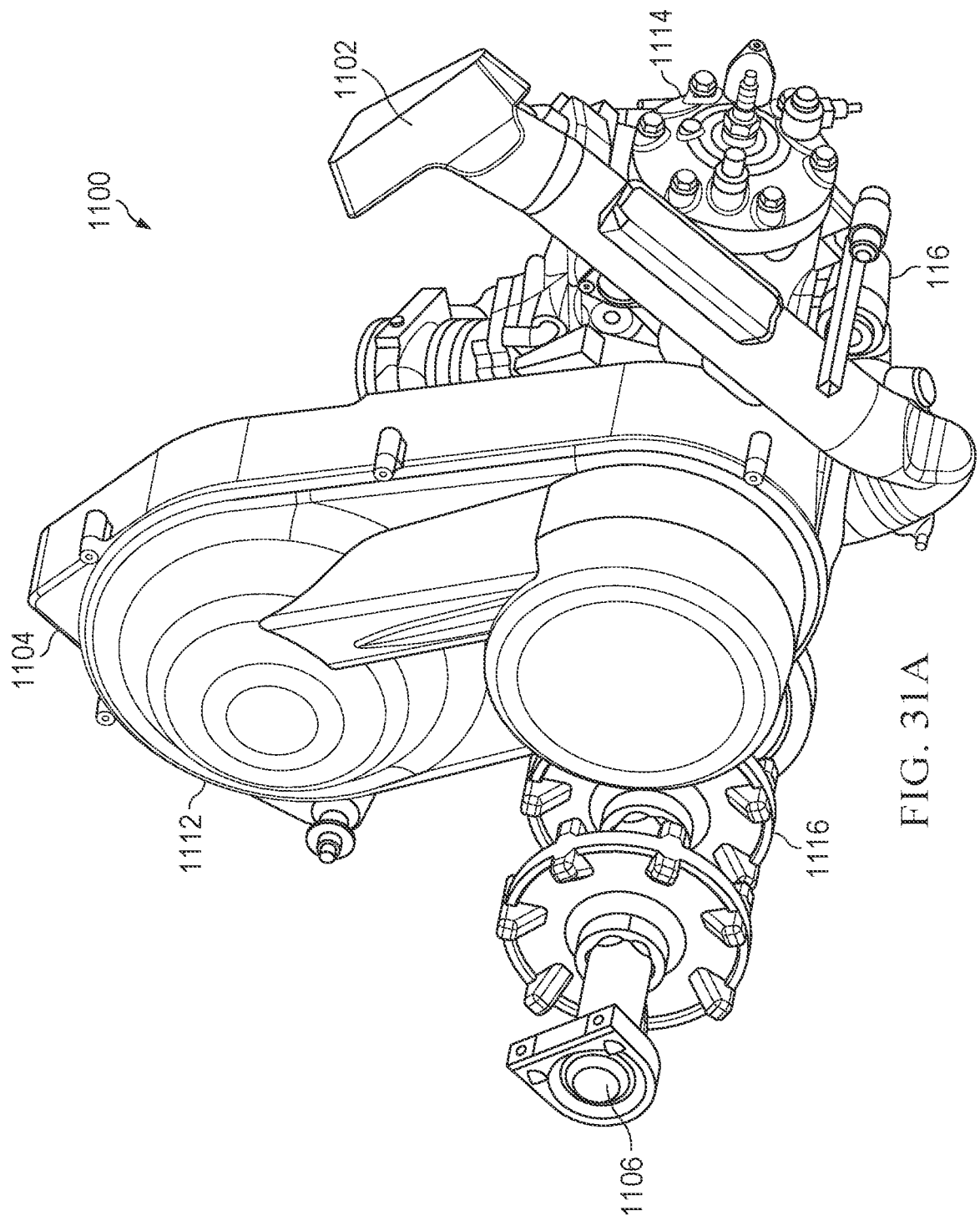
FIG. 31A illustrates a perspective view 1100 of power train components, according to some embodiments.
Figure 31B:
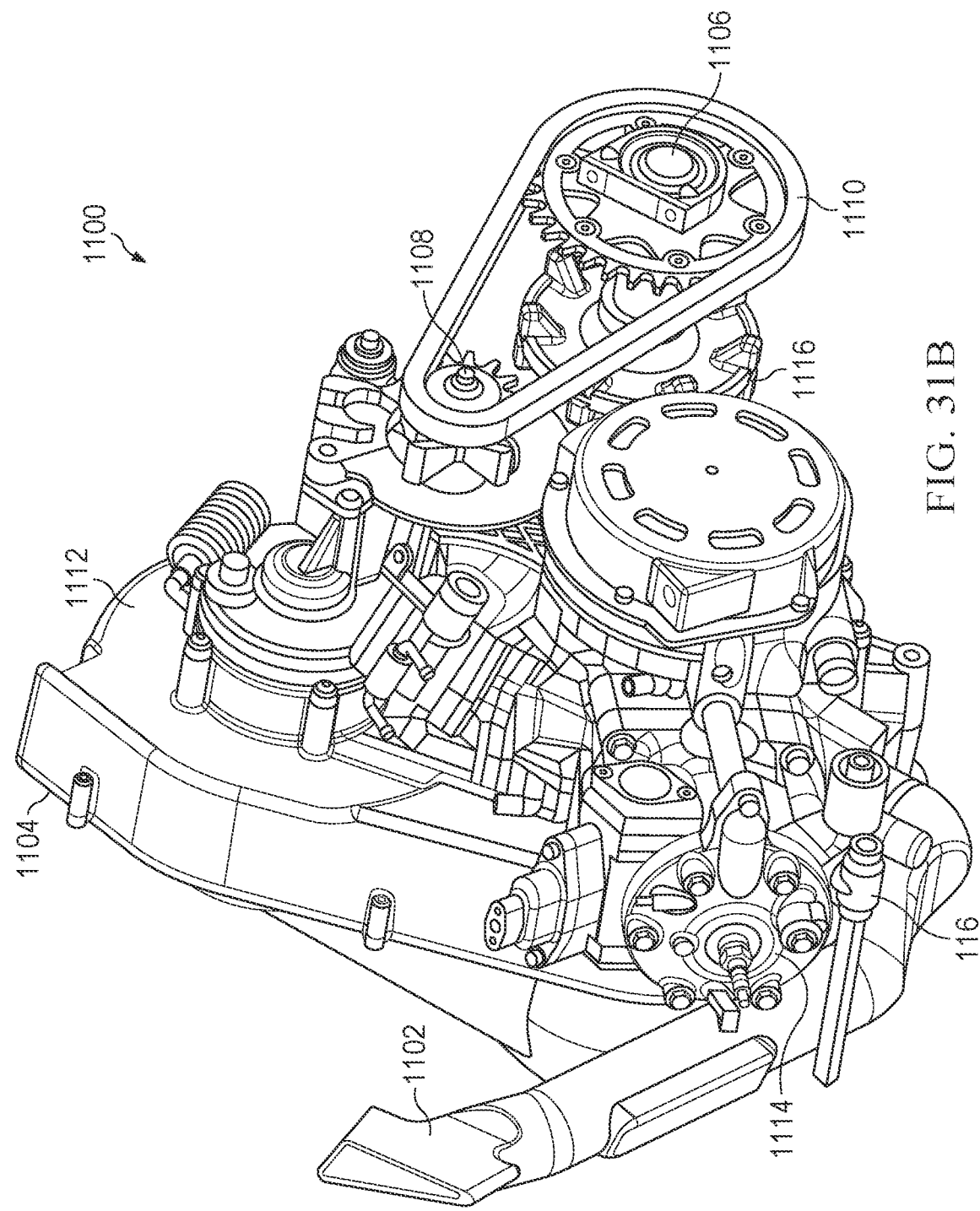
FIG. 31B illustrates a perspective view 1100 of power train components, according to some embodiments.
Figure 32A:
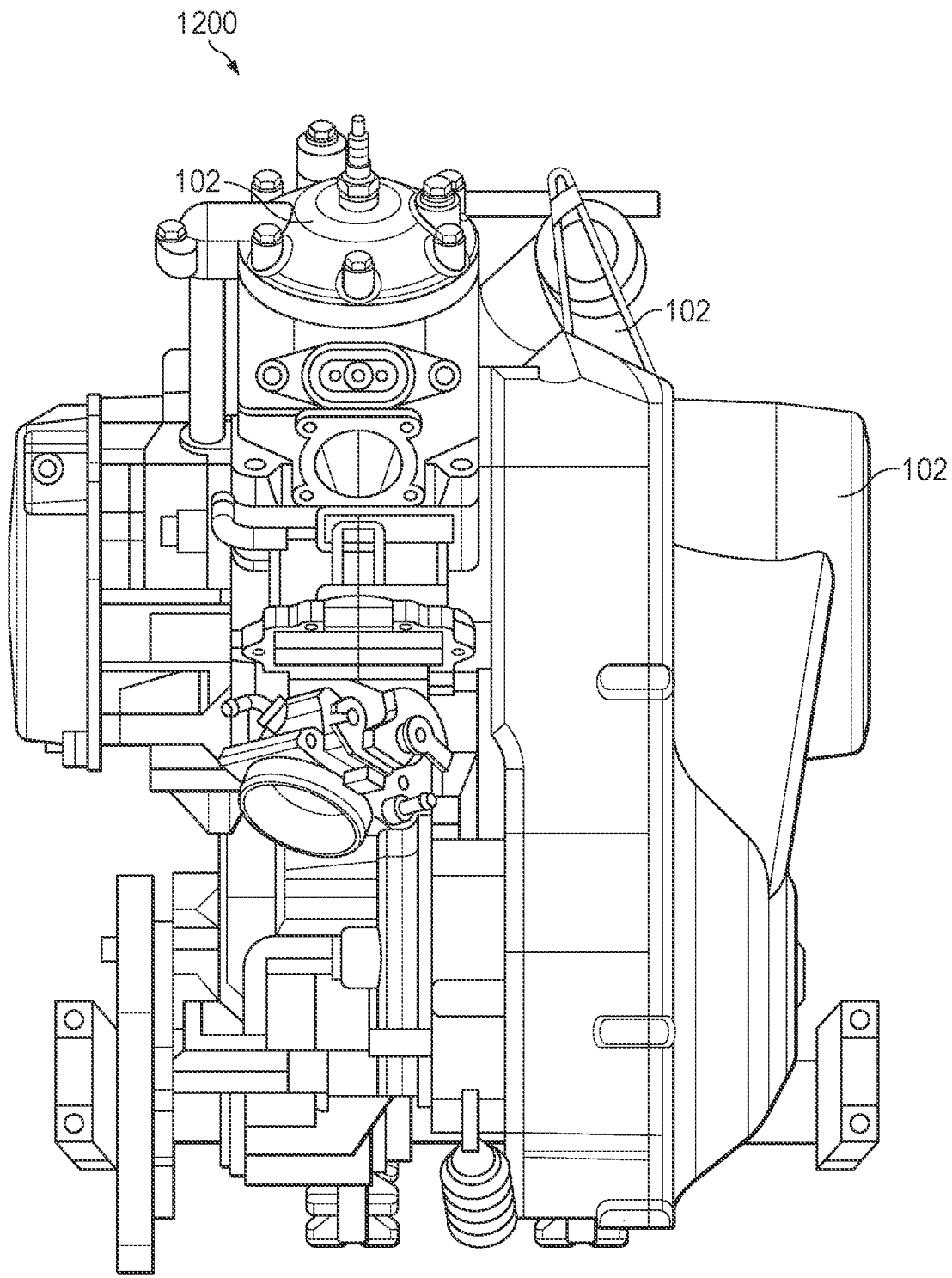
FIG. 32A illustrates a perspective view 1200 of power train components, according to some embodiments.
Figure 32B:
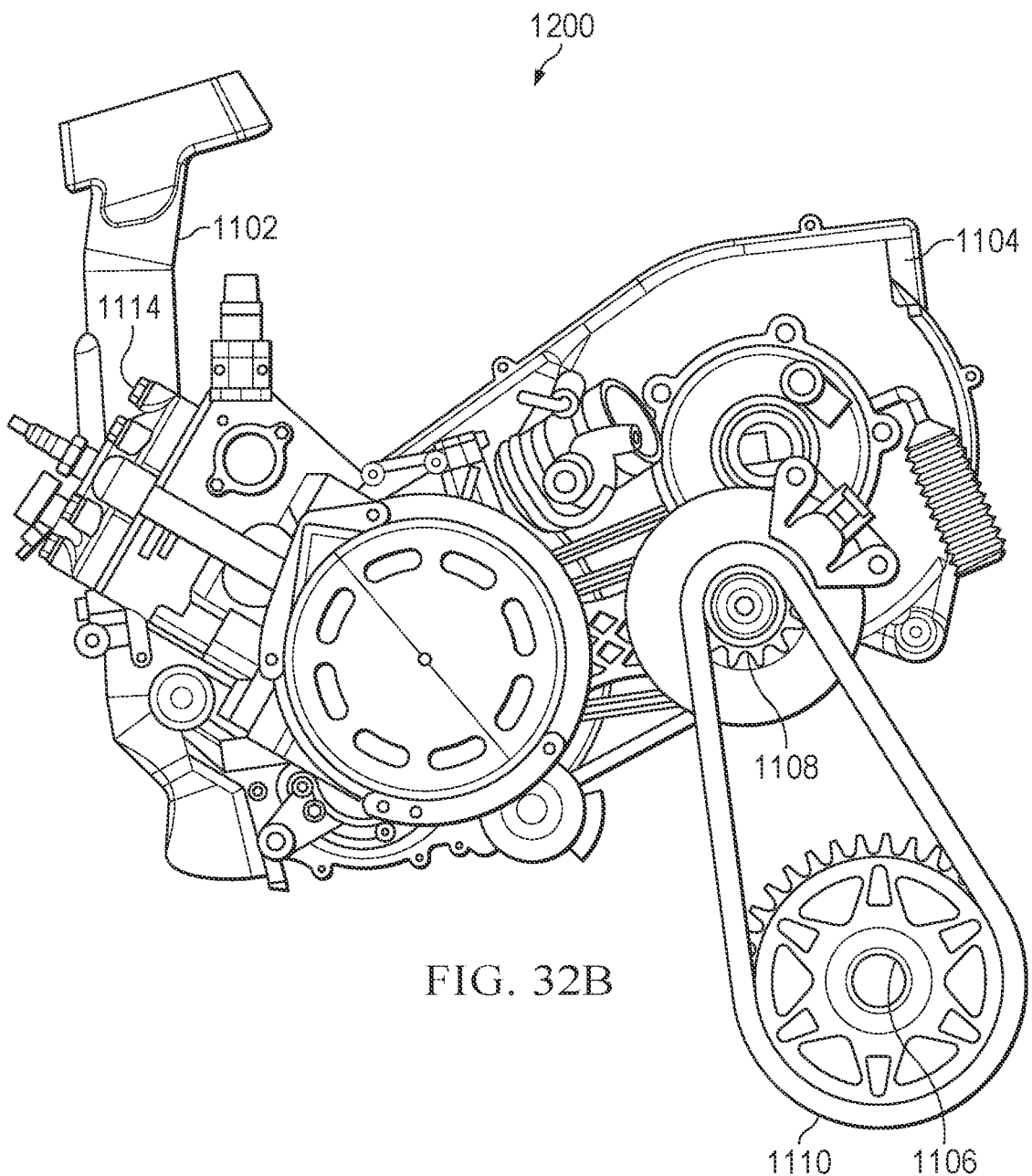
FIG. 32B illustrates a perspective view 1200 of power train components, according to some embodiments.
Figure 32C:
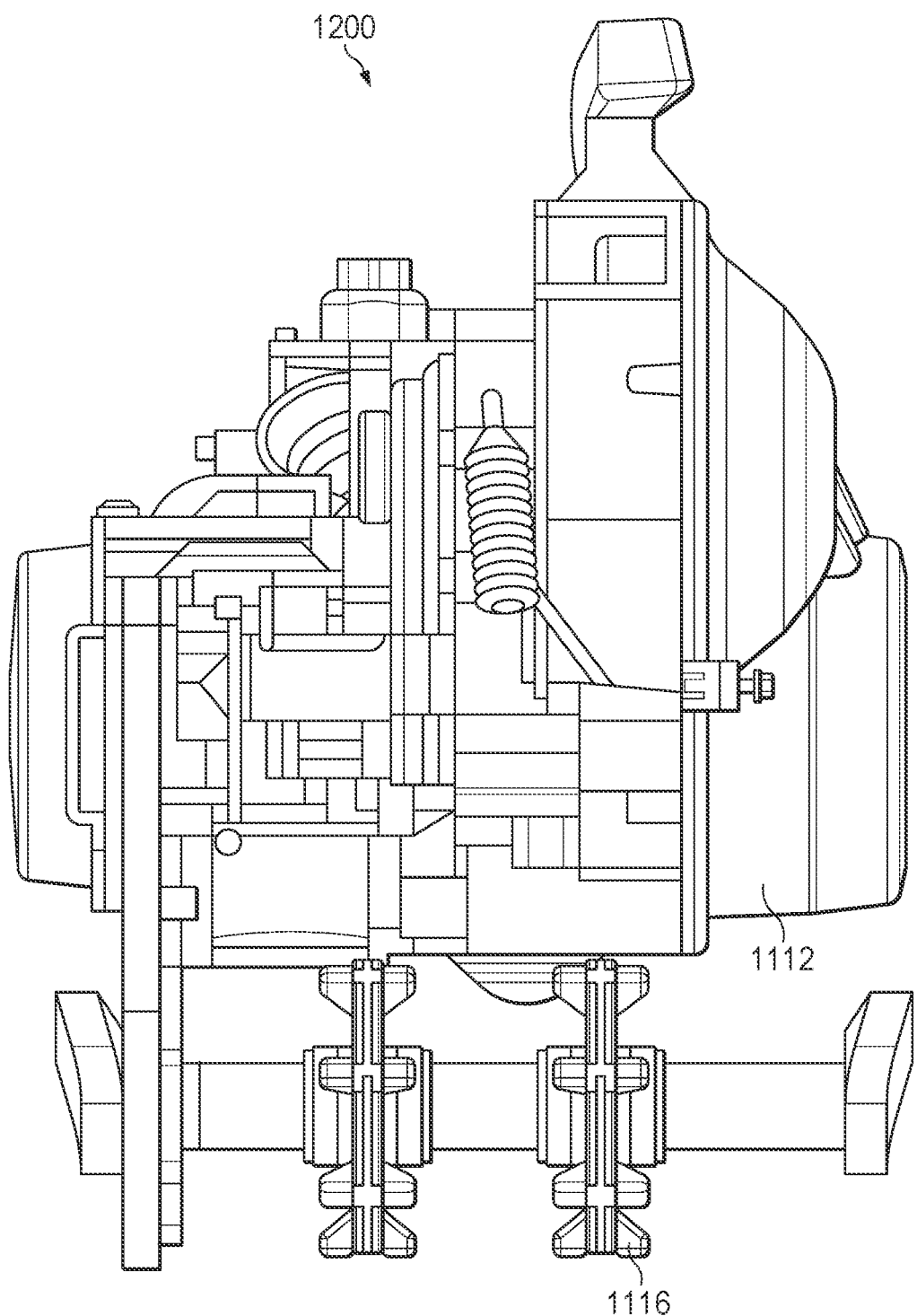
FIG. 32C illustrates a perspective view 1200 of power train components, according to some embodiments.
Figure 32D:
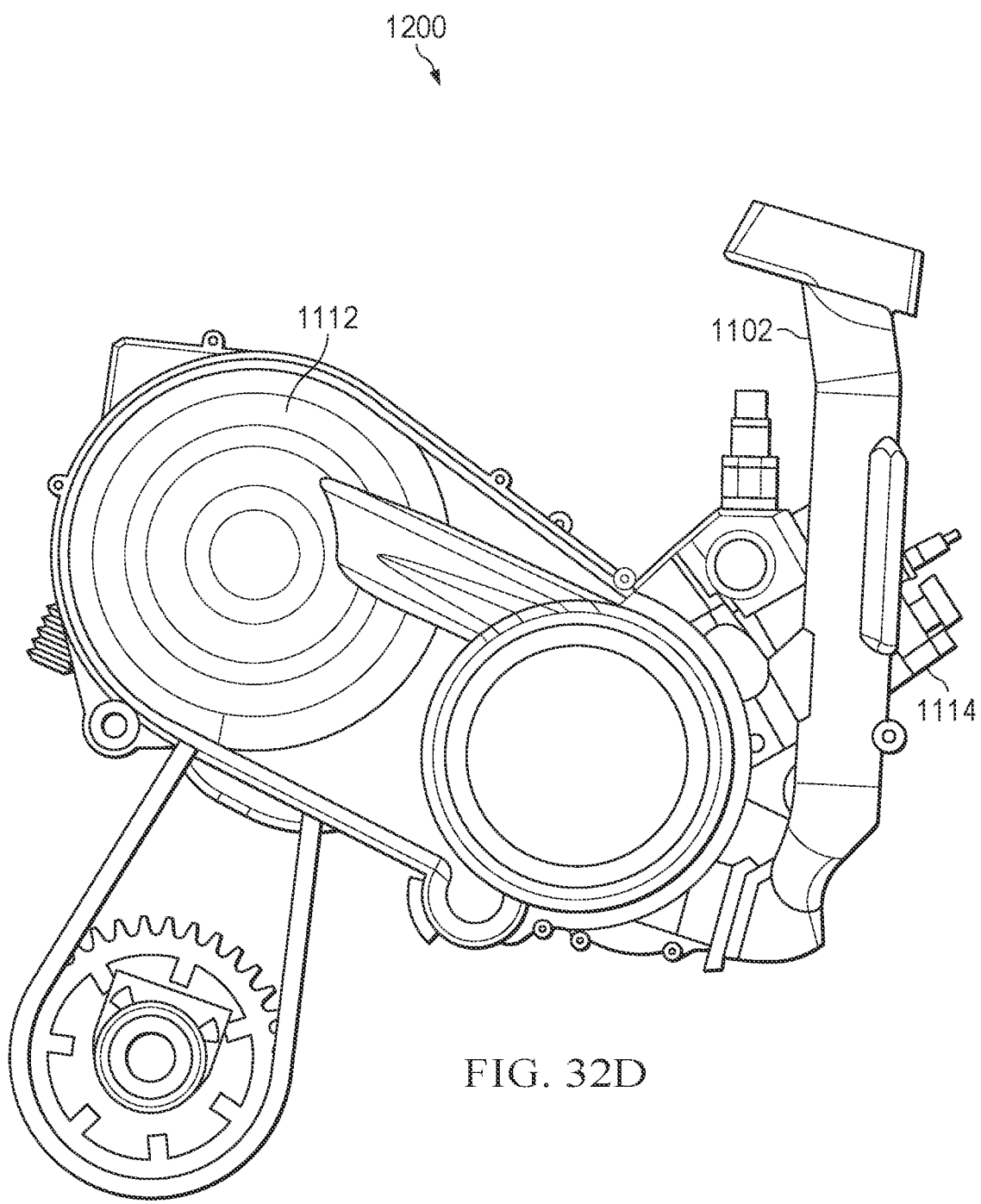
FIG. 32D illustrates a perspective view 1200 of power train components, according to some embodiments.
Figure 33A:
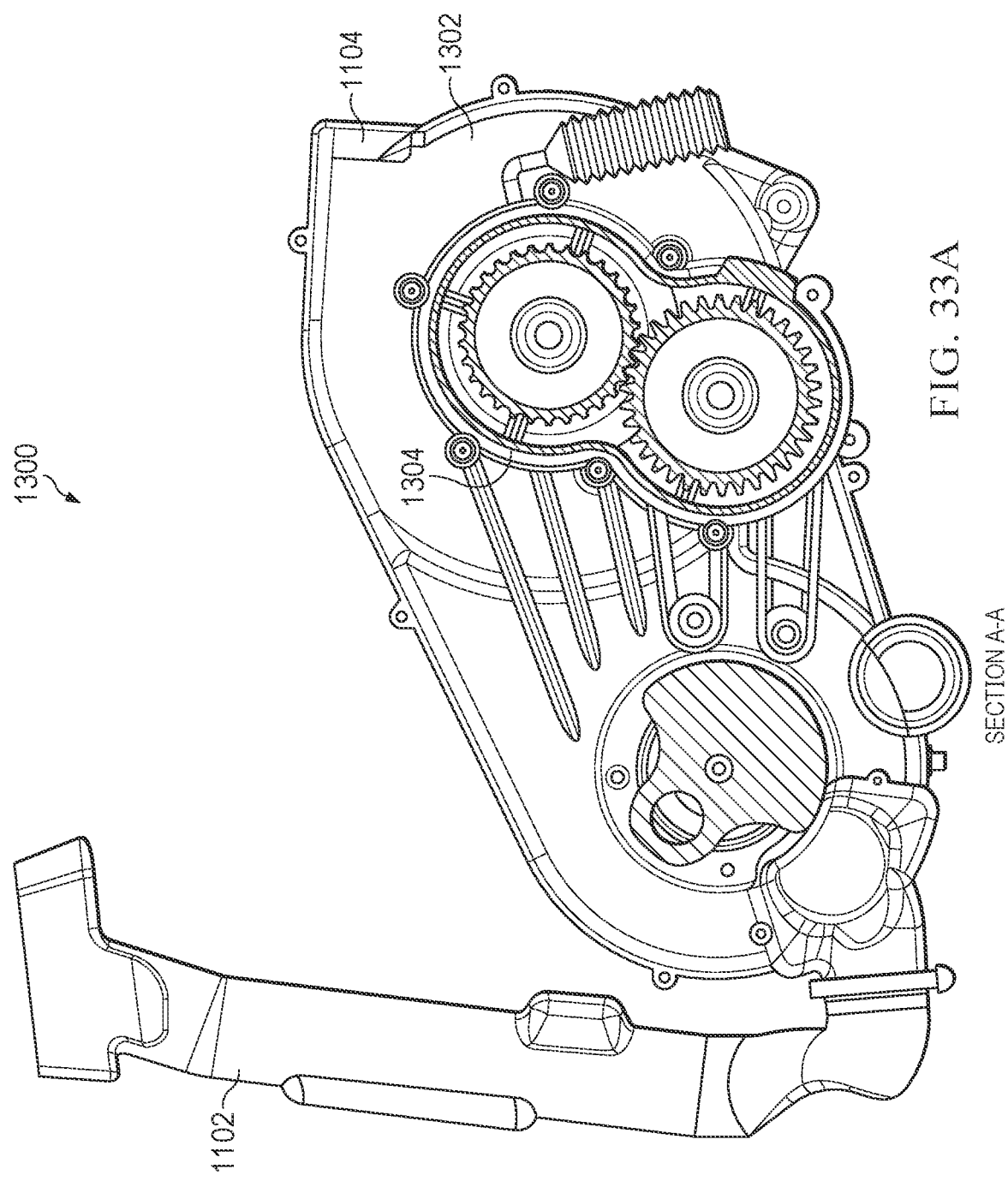
FIG. 33A illustrates a side view 1300 of a continuously variable transmission (CVT) housing with air handling components and drop box, according to some embodiments.
Figure 33B:
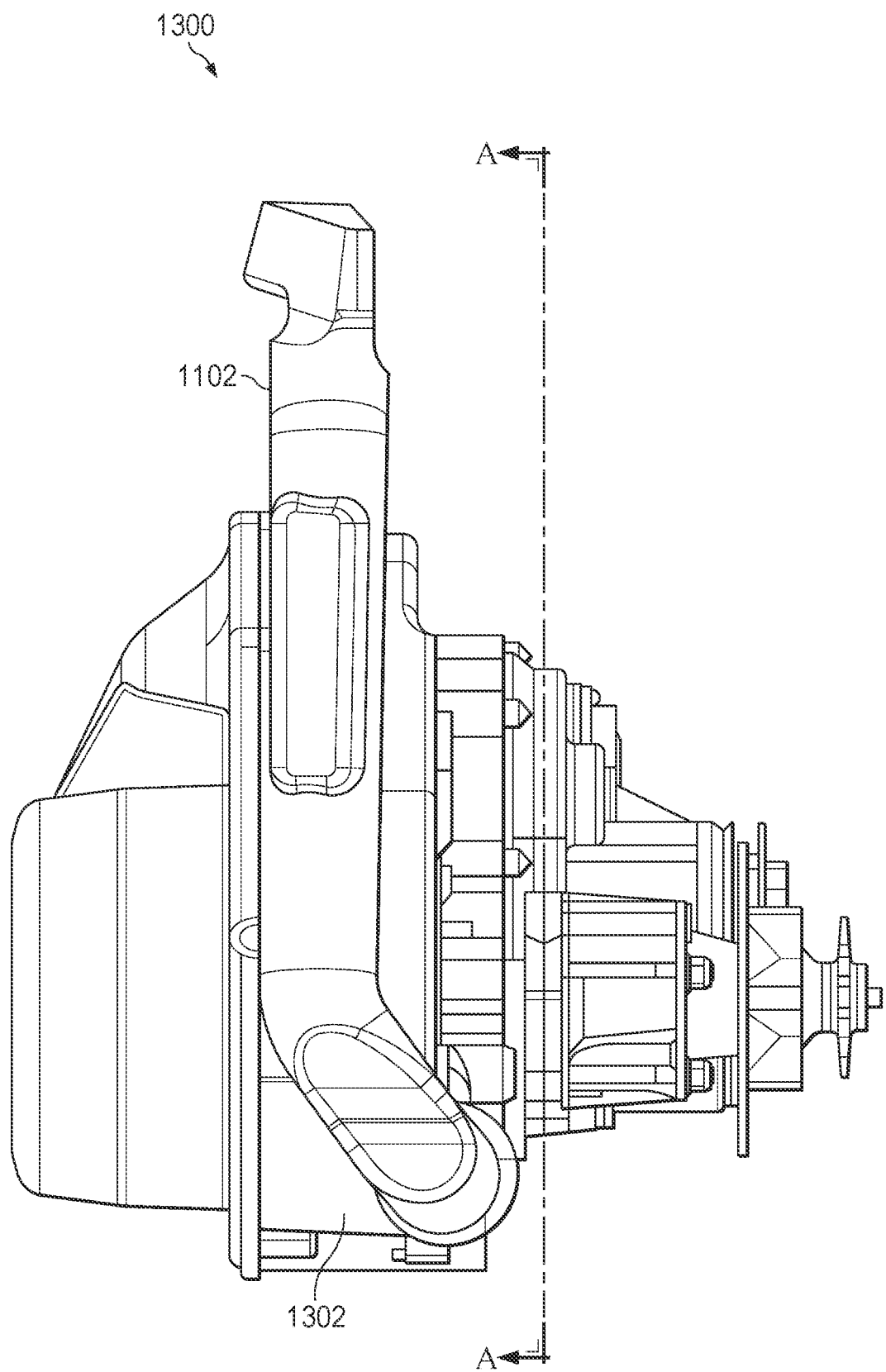
FIG. 33B illustrates a side view 1300 of a continuously variable transmission (CVT) housing with air handling components and drop box, according to some embodiments.
Figure 33C:
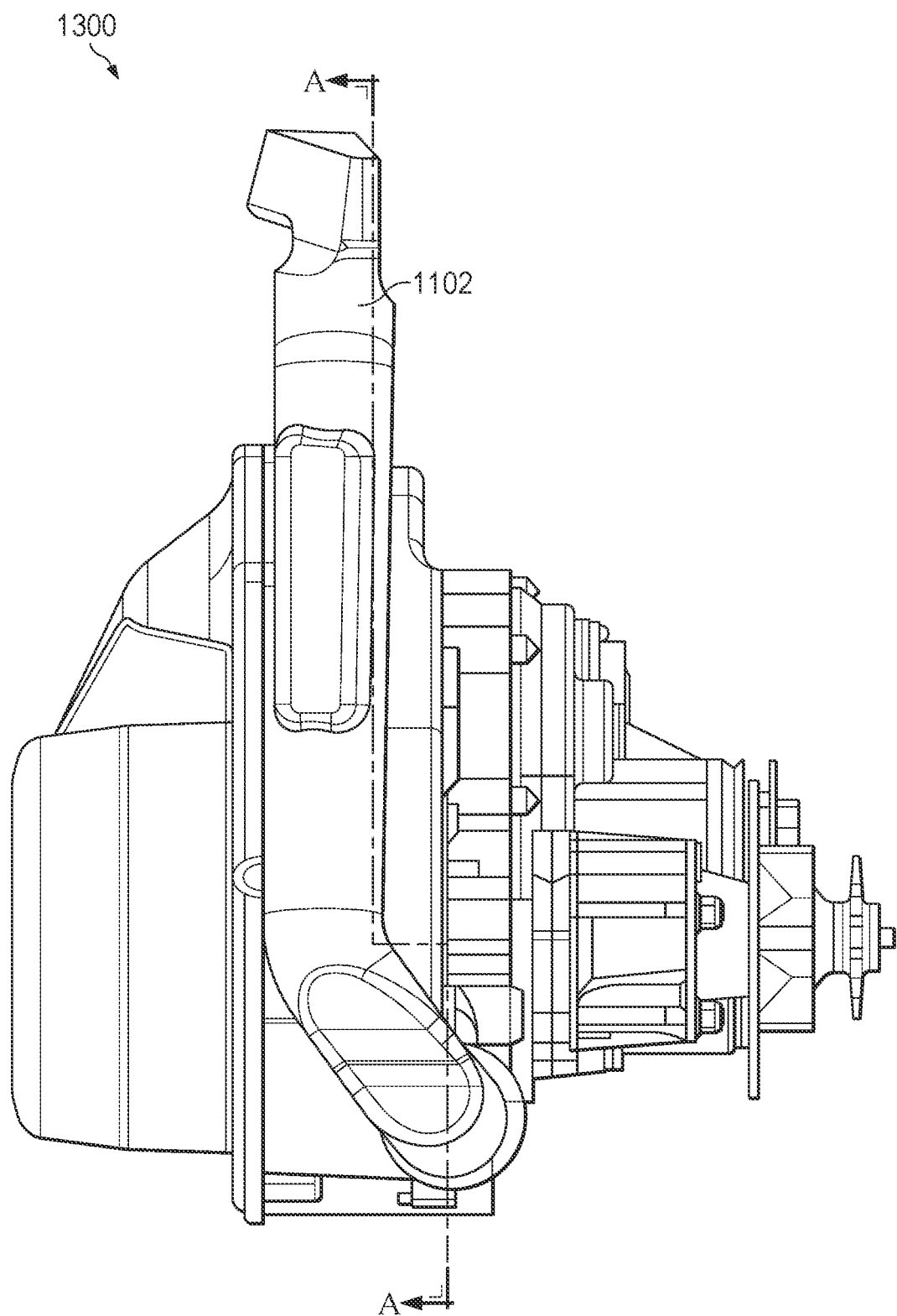
FIG. 33C illustrates a side view 1300 of a continuously variable transmission (CVT) housing with air handling components and drop box, according to some embodiments.
Figure 33D:
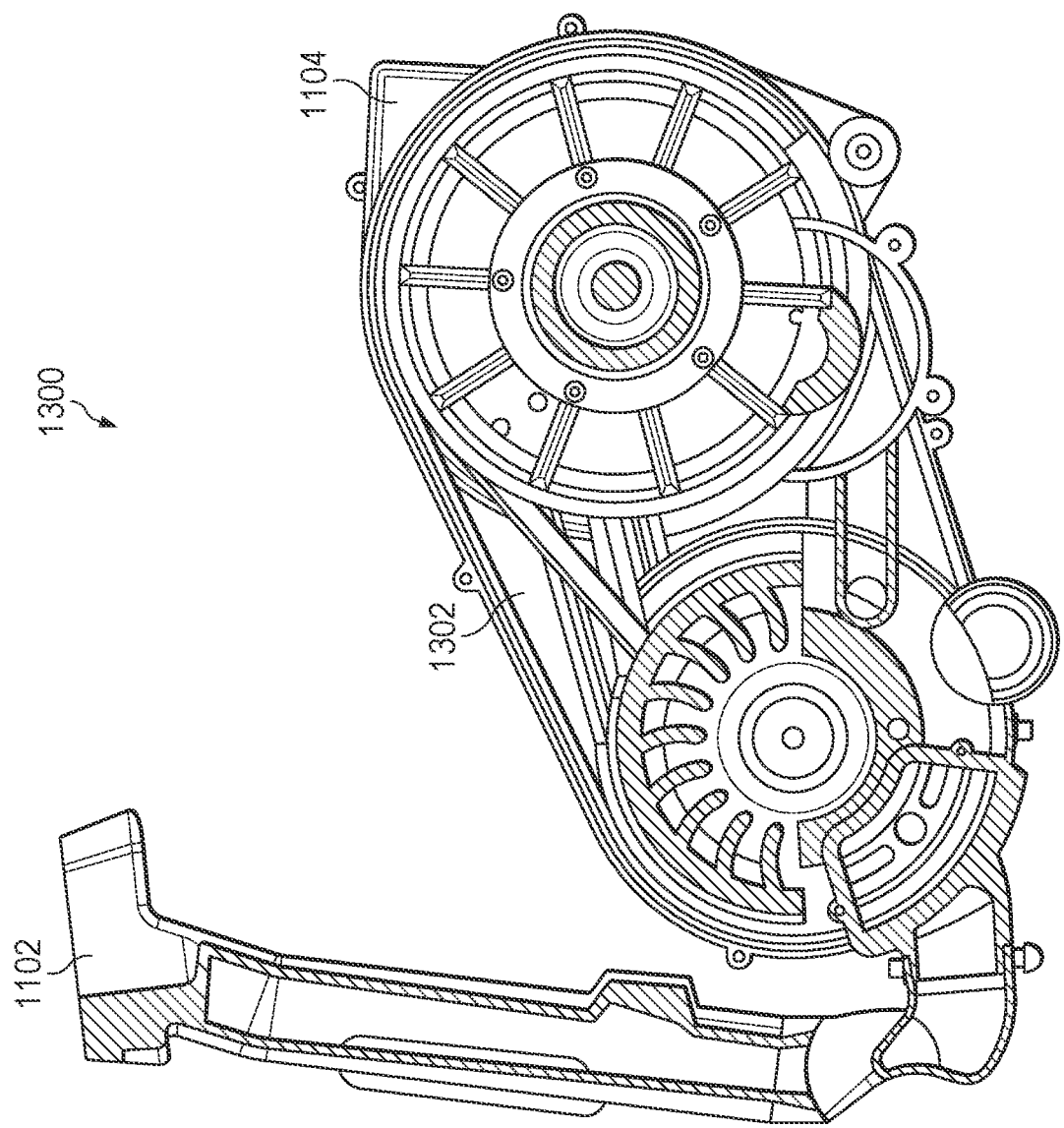
FIG. 33D illustrates a side view 1300 of a continuously variable transmission (CVT) housing with air handling components and drop box, according to some embodiments.
Figure 34:
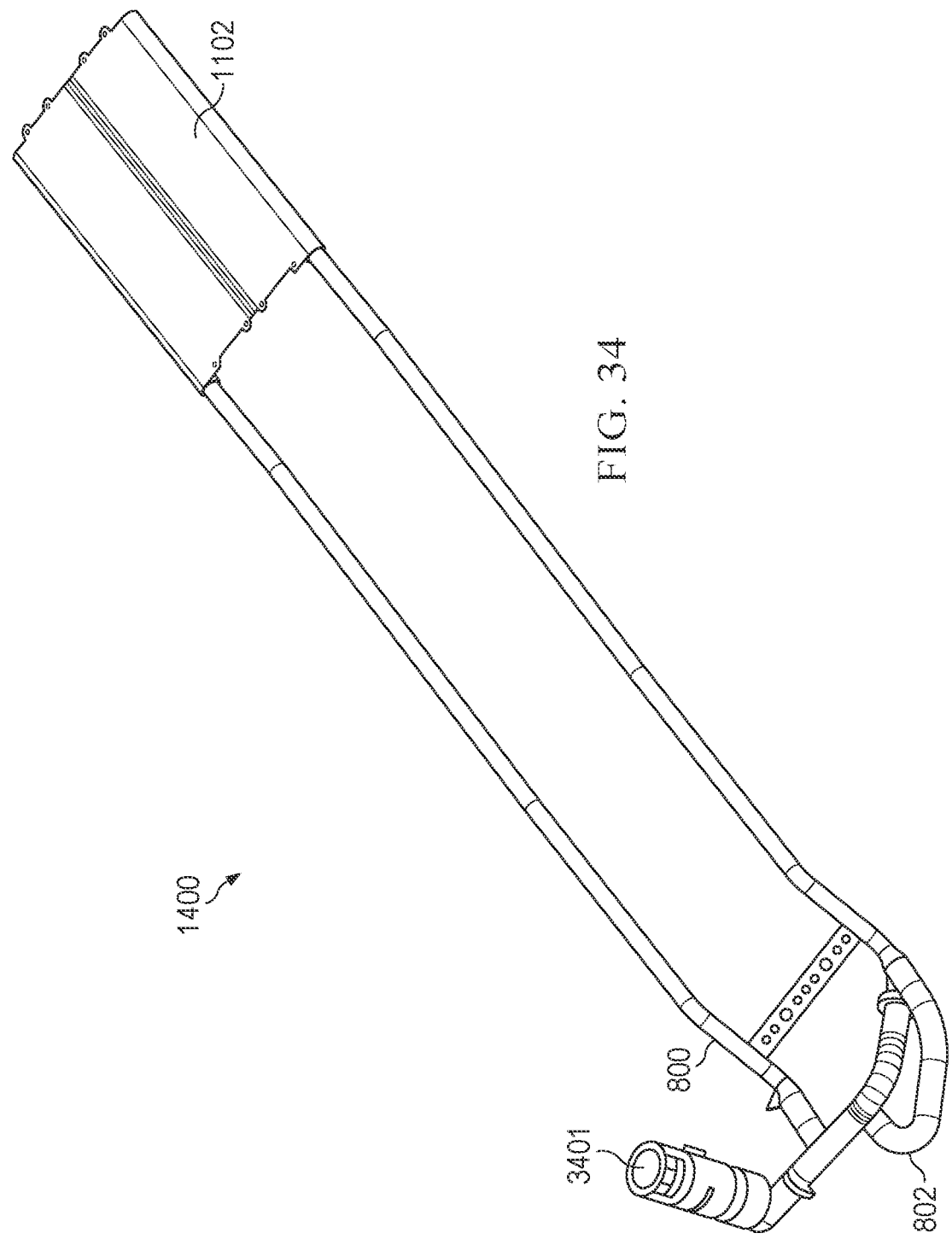
FIG. 34 illustrates a perspective view 1400 of a cooling system, according to some embodiments.
Figure 35:
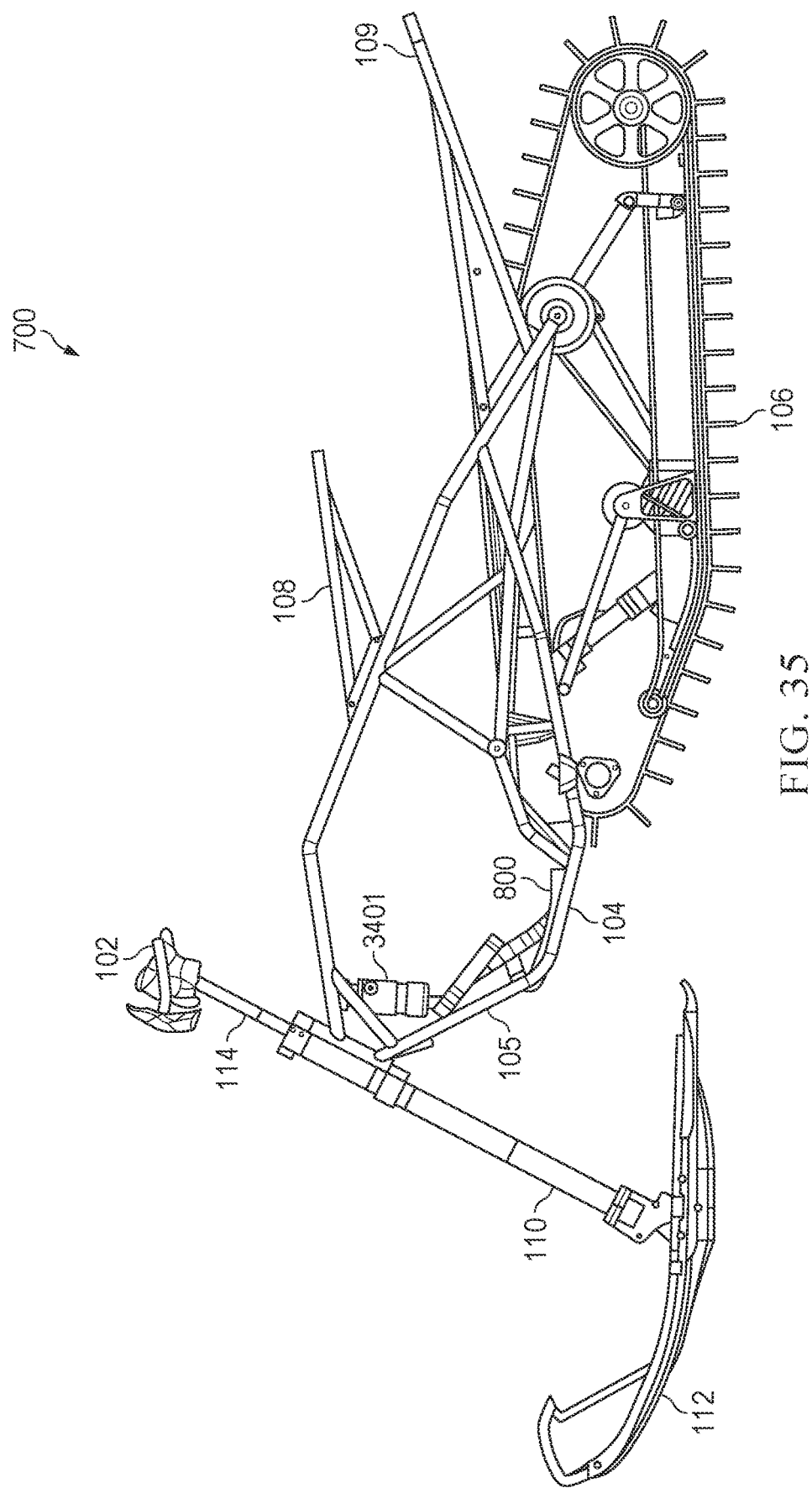
FIG. 35 illustrates a side view 700 of a snow vehicle with engine removed and with a cooling system, according to some embodiments.
Figure 36:
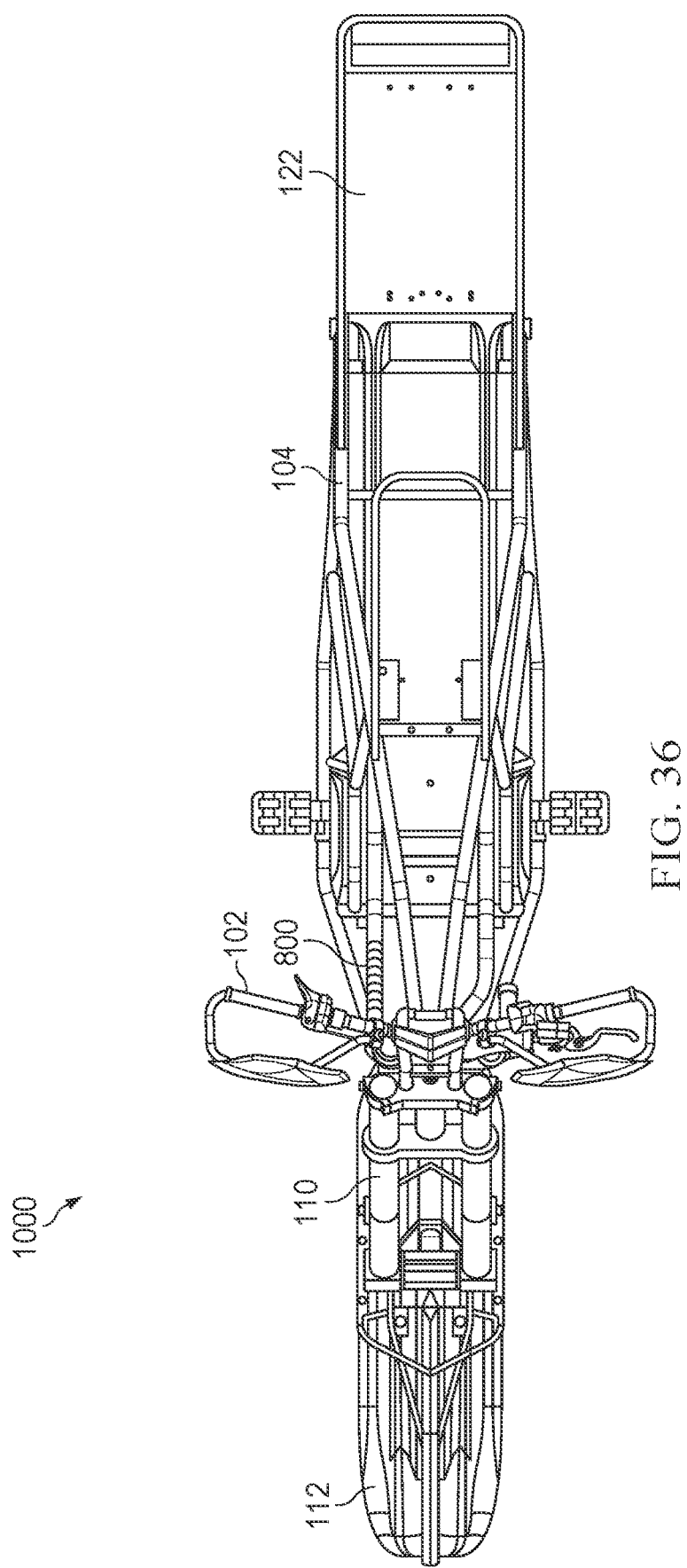
FIG. 36 illustrates a top-down view 1000 of a snow vehicle, according to some embodiments

Referring to FIG. 28, a perspective view 100 of a snow vehicle with engine 116 removed and with cooling system 800 is shown, according to some embodiments. With the engine 116 removed from view, the cooling system 800 can be seen. The cooling lines 802 connect to the engine 116, and a pump (not shown) moves coolant to heat exchanger 1002 (see view 1400 of FIG. 34). A tunnel shroud (not shown) can cover the heat exchanger 1002 (see view 700 of FIG. 35 and top view 1000 of FIG. 30) and deflects snow onto the exchanger 1002 to assist in cooling the liquid coolant (see view 700 of FIG. 29). Cooling system connector 3401 facilitates connection with engine 116. Lines 802 can be consolidated at one or more points along the system 800.

Referring to FIGS. 31A-31B and FIGS. 32A-32D perspective views 1100, 1200 of power train components are shown, according to some embodiments. The drive train of the snow vehicle includes a continuously variable transmission (CVT), for transferring power from the engine 116 to the drive track 106. The use of an automatic transmission makes for a smoother user experience and handling as compared to manual transmission and helps to ensure that the engine operates in a desirable powerband. An engine 116 converts chemical energy to mechanical energy via a rotating input shaft in contact with a transmission or drive train, such as a CVT. The CVT housing 1112 includes a rotatable drive (or primary) clutch connected to the input shaft. The CVT also includes a rotatable driven (or secondary) clutch connected to an output shaft or jack shaft 1108, the driven clutch having a laterally stationary sheave and a laterally movable sheave that is normally biased toward the stationary sheave. An endless flexible drive belt is disposed about the drive and driven clutches. The CVT 1112 is used in conjunction with or integrated with a gear or drop box 1302 (see view 1300 of FIGS. 33A-33D), for correcting the rotation of the output shaft 1108 due to the position of the engine. The drop box 1302 can include two or more gears 1304. The CVT housing 1112 with drop box 1302 is connected to the jack shaft 1108. Power is transferred via a belt 1110 (or chain or gear set or combination thereof) from the jack shaft 1108 to driveshaft 1106, connected by suitable linkages (sprockets 1116, for example) to the drive track 106.

The endless, flexible, generally V-shaped drive belt is disposed about the clutches within housing 1112. Each of the clutches has a pair of complementary sheaves, one of the sheaves being laterally movable with respect to the other. The effective gear ratio of the transmission is determined by the positions of the movable sheaves in each of the clutches. The secondary driven clutch has its sheaves normally biased together (e.g., by a torsion spring working in combination with a helix-type cam, as described below), so that when the engine is at idle speeds the drive belt rides near the outer perimeter of the driven clutch sheaves.

The CVT housing 1112 includes air handling components (e.g., ducting) to cool the operation of the CVT. Intake 1102 brings air into the housing and exit port 1104 releases the heated air from the housing 1112. The intake 1102 can face a perpendicular direction to vehicle travel, face a parallel direction to vehicle travel, or face angles in between perpendicular and parallel vehicle travel, so long as sufficient air is gathered and moved through the handling system to cool the CVT. In some embodiments, the intake 1102 is at least partially obscured by a body panel, frame member, etc., and/or directed so as to not be susceptible to ingesting snow or other foreign debris.

In the present example, the engine 1116 is shown with a single, two-stroke cylinder 1114. The single cylinder, two-stroke engine provides durability, simplicity, and lighter weight to the vehicle. Four-stroke engines and multi-cylinder two-stroke engines can also be used, but at the possible sacrifice of weight and size.

Referring to FIG. 17, a perspective view 100 of a snow vehicle with a two-ski configuration is shown, according to some embodiments. In place of a motorcycle-type fork, a single tube fork connection and accompanying suspension can be utilized to provide a two-ski configuration as an optional kit in place of the single ski configuration. A side view 700 (see FIG. 18) and top down view 1000 (see FIG. 19) are also shown. The two-ski configuration would allow for a snow bike feel, with increased stability and balance.

A front suspension subframe assembly 1708 connects with the frame 104. Steering mechanism 1702 connects with the handlebars 102 and steering shaft 1710, positioned within each spindle 1712. The spindle 1712 connects with each ski 112. A trailing arm 1706 connects with the frame and each spindle 1712. Radius arms 1704 connect with the spindles 1712 and subframe assembly 1708. Dampening components, such as shocks, springs, coils (not shown), can be attached to the subframe assembly 1708 and spindles 1712, for example.

Figure 37:
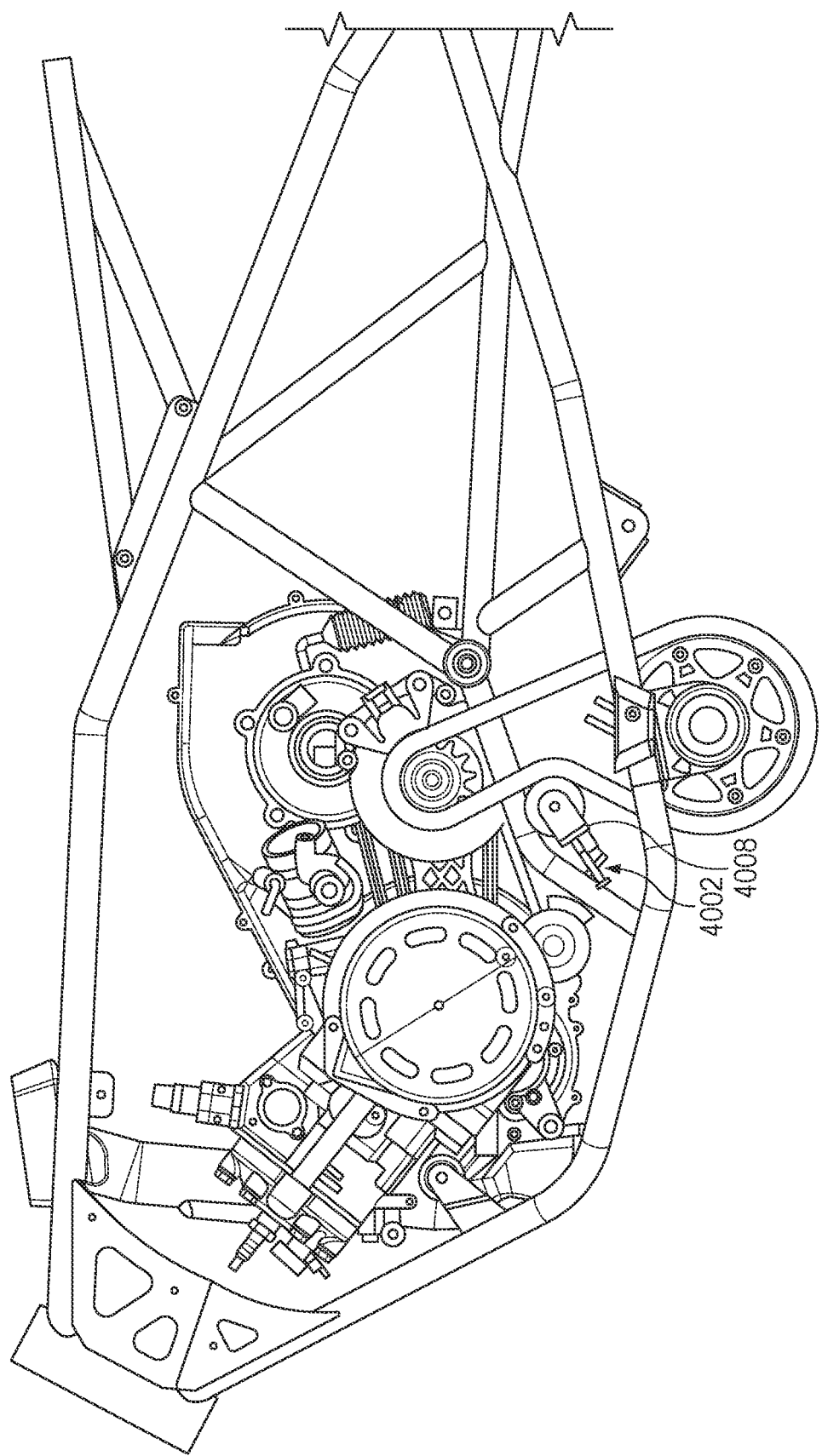
FIG. 37 illustrates a side view showing a tensioner assembly, according to some embodiments.
Figure 38:
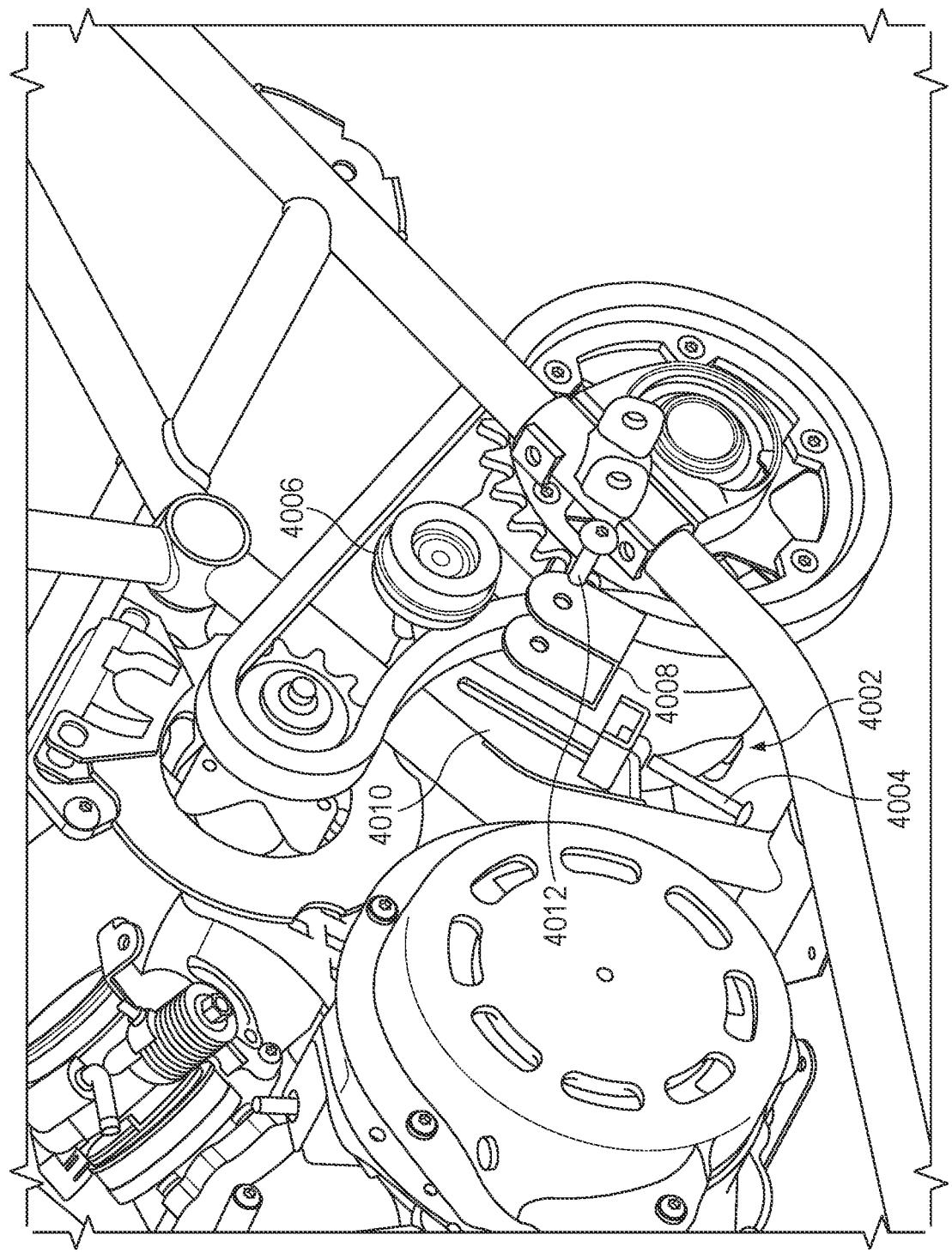
FIG. 38 illustrates an exploded view of the tensioner assembly, according to some embodiments.

Turning to FIG. 37 and FIG. 38, an embodiment of a tensioner assembly 4002 is shown. The tensioner assembly 4002 tensions the belt or chain 1110. In some embodiments, the tensioner assembly 4002 includes an adjuster 4004, roller 4006, roller bracket 4008, securing bracket 4010, and securing fastener 4012. The tensioner assembly 4002 is used to keep the chain or belt tensioned in order to prevent slippage of the chain or belt relative to the driving and driven sprockets (or pulleys, etc.). In some embodiments, the adjuster 4004 is a fastener such as a bolt that can be rotated to tension the chain or belt. Once a desirable tension has been achieved, the securing fastener 4012 is tightened against another fastener on the opposing side of the securing bracket 4008, thereby clamping the roller bracket 4008 against the securing bracket 4010.

Figure 39:
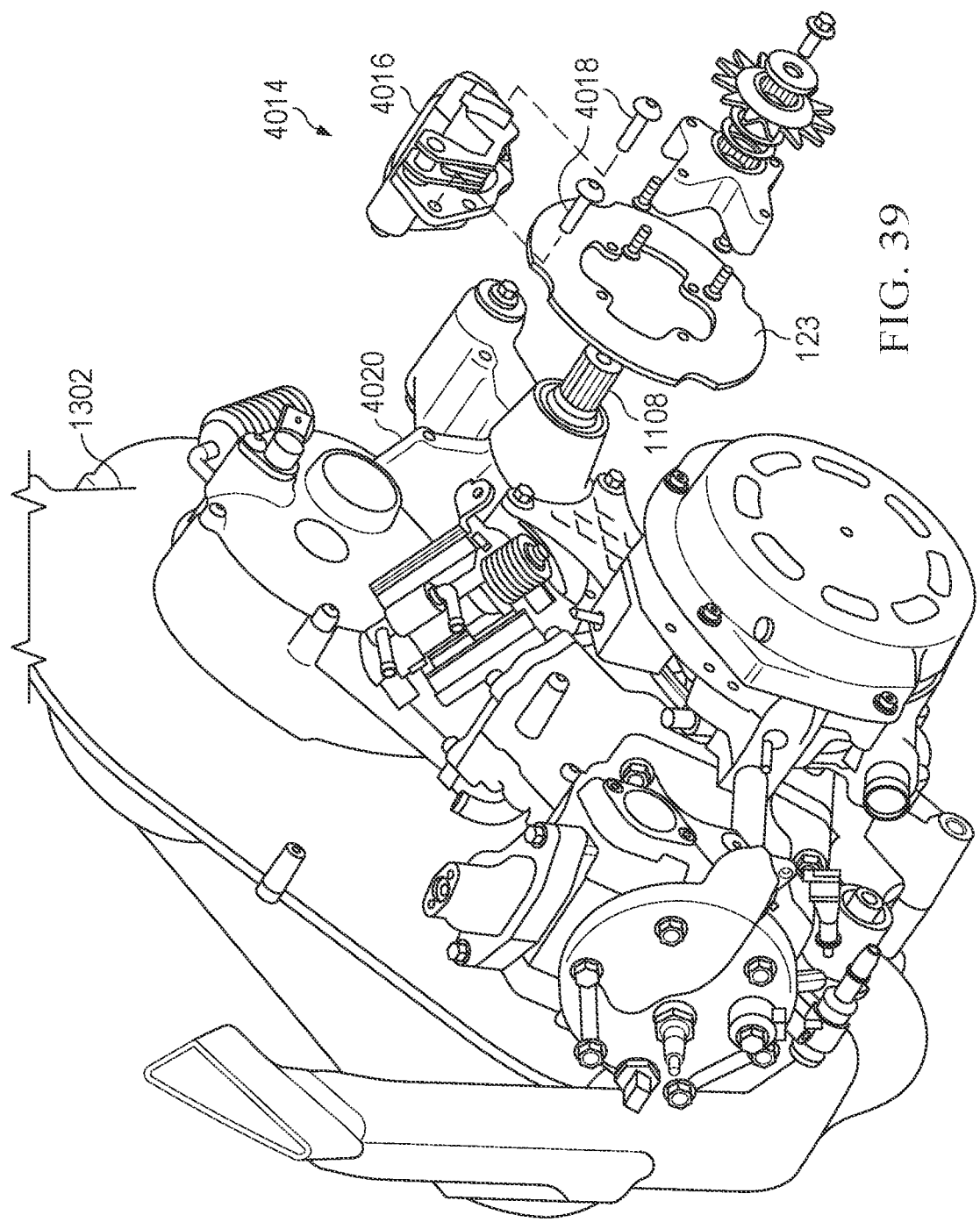
FIG. 39 illustrates an exploded view of a brake assembly, according to some embodiments.

FIG. 39 shows an exploded view of a brake assembly 4014, according to some embodiments. In some embodiments, the brake assembly 4014 includes a disc 123, caliper 4016, and mounting hardware 4018. In some embodiments, the caliper 4016 is fastened to a structural casing 4020 portion of the drop box 1302. Further, in some embodiments the brake disc 123 is coaxial with the jack shaft 1108 and the output gear from the gearset 1304 (shown in FIG. 33A). In this way, the brake disc 123 and caliper 4016 are located above the track/drive shaft and are more protected from snow and other debris when compared to an embodiment where the brake disc is located coaxially with the track/drive shaft.

Figure 40:
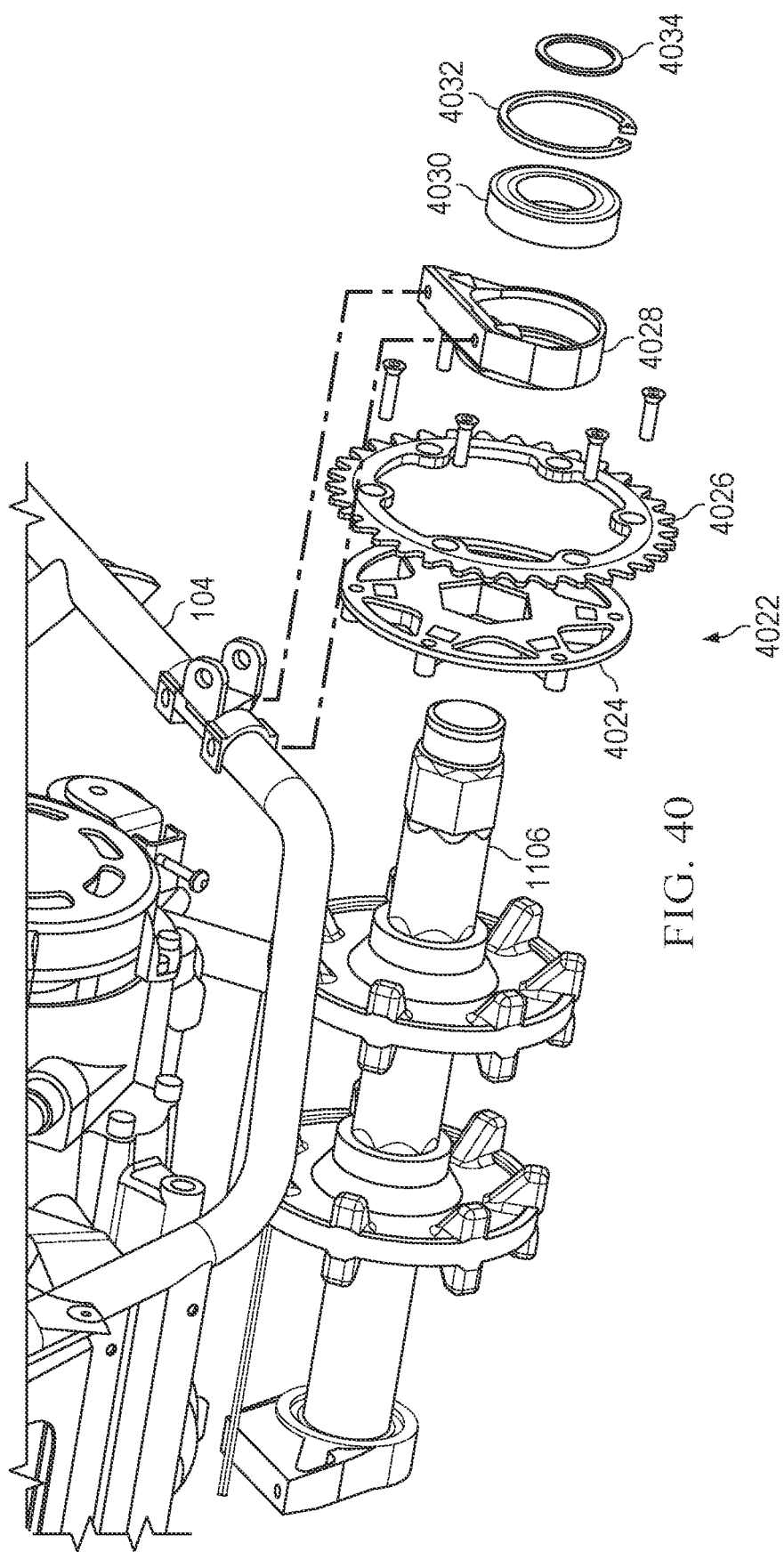
FIG. 40 illustrates an exploded view of a driveshaft assembly with removable mount, according to some embodiments.

With regard to FIG. 40, a driveshaft assembly 4022 is shown, according to some embodiments. In some embodiments, the driveshaft assembly 4022 includes a driveshaft 1106, drive adapter 4024, and driven sprocket 4026. In some embodiments, for example as shown in FIG. 40, the drive adapter 4024 and driven sprocket 4026 are separate components attached together via fasteners. In some embodiments, however, the drive adapter 4024 and driven sprocket 4026 are formed as a single component.

In some embodiments, the driveshaft assembly 4022 is mounted to the chassis 104 via one or more carriers 4028. In some embodiments, the carrier(s) 4028 are readily removable from the chassis 104, along with the driveshaft 1106, drive adapter 4024, etc., as shown. In some embodiments, the carrier(s) 4028 are fastened to the chassis 104 adjacent to a foot peg. As further shown in FIG. 40, in some embodiments, a bearing 4030 is retained within the carrier 4028 via snap ring 4032 (or other retainer) and the driveshaft 1106 is retained in the bearing 4030 via a circlip 4034 (e.g., spiral lock circlip). As noted above, it should be appreciated that the assembly can be easily removed from the chassis 104, thereby facilitating ease of maintenance and/or track changes without sophisticated disassembly of the vehicle.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus, the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A snow vehicle, comprising:
   an engine including an exhaust pipe, the engine mounted on a frame including a lower front frame component;
   a drive track, in contact with the frame;
   a drive train, operatively interconnecting the engine with the drive track for delivering propulsive power to the drive track;
   a fork, connected to the frame;
   a single ski connected to the fork, the single ski located along a longitudinal centerline of the snow vehicle; and
   a set of handlebars connected to the fork wherein an angle between the fork and a vertical axis is within a range of 24 degrees to 30 degrees,
   wherein the exhaust pipe is located entirely above the lower front frame component.

2. The snow vehicle of claim 1, wherein the drive train includes a continuously variable transmission (CVT) positioned within a CVT housing.

3. The snow vehicle of claim 2, wherein the CVT housing includes an air handling system for cooling the CVT, wherein the air handling system comprises an air intake and air exit port.

4. The snow vehicle of claim 1, further comprising an exhaust system, wherein the exhaust system is positioned within an interior of the frame of the vehicle.

5. The snow vehicle of claim 4, further comprising a muffler in contact with the exhaust system.

6. The snow vehicle of claim 5, wherein the muffler is positioned within an interior of the frame.

7. The snow vehicle of claim 1, further comprising an air intake system, in contact with the engine, wherein the air intake system is rear facing.

8. The snow vehicle of claim 1, wherein the frame includes an upper frame portion, wherein the fork is rotatably coupled to the upper frame portion and to the lower front frame component of the frame.

9. The snow vehicle of claim 7, wherein the air intake system is positioned on top of the engine and in contact with the frame.

10. The snow vehicle of claim 1, further comprising an engine cooling system.

11. The snow vehicle of claim 10, further comprising a heat exchanger positioned above the drive track.

12. The snow vehicle of claim 10, further comprising a shroud, positioned above the cooling system.

13. The snow vehicle of claim 1, further comprising:
    a drop fork component, positioned between the fork and the handlebars, wherein the drop fork component is adjustable.

14. The snow vehicle of claim 1, further comprising a fork bracket, in contact with the fork and the ski.

15. The snow vehicle of claim 13, wherein the drop fork component can adjust the handlebars in one or more of fore, aft, and rotational adjustments.

16. The snow vehicle of claim 13, wherein the frame includes a gusset bracket connecting the frame to the fork.

17. A snow vehicle, comprising:
    an engine including an exhaust pipe, the engine mounted on a frame including an upper frame portion and a lower frame portion;
    a handlebar assembly including handlebars and a fork, the handlebar assembly defining a handlebar axis;
    a drive track, in contact with the frame;
    a drive train, operatively interconnecting the engine with the drive track for delivering propulsive power to the drive track, the drive train including:
        a jackshaft having a longitudinal body defining a transmission drive axis, and
        a driveshaft having a longitudinal body defining a track drive shaft axis,
        the drive track rotating around the track drive axis at a forward end of the drive track; and
    a foot rest connected to the frame, at least a portion of the foot rest disposed rearward of the track drive shaft axis,
    wherein the engine and the exhaust pipe are positioned entirely rearward of a forwardmost point of the lower frame portion and wherein the engine and the exhaust pipe are positioned entirely above the lower frame portion.

18. The snow vehicle of claim 17, further comprising an engine air intake system positioned above the engine, wherein the engine air intake system comprises an air intake and air exit port.

19. The snow vehicle of claim 18, wherein the engine air intake system is rear facing and the engine air intake system is positioned on top of the engine and in contact with the frame.

20. The snow vehicle of claim 17, wherein the drive train includes a continuously variable transmission (CVT) positioned within a CVT housing.

21. The snow vehicle of claim 17, further comprising an engine cooling system.

22. The snow vehicle of claim 19, further comprising a heat exchanger positioned above the drive track.

23. A snow vehicle, comprising:
    an engine including an exhaust port, mounted on a frame, the frame including a lower frame member and an upper frame member;
    a fork rotatably connected to the frame at a first location;
    a ski connected to the fork at a second location
    an exhaust system located above the engine and rearward of the first location, the exhaust system in fluid communication with the exhaust port;
    a drive track, in contact with the frame;
    a drive train including a drive shaft, operatively interconnecting the engine with the drive track for delivering propulsive power to the drive track, wherein the engine is mounted entirely above the lower frame member, and wherein at least a portion of the lower frame member extends below the drive shaft.

\* \* \* \* \*